United States Patent
Garg et al.

(10) Patent No.: US 7,502,823 B2
(45) Date of Patent: *Mar. 10, 2009

(54) APPARATUS AND METHOD FOR BUILDING DISTRIBUTED FAULT-TOLERANT/HIGH-AVAILABILITY COMPUTER APPLICATIONS

(75) Inventors: Ashwani Garg, Los Angeles, CA (US); Akshay Ramesh Kadam, Los Angeles, CA (US); Pradeep Malhotra, Los Angeles, CA (US); Sagar Jogadhenu Pratap, Los Angeles, CA (US); Chirayu Patel, Los Angeles, CA (US)

(73) Assignee: Intel Corporation, Santa Clara, CA (US)

( * ) Notice: Subject to any disclaimer, the term of this patent is extended or adjusted under 35 U.S.C. 154(b) by 285 days.

This patent is subject to a terminal disclaimer.

(21) Appl. No.: 11/050,588

(22) Filed: Feb. 2, 2005

(65) Prior Publication Data

US 2005/0193229 A1    Sep. 1, 2005

Related U.S. Application Data

(63) Continuation of application No. 09/608,888, filed on Jun. 30, 2000, now Pat. No. 6,865,591.

(51) Int. Cl.
*G06F 15/16* (2006.01)
(52) U.S. Cl. .................. 709/203; 709/217; 709/219
(58) Field of Classification Search ......... 709/200–203, 709/217–229
See application file for complete search history.

(56) References Cited

U.S. PATENT DOCUMENTS

| | | | | |
|---|---|---|---|---|
| 5,307,496 A | * | 4/1994 | Ichinose et al. | 718/104 |
| 5,812,779 A | | 9/1998 | Ciscon et al. | |
| 5,978,933 A | * | 11/1999 | Wyld et al. | 714/13 |
| 6,058,490 A | * | 5/2000 | Allen et al. | 714/9 |
| 6,070,191 A | * | 5/2000 | Narendran et al. | 709/226 |
| 6,128,279 A | * | 10/2000 | O'Neil et al. | 370/229 |
| 6,223,304 B1 | * | 4/2001 | Kling et al. | 714/12 |
| 6,427,213 B1 | * | 7/2002 | Dao | 714/12 |
| 6,434,712 B1 | * | 8/2002 | Urban et al. | 714/12 |
| 6,526,434 B1 | * | 2/2003 | Carlson et al. | 709/203 |
| 6,574,477 B1 | * | 6/2003 | Rathunde | 455/453 |
| 6,598,077 B2 | * | 7/2003 | Primak et al. | 709/219 |
| 6,629,263 B1 | * | 9/2003 | Sassi | 714/15 |
| 6,865,591 B1 | * | 3/2005 | Garg et al. | 709/201 |
| 7,096,248 B2 | * | 8/2006 | Masters et al. | 709/201 |

\* cited by examiner

*Primary Examiner*—Moustafa M Meky
(74) *Attorney, Agent, or Firm*—Caven & Aghevli LLC

(57) ABSTRACT

Method and apparatus relating to building distributed fault-tolerant/high-availability computer applications are described. In an embodiment, a system may include an application, a router, and an update module. The application may execute a process in a pure distributed mode, a pure fault tolerant mode, or a distributed fault tolerant mode. The router may route communications between the application and another application independent of location of the applications. The update module may provide distributed functionality in the application. Other embodiments are also disclosed.

20 Claims, 57 Drawing Sheets

SM: Stack Manager

SG: System Manager

RTR: Message Router $I_{m1}$: ISUP management critical resource set $I_{m2}$: ISUP other critical resource set $I_1, I_2, I_3, I_4$: ISUP non critical resource sets $M_m$: MTP3 management critical resource set $M_1, M_2, M_3$: MTP3 non critical resource sets

APPARATUS AND METHOD FOR BUILDING DISTRIBUTED FAULT-TOLERANT/HIGH-AVAILABILITY COMPUTER APPLICATIONS The present application is a Continuation of application Ser. No. 09/608,888, filed Jun. 30, 2000 now U.S. Pat. No. 6,865,591.

BACKGROUND OF THE INVENTION

1. Field of the Invention

The invention generally relates to distributed fault-tolerant, high-availability systems that are especially suited to applications requiring high throughput, scalability, and extremely high availability. The invention relates more particularly to a software architecture that distributes processing load of an application among multiple processors and performs fault recovery and load redistribution.

2. Background

High throughput and/or high availability are the principal concern in various computer applications. Such applications may, for example, carry out complex scientific calculations or control essential services, such as city water purification or power grid control for a large population region. Telecommunications is another prime example. A large telecommunications network with thousands of concurrent users requires very high throughput to handle extensive teleommunations traffic. A telecommunications network that fails because of a computer fault can create widespread havoc and huge economic losses. The degree of fault-tolerance in a telecommunications network should be measured in numbers of hours of down-time over many years of continuous operation, and preferably over decades of continuous operation. Furthermore, the amount of throughput capacity and rate of throughput should not only be as high as current requirements, but also capable of expansion to accommodate future requirements.

In the past, computer systems have provided fault-tolerance capability by using cold standby, hot standby, and warm standby approaches. These systems generally have one active processor and one standby processor for each application. Each of the approaches have advantages and disadvantages that are well understood. Similarly, systems that distribute processing load of an application across multiple processors are also known in the available art. While systems that are based on dual-processor fault-tolerant architecture or multi-processor distributed architecture are known, systems that combine fault-tolerant and distributed capabilities of the available art to achieve higher throughput, reliability, scalability, and effective usage of hardware are not common. Existing systems today that address these higher throughput and reliability issues are very costly and inflexible because of complexity. Such systems are usually based on a specific system hardware architecture assuming a specific vertical and horizontal distribution of applications on the processors. For this reason, reusing such solutions from one platform to another is not possible without redesigning the system, which results in higher system cost. The architecture used by these systems also limits the application operation to one mode—it does not allow different applications to operate in different modes—for example, one application in distributed fault-tolerant mode (n active/1 standby processors or n active/n standby processors) and another application in pure fault-tolerant mode (1 active/1 standby processor). A uniform software architecture capable of handling such high throughput with such high availability and addressing the aforementioned issues of existing systems is very cost effective and drastically reduces the overall system development time. This type of architecture could be useful to a large number of equipment vendors and service providers as well as to others who need such extreme requirements. Thus, such a computer application software architecture must adapt to a variety of different computer hardware platforms and to a variety of different computer operating systems. Furthermore, it must be modular, open, flexible, and designed to permit simple and expeditious customization. It must allow seamless integration into a provider's system, regardless of the hardware platform and operating system. Based on these requirements, there is no existing available art that has the aforementioned attributes needed for certain demanding applications. Furthermore, a software architecture meeting all of the aforementioned requirements would be highly advantageous.

In addition to the features above, the invented architecture provides other features unknown in the available art. These features include the ability to recover from multiple software and hardware failures in distributed systems, to provide dynamic load balancing and load redistribution when a processor fails or is dynamically introduced into an operational system.

To further explain the invented architecture, the general concepts and terms used in the description are defined below. Concepts specific to the invention are described in the detailed description of the invention.

General Concepts and Terms

The term application refers to any program that is not part of the system software or architecture software.

The term user application denotes an application that uses the services of some other application. In the description, the terms service user and user application are used interchangeably.

The term provider application denotes an application that provides the service to another application. In the description, the terms service provider and provider application are used interchangeably.

The term architecture component denotes a software component that is required by and supplied as part of the invented Distributed Fault-Tolerant/High-Availability architecture.

The term software component refers to a component of a node or processor. A software component may be an application, a software component of the architecture, or a component of the system software.

The term system software denotes a software component that provides operating system services—for example, memory management, timer management, inter/intra processor communication, etc.

The terms processor and node are used interchangeably to mean an executable or binary image containing one or more applications and required system software. This executable must have, but is not limited to, the following attributes:

- The executable must contain one or more computer application(s).
- The executable must contain system software providing system services required by the application to operate.
- The executable must contain software components required by the Distributed Fault-Tolerant/High-Availability architecture.
- Software components contained within the executable must be able to exchange information with software components contained within other such executables.

Each such executable must have a unique, globally-known address, which is used to reference the executable. This address is known as a processor identifier.

The terms interface and API are used interchangeably to denote a collection of functions presented by a software component. Functionality provided by the software component can be accessed via functions defined and provided on the interface. These functions are called interface functions.

The term entity identifier is used to refer to the unique and globally-known name or address of a software component. An entity is the name of a software component and does not reflect or refer to any particular copy of the software component in the system.

The term fault refers to a defect in a software/hardware component with the potential to cause a failure in the system.

The term failure indicates incorrect behavior of a system due to the presence of a fault. A failure of a system occurs when the behavior of the system deviates from the specified behavior of the system.

The following references provide further information and are hereby incorporated by reference:

*A Conceptual Framework for System Fault Tolerance* (Technical Report), Walter L. Heimerdinger sand Charles B. Weinstock, Software Engineering Institute (CMU/SEI-92-033).

*Distributed Systems* (2e), Sape Mullender, Addison-Wesley, 1993.

*Fault Injection Techniques and Tools,* Mei-Chen Hsueh et al, April 1997, IEEE Computer.

*Fault Tolerance in Distributed Systems,* Pankaj Jolote, PTR Prentice Hall, 1994.

*Software-Based Replication for Fault Tolerance,* Rachid Guerraoui and Andre Schiper, April 1997, IEEE Computer.

SUMMARY OF THE INVENTION

One of the advantages of the invented architecture is to enable operation of multiple applications, each in one of the following modes, on multiple processors in a single system:

Conventional (non fault-tolerant, non distributed)

Pure fault-tolerant (1 active, 1 standby)

Pure distributed (n actives)

Distributed fault-tolerant (n actives, m standbys)

This advantage is achieved by introducing a resource set abstraction in applications to be operated under the architecture. A resource set refers to a group of resources (such as messages, data, or network elements) that are used by the application to service external events. In a distributed environment, a resource set also defines the basic unit of load distribution and can be based on parameter values contained in external events processed by an application. Each resource set is identified by a resource set identifier. An application may define a single resource set (in a pure fault-tolerant environment, a single resource set represents the entire application) or multiple resource sets (in a distributed environment, multiple resource sets represent the entire application). The present architecture operates by bringing resource sets of the application into a certain state—namely active, standby, and out-of-service on the processors over which the application has to be fault-tolerant or distributed. Only application copies in which active resource sets are activated process external events. For fault-tolerant applications, the standby resource set is activated on a processor other than the processor on which the corresponding active resource set is activated. The application copy with the active resource set updates the application copy with the standby resource set with information to keep the standby in the same state as the active. The standby resource set can be activated to recover from failure of the active, and external events are routed to the application copy with newly-active resource set for processing.

The invention defines architecture components to manage overall system operation, and application specific components to provide fault-tolerance and distributed functionality of the application.

The architecture provides an Application Distributed Fault-Tolerant—High Availability Support Module (ADSM) to handle the resource set abstraction within the application. The ADSM is combined with the application only when the application has to operate in distributed or fault-tolerant configuration. ADSM and the application are placed together on every processor in which the application has to be operated in fault-tolerant or distributed mode. The ADSM is specific to each application and uses the warm standby approach for fault-tolerance. ADSM provides a well-defined API to the architecture's system components to perform the following operations on a resource set:

Make a resource set active to process external events

Make a resource set standby and receive updates from the active

Make a resource set out-of-service

Transfer information from the active resource set to the standby resource set

The architecture also provides an Application Load Distribution Module (ALDM). The ALDM is only required when an application is operating in distributed mode. The ALDM distributes incoming external events by mapping them to resource sets. Architecture components pass the event to the application copy that contains the mapped active resource set.

The architecture provides architecture components, namely a System Controller, Router, and Load Manager. The architecture components manage system operation by manipulating the states of resource sets defined in applications. All procedures defined by the architecture are applicable individually to each application's resource set.

The System Controller manages the overall operation of the system and implements procedures for system activation, fault recovery, new node introduction, load redistribution, etc. The System Controller can be placed on any processor in the system and is fault-tolerant capable by itself. The System Controller is configured with information about the applications in the system—for example, mode of operation, resource sets provided, and their relation with each other. Depending on processor utilization specified at the time of node introduction and other configured information, the System Controller implements algorithms to assign and activate active and standby resource sets of the application as evenly as possible on processors in the system. This way, the system can be managed in a hardware architecture-independent fashion, allowing each application to operate in a different mode. The System Controller uses APIs provided by ADSM and the Router component to implement the system procedures.

The Router component routes events (messages) flowing between applications. The System Controller provides the Router with location information of the application copy having active and standby resource sets. The Router uses resource set location information to route events to the appropriate processor in the system. The System Controller also uses the Router API to hold and release events towards a resource set when the resource set is being moved from one processor to another, or when the resource set is recovering from a failure. The ADSM uses the Router API to perform multicast updates to all copies of the application in a distributed system. The ALDM uses the Router API to query resource set mapping information. Another advantage of the invention is to allow the application to recover from multiple failures and redistribute incoming traffic on failures. The System Controller achieves this by activating the standby of all the failed resource sets in fault-tolerant configurations, or by reassigning and activating failed resource sets on to the available active processors in pure distributed configurations. Depending on the processor availability, the System Controller may also recreate affected standbys on the remaining available processors. The same procedure can be used to recover from multiple failures.

Another advantage of the invention is to perform dynamic load distribution when a new node is introduced into the system. The System Controller achieves this by moving resource sets from one processor to another processor in the system without loss of information. On dynamic node introduction, the System Controller moves the active/standby resource sets from their present location to the new processor, depending on the specified utilization of the new processor for the application.

Another advantage of the invention is to perform dynamic load balancing for optimal hardware utilization. The architecture provides a Load Manager component to achieve dynamic load balancing. This component monitors the system resource utilization at processor/application level. If the Load Manager detects high resource usage on a processor/application, it can direct the System Controller to move one or more resource sets from a heavily loaded processor to a relatively idle processor. Alternatively, the Load Manager can interface with the ALDM to map new external events to the active resource sets residing on a relatively idle processor.

BRIEF DESCRIPTION OF THE DRAWINGS

The aforementioned objects and advantages of the present invention, as well as additional objects and advantages thereof, will be more fully understood hereinafter as a result of a detailed description of the invention when taken in conjunction with the following drawings, in which.

DETAILED DESCRIPTION OF THE INVENTION

Introduction

The present invention comprises a Distributed Fault-Tolerant/High-Availability architecture for computer software applications. This architecture allows construction of distributed fault-tolerant computer systems.

The Distributed Fault-Tolerant/High-Availability (DFT/HA) architecture is used to build high performance fault-tolerant computer systems wherein the performance of the computer system is increased by distributing applications across multiple hardware platforms. This architecture employs a system of distributed processing to achieve high performance for each application in the computer system. The architecture enables one application to operate on a plurality of hardware platforms, allowing the system as a whole to process an increased number of events simultaneously.

The inventive DFT/HA architecture also provides a high performance, high-availability architecture for computer systems. The architecture employs the concept of double redundancy of hardware and software system components to ensure the continual operation of the computer system when such a component of the computer system fails.

Concepts

The distributed fault-tolerant architecture introduces many new concepts to a conventional system. This section outlines the basic concepts upon which the inventive DFT/HA architecture is based. These concepts provide a better understanding of the usefulness and applicability of distribution and fault-tolerance in computer systems.

Figure 1:
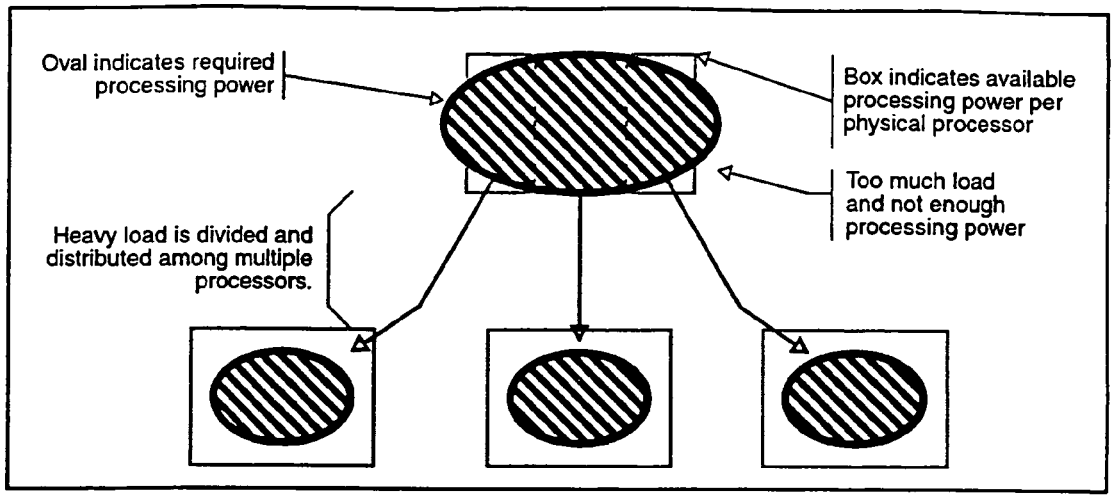
FIG. 1 illustrates the processing gain by distributing processing load.

In a distributed processing system, a single software component or application executes in parallel on more than one processor. Each copy of the executing application takes on some portion of the processing load. The sum of the processing load taken on by each copy of the application is greater than the processing load the application could handle if it were running on a single hardware platform (see FIG. 1).

An input event is a trigger received by an application from its external environment. A typical application accepts and processes input triggers, performing a set of actions based on the input event. These actions may result in, but are not limited to, further output events to other applications and/or a change of the internal state of the application. The terms input event and input trigger are used interchangeably in this description.

The processing load exerted by an application on the processor on which it is executing during a given time period is a function of the number of input events received and processed by the application during this time period. This relationship may be maintained for batch processing type applications as well as interactive applications, depending on the type of events classified as input events for the computer system and its applications. Thus, the load exerted by an application on the processor can be regulated by regulating the flow of input events to the application.

Distributing the processing load of an application among multiple processors is achieved by distributing input events to one of multiple copies of the application executing on multiple processors.

Note that, although the application executes on multiple processors in parallel, users/providers of the application view the application as a conventional application executing on a single processor.

A set of application input events may be related such that any event in the input event stream must be delivered to the application after the preceding input event in the input stream. An application may receive and proces multiple such input event streams simultaneously. By definition of an input stream, two input streams are necessarily independent of one another and, thus, may be processed independently of one another.

In a distributed system in which input events are processed by multiple copies of the application executing in parallel, all input events of an input stream must be delivered to the same copy of the application as the preceding input event. However, multiple streams of input events may be received and processed by separate copies of the application.

The following guidelines apply when distributing application processing load by distributing input events to multiple copies of an application:

1. Identify input event streams based on one or more attributes of input events comprising the input event stream.
2. Ensure that all input events of the input event stream are delivered to the same copy of the distributed application.
3. Ensure that all input events of the input event stream are delivered to the application in the sequence required by the input event stream.

Identification of an input event stream is specific to the nature of the application being distributed and the nature of individual input event streams of the application.

Typically, input event streams are identified based on one or more attributes of the input event itself. These attributes may be embedded within the input event, such as a value contained within the data associated with the input event, or may have an implicit relation to the input event, such as the device originating the event. Attributes that help identify input event streams are known as distribution key(s).

Once the first input event of an input event stream is identified, subsequent events of the stream must be identified. This identification is again performed based on the distribution key contained within subsequent input events, and the process of identification and classification of the input event is similar to identifying the first input event of the stream.

When an input event is identified and classified, it is assigned to a copy of the distributed application for processing. Typically, the first input event of an input event stream may be assigned to any one of the copies of the distributed application. Subsequent input events of the input event stream must be delivered to the same copy of the distributed application as the first input event.

Note that the distribution key is an attribute of input events. The value of the attribute, known as the distribution key value, is used to actually pick the copy of the distributed application that is to process the input event.

For example, in a distributed transaction processing application, we define each transaction request as the input event and the transaction ID appearing in the header of each transaction request as the distribution key. Incoming transaction requests are assigned to one of multiple copies of the distributed transaction processing application, which executes in parallel on multiple processors, based on the value contained within the transaction ID field of the incoming transaction request. Thus, in this example, the transaction request is the input event, the transaction ID contained within each transaction event is the distribution key, and various values contained within the transaction ID of each transaction event are the distribution key values, based on which the incoming transaction event is assigned to a copy of the distributed transaction application for processing.

Input events arriving at an application for processing may contain different distribution keys and distribution key values. The software component that classifies these input events must be aware of each type of input message and the distribution key applicable to that input message.

A resource set is the group of distribution key values contained within the input events. When an application processes an input event, it utilizes a set of resources. Resources are elements required to process an input event, such as memory, timers, files, or access to other devices in the computer system. Each input event may be associated with a set of resources within the application required to process the input event. Thus, the resource set is also related to the resources within the application required to process a set of input events.

In the transaction processing application explained above, transaction ID values from 1 to 1000 may be mapped to resource set R1, transaction ID values from 1001 to 2000 may be mapped to resource set R2, and so on.

A resource set is considered to be the unit of load distribution. A distributed application can be viewed as a collection of two or more resource sets. To achieve distribution, each resource set can be assigned to a different copy of the application executing on a different processor on which the distributed application is to execute. Each input event to be processed by the distributed application is mapped to a resource set. Then, the event is delivered to the application copy to which the resource set has been assigned.

When an application copy is initialized, all possible resource sets of the application are said to be in the out-of-service state. In this state, no resources are allocated for the resource set, and input events mapped to the resource set cannot be processed by the application. Before input events related to a resource set are delivered to the application copy, the resource set must be in the active state. The application copy in which the active resource set related to an input event resides processes the event as defined by application procedures. When a resource set is made active in an application copy, the application copy allocates all resources required for the resource set to operate in the active state (for example, open required files, allocate required memory, etc.) In this detailed description, when a resource set is described as processing an input event, this implies that the application copy containing the active resource set is processing the event.

In a fault-tolerant application, for each active resource set, a corresponding standby resource set is assigned and activated in an application copy other than the copy in which the active resource set is activated. When a resource set goes into the standby state, it must allocate all resources required for the resource set to operate in the standby state (for example, open required files, allocate required memory, etc.) Input events mapped to the resource set cannot be processed by an application copy for a resource set in the standby state.

Figure 2:
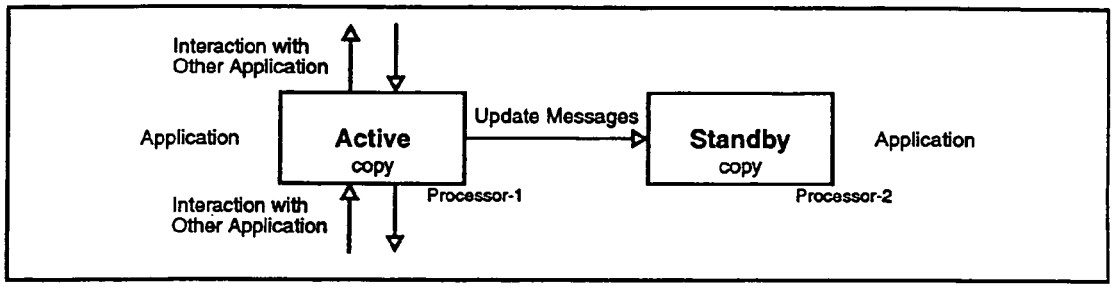
FIG. 2 illustrates the concept of active and standby copies of the application.

A double-redundant, warm standby approach is used to achieve fault-tolerance in an application. As shown in FIG. 2, in fault-tolerant applications, the application copy having an active resource set receives input events, processes these inputs, and generates outputs in response to these inputs. Additionally, when the application copy undergoes any internal state change due to the processing of an input trigger event related to an active resource set, the application sends a message informing its standby counterpart of this change. These messages are known as Run-time Update Messages. The internal state of the standby is kept synchronized with the internal state of the active in this manner.

An application copy having a standby resource set receives updates from the active counterparts residing in another application copy. On receiving such updates from the active, the application copy updates the standby resource set state to match the internal state of the active resource set. This process is used to keep the standby resource set of an application in the same internal state as its active counterpart. The procedure used to keep the active and standby resource sets in the same state is known as the Update Procedure. The approach that uses the update procedure to keep a redundant copy of a resource set in the same state as the primary copy is known as a Warm Standby approach.

To recover from a failure in the system, the following steps need to be performed:
1. Failure detection
2. Fault location
3. Fault isolation
4. Fault recovery Failure detection involves having a mechanism in place to detect incorrect behavior of all or part of the system.

Fault location involves collecting multiple failure reports and combining them to locate the system fault that is manifesting itself in the form of the reported failures.

Fault isolation is the action of preventing the faulty component from leading to faults in other components in the system with which it directly or indirectly interacts.

Fault recovery is the action of placing a faulty component or system into a state wherein the system continues to operate as though the fault had not occurred.

Once a failure in the system is detected, located, and isolated, a component of the DFT/HA architecture is informed of the location of the failure. This is known as a fault trigger.

Figure 3:
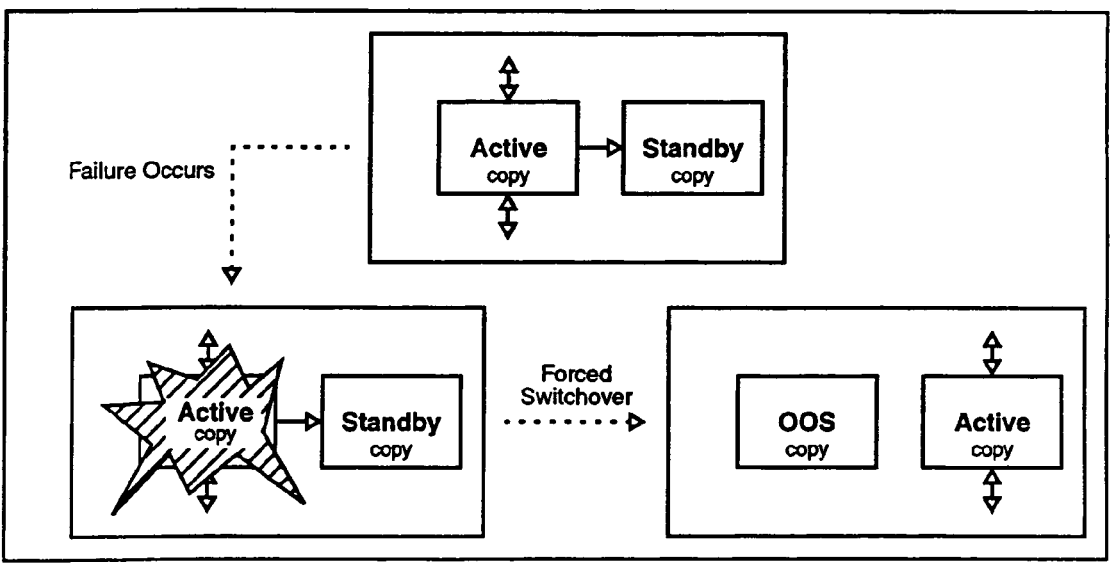
FIG. 3 illustrates the state change via forced switchover operation.

On receiving a fault trigger, the standby resource sets of the application are brought into the active state. All external events that were being processed by the application copy having failed active resource sets are now redirected to an application copy in which new active resource sets are activated. This procedure is known as a forced switchover (FIG. 3). The failed active resource sets are taken into the out-of-service state.

Figure 4:
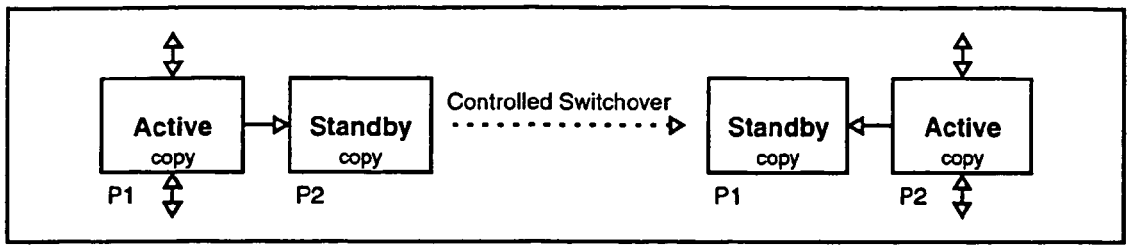
FIG. 4 illustrates the state change via controlled switchover operation.

In addition to the forced switchover operation, a controlled switchover operation is provided. The controlled switchover operation allows the states of an active and standby resource set to be swapped as shown in FIG. 4. After the operation is completed, the active resource set becomes standby and the standby resource set moves into the active state. The application copy with the new active resource set begins processing input events.

The state of a resource set is specific to the processor on which it resides. A resource set may only be in one of the above-mentioned states on a given processor. In addition, there can only be one active and one standby copy of a resource set in the entire system (the single exception to this rule is stated later in this text), and they must be contained on separate processors.

Thus, a resource set is a unit of fault-tolerance in a fault-tolerant application. Recovery from the failure of an active resource set is possible if a corresponding standby resource set exists on some other processor. Pure fault-tolerant applications define a single resource set which represents the entire application. In these systems, the copy of the application in which the active resource set is activated is said to be in active mode, and the copy of the application in which the standby resource set is activated is said to be in standby mode. Every distributed application defines a set of resource sets. Such a distributed application can be made fault-tolerant by having a backup or standby copy of each active resource set. Failure of the active copy of the resource set can be recovered from by making the standby resource set active and taking over active processing of input events from the failed active resource set.

Dividing an application into multiple resource sets that execute in parallel on more than one processor involves replicating data required to support procedures that are to execute on multiple processors. The data maintained by an application has been classified into the following categories:

Dynamic Shared Information: This information is required by all copies of a distributed application and is modified or updated at run time. Only one resource set will update this information. This resource set is known as the critical master resource set.

Figure 6:
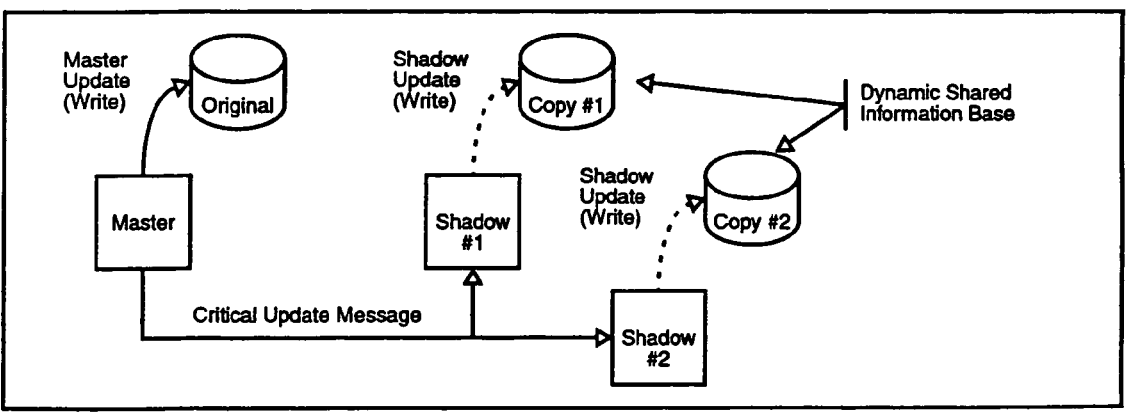
FIG. 6 illustrates the concept of keeping dynamic shared information synchronized.

When this information is updated by the master, the master generates a critical run-time update message, which is sent to all other processors on which the application is executing. All other copies of the application contain a critical shadow resource set of the master. Each shadow resource set receives this critical update and writes the relevant update information into the local copy of the database, keeping it consistent with the master copy. (FIG. 6)

Static Shared Information: This information is required by all copies of a distributed application, but it is never modified. An application is initialized with this information when the application is created. All copies of the application having active resource sets read this information while executing procedures.

Figure 7:
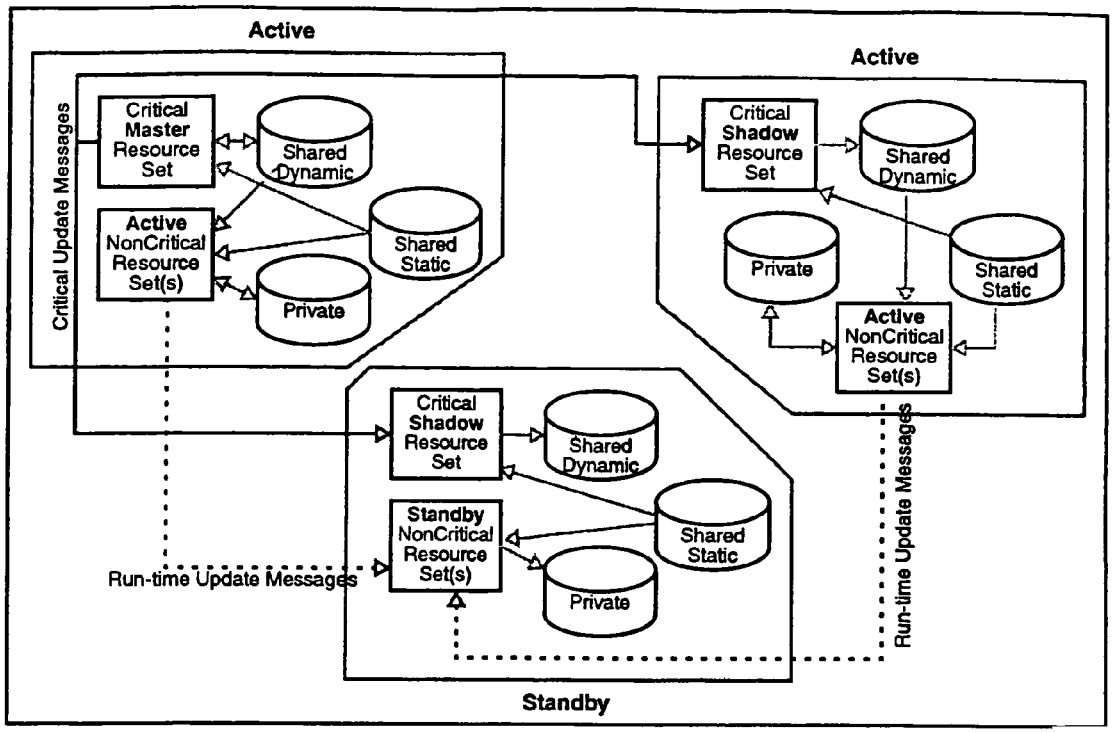
FIG. 7 illustrates the critical update and run-time update messages.

Private Information: This type of information is maintained by each resource set of the application and is usually dynamic in nature. The private information base is replicated and maintained by the application copy having the standby resource set. When the active copy of the resource set updates this information, it generates a run-time update message to the standby, which writes the corresponding update into its copy of the information base (see FIG. 7).

Figure 8:
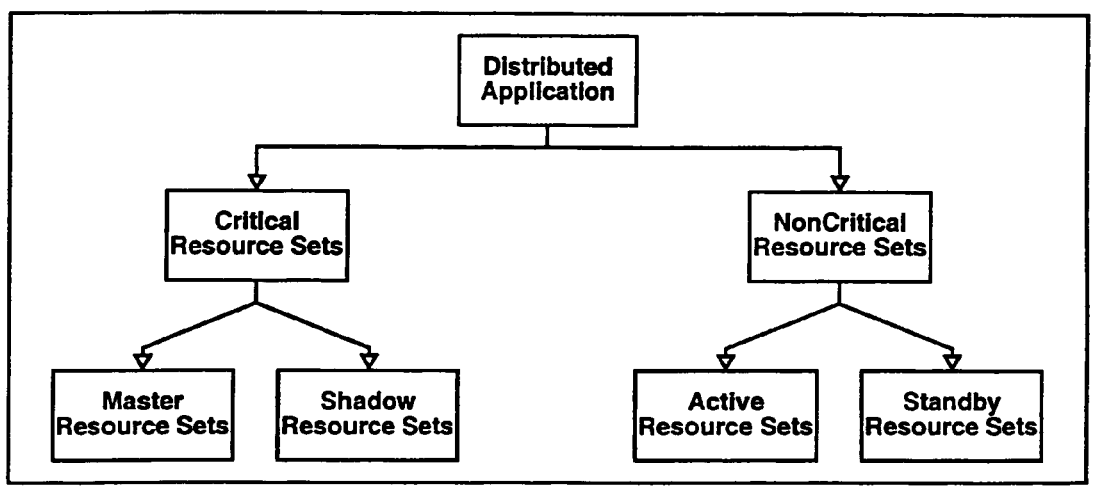
FIG. 8 illustrates the types of resource sets of an application.

Resource sets are classified depending on the database upon which they operate (see FIG. 8). This classification scheme is defined as follows:

Critical Resource Sets: These resource sets reside on all processors containing the distributed application. These resource sets maintain dynamic shared information databases as explained above.

Non-Critical Resource Sets: The application defines non-critical resource sets to distribute load across multiple processors. These resource set are activated in the system in two states. One application copy, where the resource set resides in active state, is provided with input messages and actively processes them, updating its private information base. When the private information base is updated, the active generates a run-time update message to its standby. The other application copy, where the resource set resides in standby state, receives run-time update messages from its active counterpart and updates its local copy of the private information base.

Each application must contain at least one critical resource set. This mandatory resource set is known as the Management Resource Set (shown as $R_{MGMT}$ in the description). All management operations applicable to the entire application are issued to the application copy having this critical resource set as master. When such a management command is received and processed by the application, the application copy must send update events to the resource set shadows on each processor, informing them of the management state change.

Figure 9:
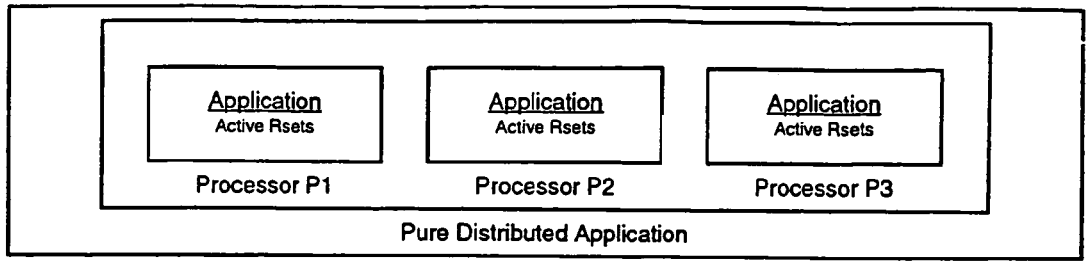
FIG. 9 illustrates the pure distributed system layout.

Distributed fault-tolerant applications exist in many different architectures. These architectures are classified based on the location and number of processors on which active and standby resource sets are maintained. The DFT/HA architecture defines the following application architectures:

Pure Distributed architectures consist of a set of processors over which active resource sets of an application are distributed (see FIG. 9). In such systems, all resource sets execute in the active state and no standby resource sets exist (with the exception of critical shadow resource sets required to maintain consistent copies of the shared dynamic information base). The failure of a non-critical active resource set in such a system cannot be recovered from.

Figure 10:
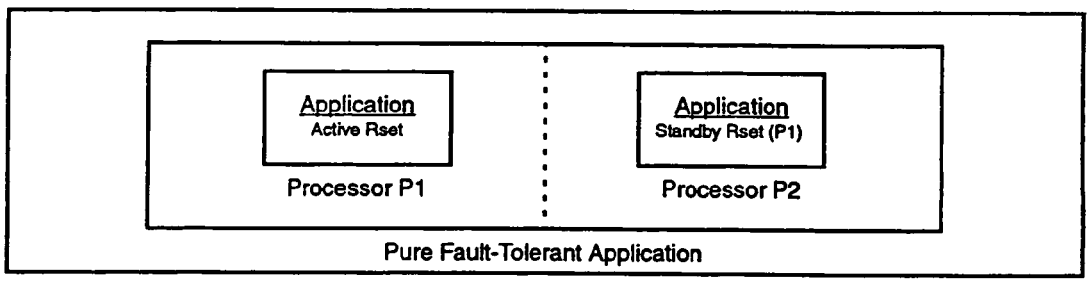
FIG. 10 illustrates the pure fault-tolerant system layout.

In Pure fault-tolerant architectures, active resource sets of an application reside on a single processor. The standby resource set that backs up the active resource sets resides on another single processor (see FIG. 10).

Figure 11:
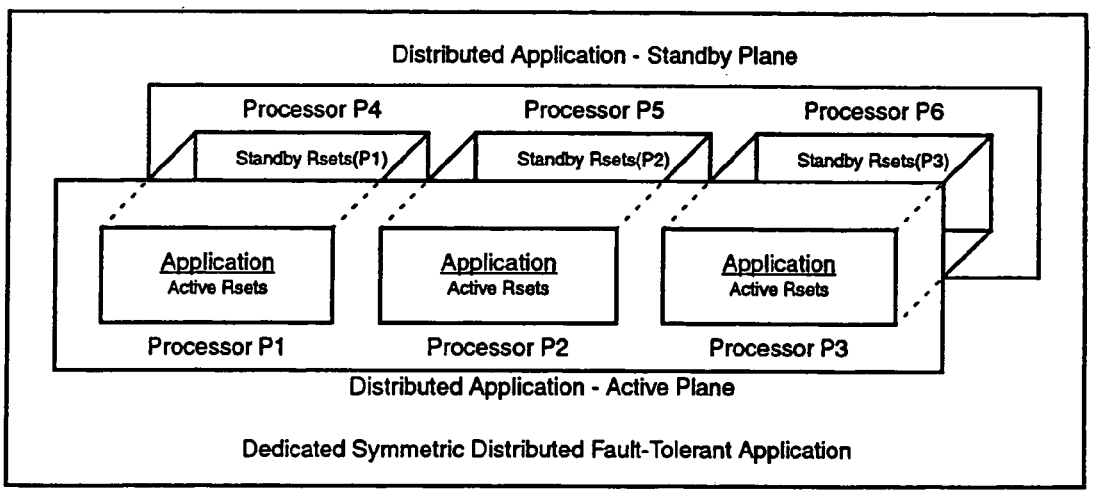
FIG. 11 illustrates the symmetric dedicated distributed fault-tolerant system layout.

Dedicated distributed fault-tolerant architectures consist of a set of active processors that contain only active resource sets and a set of standby processors, which contain only standby resource sets of a distributed application. Two types of dedicated distributed fault-tolerant configurations exist:

A) In Symmetric dedicated distributed fault-tolerant architectures, the active resource sets of the application are distributed over multiple processors. Each processor is completely backed up on one processor; that is, all active resource sets of an application residing on one processor have their corresponding standby resource sets located on a single unique dedicated processor. In such architectures, the number of processors having standby resource sets is equal to the number of processors having active resource sets. (see FIG. 11).

Figure 12:
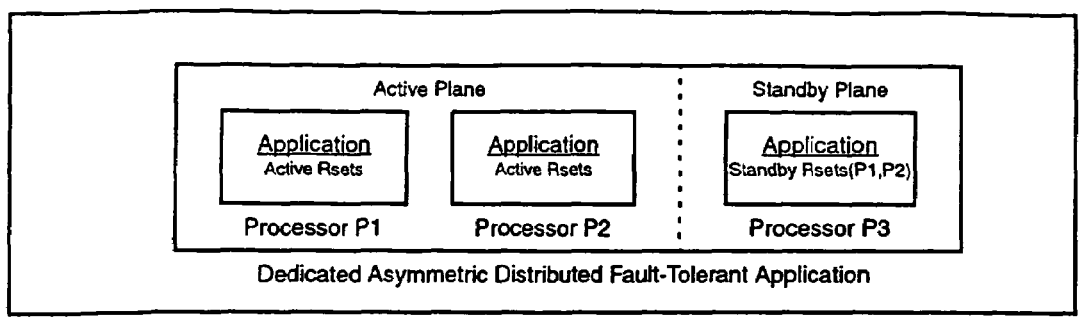
FIG. 12 illustrates the asymmetric dedicated distributed fault-tolerant system layout.

B) In Asymmetric dedicated distributed fault-tolerant architectures, the active resource sets of the application are distributed over multiple processors. The standbys for each of these resource sets are maintained on a different set of processors; that is, all active resource sets of the application residing on one processor have their corresponding standby resource sets located on a single processor. Note that processors having standby resource sets may not be unique (as is the case with symmetric dedicated systems) and may contain standby resource sets of multiple processors having active resource sets in the system. The number of processors with standby resource sets is less than the number of active processors. More than one processor with an active resource set is completely backed up on one processor in such architectures (see FIG. 12).

Figure 13:
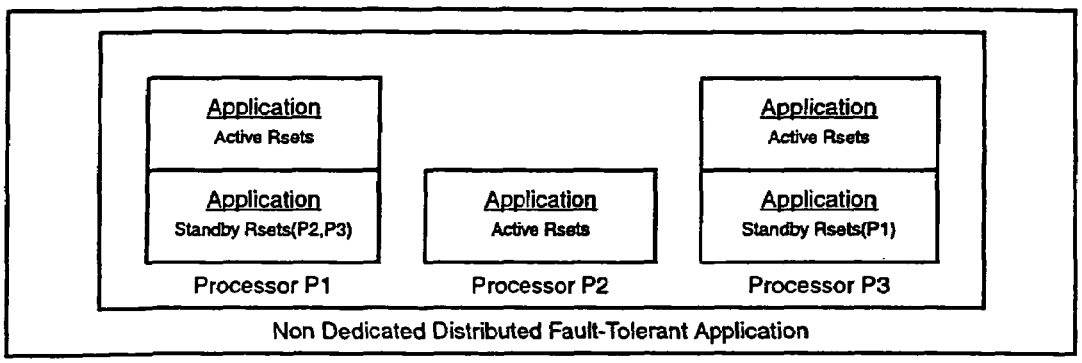
FIG. 13 illustrates the non-dedicated distributed fault-tolerant system layout.

In Non-dedicated distributed fault-tolerant architectures, each processor contains a mixture of active and standby resource sets. Some resource sets on a processor are active while the same processor contains the standbys of active resource sets residing on other processors (see FIG. 13).

The above-mentioned architectures are applicable to a single application in the system. One application can execute in a Pure Distributed configuration while another application executes in a Symmetric Dedicated Distributed Fault-Tolerant configuration.

If all applications are executing in the same configuration, the entire system is said to conform to the specified configuration. For example, if all applications in the system are executing in the Non-Dedicated Distributed Fault-Tolerant configuration, the system is said to be a Non-Dedicated Distributed Fault-Tolerant system.

Terms

This sub-section summarizes all the terms defined by the DFT/HA architecture:

Distribution key—A designated attribute or set of attributes contained within input events of a distributed application that are used to classify or group input events.

Distribution key value—The value of the distribution key attribute(s) contained within an application's input events. Assignment of input messages to one of multiple resource sets of the distributed application for processing is performed based on the distribution key value.

Resource set—A grouping of distribution key values. Resource sets are identified by a resource set identifier.

Resource set identifier—A value assigned to each resource set of a distributed application. These values must be unique within the application.

Out-of-service resource set—A resource set is out-of-service when the application copy is initialized. In this state, the application copy is not capable of accepting any inputs related to the resource set.

Active resource set—The active copy of a non-critical resource set. This resource set can process input events and resides at only one location.

Standby resource set—The standby copy of a non-critical resource set. This resource set is the backup for an active resource set and resides at only one location.

Update Message—A message containing an application's internal state change information. These messages are generated by the application copy having an active resource set towards the resource set's standby counterpart.

State Information—The state of internal data structures and other elements of an application. An application resides in one of many states, which is changed based on input events processed by the application.

Stable State Information—This is that subset of the total state information of an application that does not change frequently. The application classifies some of its state information as stable state information, depending on how often the information is updated or changed.

Transient State Information—This is that subset of the total state information of an application that changes frequently. The application classifies some of its state information as transient state information, depending on how often the information is updated or changed. When an application enters a transient state from a stable state, then that stable state is considered to be the nearest stable state.

Forced Switchover—This operation is executed to recover from the failure of an active resource set of the application. This operation results in the standby resource set taking over processing from the active. The active is made out-of-service and the standby is made active.

Controlled Switchover—The operation is executed to swap the states of the active and standby resource set of the application. The active is made standby and the standby is made active, taking over input event processing.

Run-time Update—The procedure that keeps the application copy having an active resource set synchronized with the application copy having the corresponding standby resource set. This procedure generates update messages whenever the stable state information in the application copy with the active resource set changes.

Warmstart—The operation performed to bring a newly created standby resource set into the same internal state as its active counterpart. This command is issued to the copy of the application having the active resource set. When the active has completed warmstarting its standby counterpart, the standby is in the same internal state as the active. This operation generally only transfers the stable internal state information from the active to the standby.

Peersync—The operation performed to update a standby resource set before it takes over operation from its active counterpart. This operation is issued to the application copy having the active resource set during the controlled switchover operation. Internal transient state information is sent from the active to the standby copy as part of this operation. On completing the peersync operation, the standby is completely updated and may take over control from the active without any loss of state information.

Dynamic shared information—Dynamic information required by all copies of a distributed application to execute procedures of the application in parallel. This information is replicated at each location where a copy of the distributed application resides. This type of information is dynamically updated.

Static shared information—Static information required by all copies of a distributed application to execute procedures of the application in parallel. This information is replicated at each location where a copy of the distributed application resides. This type of information is not dynamically updated.

Private information—Non-replicated, locally maintained information required by each copy of the distributed application to execute its procedures. This information does not need to be synchronized across multiple copies of the distributed application.

Critical resource set—A grouping of input messages that results in an update of the dynamic shared information of a distributed application.

Non-critical resource set—All input messages except those that result in an update of the dynamic shared information of a distributed application. This is the same as all input messages except those that are grouped into the application's critical resource set.

Critical master resource set—The active copy of the critical resource set. This resource set resides at only one location.

Critical shadow resource set—Standby copies of the critical resource set. These resource sets reside on all processors on which the application is distributed, except on the processor that contains the critical master resource set.

Pure distributed application—An application with multiple active resource sets activated on multiple processors.

Pure fault-tolerant application—An application with one active resource set and one standby resource set residing on different processors.

Symmetric dedicated distributed fault-tolerant application—An application with multiple active resource sets activated on multiple processors. Each application copy can either have active resource sets or standby resource sets. The number of application copies having active resource sets is the same as the number of copies having standby resource sets.

Asymmetric dedicated distributed fault-tolerant application—An application with multiple active resource sets activated on multiple processors. Each application copy can either have active resource sets or standby resource sets. The number of application copies having active resource sets is more than the number of copies having standby resource sets.

Non-dedicated distributed fault-tolerant application—An application with multiple active resource sets activated on multiple processors. Each application copy can have some active resource sets and some standby resource sets.

Fault-tolerant application—This refers to an application that is either pure fault-tolerant or distributed fault-tolerant.

| ACRONYMS | |
|---|---|
| DFT/HA: | Distributed Fault-Tolerant/High-Availability |
| ADSM: | Application DFT/HA Support Module |
| ALDM: | Application Load Distribution Module |
| MTP3: | Message Transfer Part Level 3 |
| MTP2: | Message Transfer Part Level 2 |
| SCCP: | Signalling Connection Control Part |
| CC: | Call Control |
| ISUP: | ISDN User Part |
| SG: | System Manager |
| MR: | Message Router |
| SM: | Stack Manager |
| OA & M: | Operation Administration and Maintenance |
| API: | Application Programmers Interface |

Architecture

This section describes the Distributed Fault-Tolerant/High-Availability architecture in terms of functionality and various components of the architecture.

Conventional computer systems comprise single copies of applications or software components running on one or more processors. All copies of the applications run in active mode.

The inventive distributed fault-tolerant/high-availability architecture allows computer systems comprising conventional, pure fault-tolerant, and distributed fault-tolerant applications. Each application may interact with other applications in the computer system irrespective of the mode (fault/tolerant, distributed, etc.) in which the application is executing.

Conventional applications appear as they do in a conventional computer system with no change. Pure fault-tolerant applications have a standby copy of the application, which will take over operation when a failure occurs on the active copy. DFT/HA applications have multiple resource sets, which reside on multiple processors in the system. Each active resource set has a corresponding standby resource set.

System Components

Figure 14:
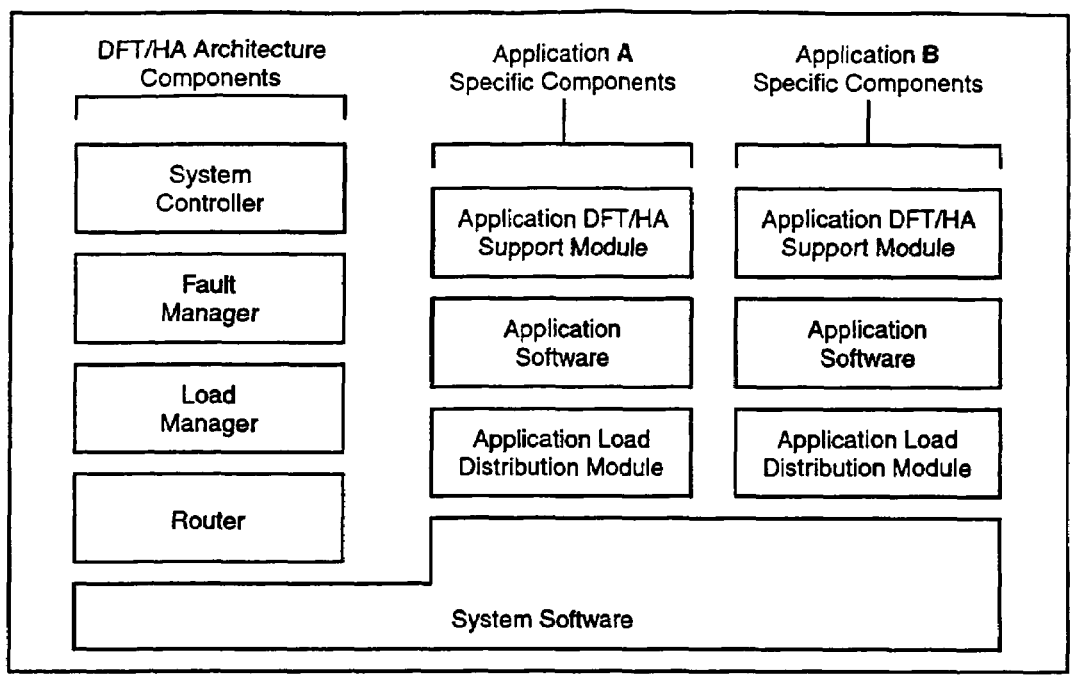
FIG. 14 illustrates distributed fault-tolerant/high-availability architecture components.

A DFT/HA system is composed of architecture components and application-specific components as shown in FIG. 14.

Applications in a DFT/HA system are controlled by architecture components. Procedures for system activation, fault recovery, load redistribution, and system maintenance defined by the DFT/HA architecture are implemented by the architecture components.

Application-specific components enable distributed and fault-tolerance functionality in the application.

Figure 15:
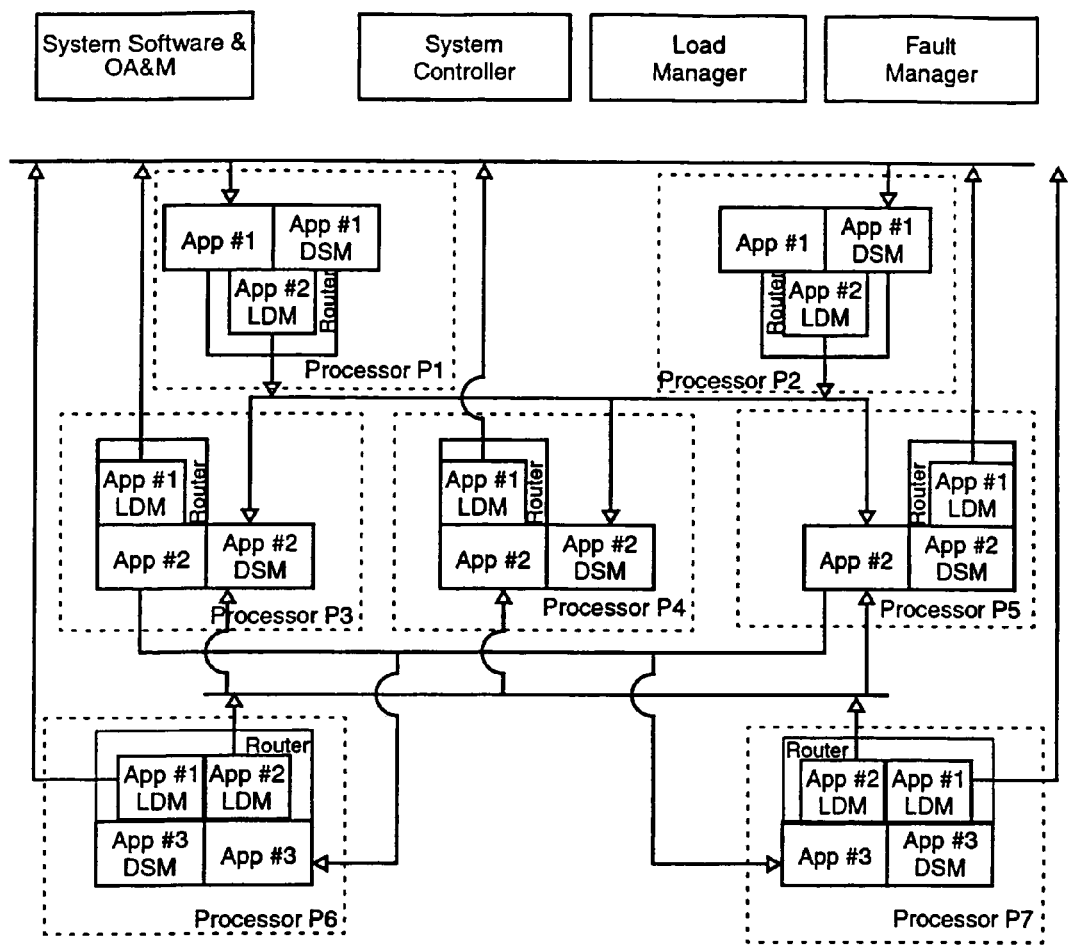
FIG. 15 illustrates distributed fault-tolerant/high-availability architecture.

The system components are:
1. System Controller
2. Fault Manager
3. Load Manager
4. Router
5. Application
6. Application Load Distribution Module (ALDM)
7. Application DFT/HA Support Module (ADSM)
8. System Software FIG. 15 depicts an example of a Distributed Fault-Tolerant/High-Availability system consisting of the above-mentioned system components with three applications. Application #1 is distributed fault-tolerant, application #2 is distributed fault-tolerant, and application #3 is pure fault-tolerant. In FIG. 15, Application #3 communicates or generates input events towards applications #1 and #2. Application #1 communicates with application #2 and vice versa. Application #1 does not directly communicate with application #3.

The OA&M software controls and maintains the system using interfaces provided by the System Controller. The Fault Manager uses the System Controller API to recover from faults. The Load Manager redistributes load between processors in the system using the System Controller API functions.

Figure 5:
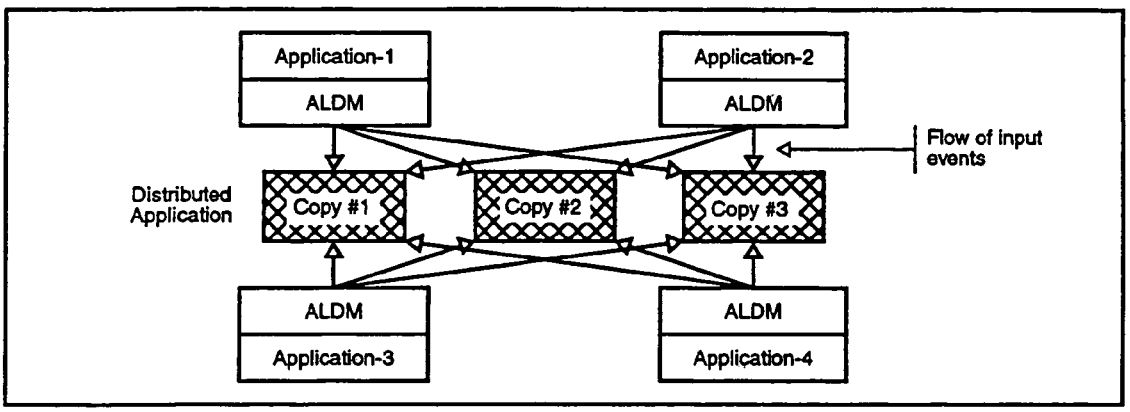
FIG. 5 illustrates the Application Load Distribution Module (ALDM)

Distributed Applications communicate with one another via the respective ALDM and Router components. As shown in FIG. 5, when an input event is to be sent from one application to another, the generating application gives the input event to the destination ALDM (on the same processor as the generating application), which determines the resource set of the destination application. ALDM passes the destination resource set information and the input event to be delivered to the Router component on the generating processor.

The Router component resides on all processors. The Router contains resource set to processor mapping information and routes the input events from the generating application to the relevant active resource set of the destination application. The resource set to processor mapping information is provided to the Router on each processor by the System Controller when the resource set is first activated. If the resource set is moved or changes state, the System Controller provides the modified resource set to processor mapping information to Routers on all relevant processors in the system.

Figure 16:
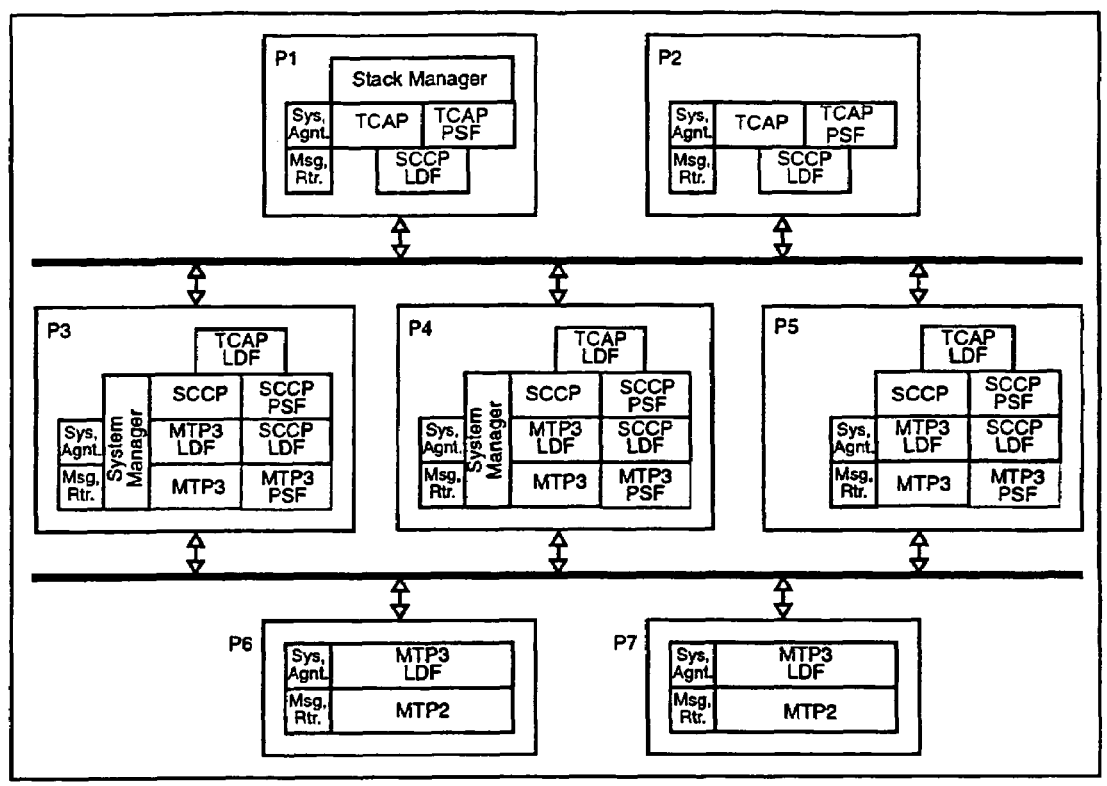
FIG. 16 illustrates the physical layout of an SS7 TCAP distributed fault-tolerant stack.

FIG. 16 depicts an example of a Distributed Fault-Tolerant/High-Availability system used as the preferred embodiment of this architecture. This architecture has been used to make a Signaling System No. 7 (SS7) communications protocol stack distributed and fault-tolerant.

The protocol stack follows the ISO-OSI reference model for communications software and comprises multiple layers of individual protocol layers. The SS7 stack shown in FIG. 16 depicts MTP2, MTP3, SCCP, and TCAP protocol layers. MTP3, SCCP, and TCAP are distributed fault-tolerant protocol layers. MTP2 is a conventional protocol layer.

The preferred embodiment includes functionality of the System Controller in the System Manager and System Agent architecture component. The System Manager implements the System Controller APIs and procedures. For efficiency, the system agent, proxy of the System Manager on every processor, sends commands to the protocol layers and collects responses from all protocol layers. Functionality provided by the Router architecture component is provided by the Message Router component shown in FIG. 16. The protocol layers are the applications of this system. Protocol-specific PSF provides ADSM functionality, and protocol-specific LDF provides ALDM functionality. Functionality of the Load, Fault Manager, OA&M, and the system software is provided by the Stack Manager.

Each of the architecture components is explained in detail in the following text. Interfaces and interface functions provided by each component is presented along with the functional description of the component.

To access the functionality provided by an interface, the relevant interface functions may be invoked in a tightly or loosely coupled manner. Invoking a function in a tightly coupled manner results in a direct call to the interface function. Invoking a function in a loosely coupled manner results in a remote procedure call, which is realized over a message-passing interface. The loosely coupled invocation may or may not be blocking in nature. If the invocation is non-blocking in nature, the result of the request operation is returned to the caller in the form of an explicit confirmation. In a blocking or tightly coupled invocation, the return value indicates the result of the requested operation.

All algorithms presented in the following component and interface function descriptions assume that a loosely-coupled, non-blocking invocation method is used. Explicit confirmations are expected and are indicated at relevant points of each algorithm. The API function calls in the algorithms only show the parameters that are relevant in that context.

Following the explanation of the procedure, some of the procedures are explained in the form of algorithms and example event flows between components in the system. These algorithms and flows are provided in reference to the preferred embodiment of the invention.

System Controller

The System Controller component controls all other components of the Distributed Fault-Tolerant/High-Availability architecture. The System Controller provides the following functionality:

a) Activation of individual applications in the system
b) Moving resource sets of distributed applications from one processor to another
c) Recovering failed active resource sets of fault-tolerant applications
d) Graceful shutdown of an application's resource sets.

The System Controller provides the following functionality via a Configuration API and a Control API. The functionality provided by the System Controller may be accessed by OA&M in the system via these APIs provided by the System Controller.

Figure 17:
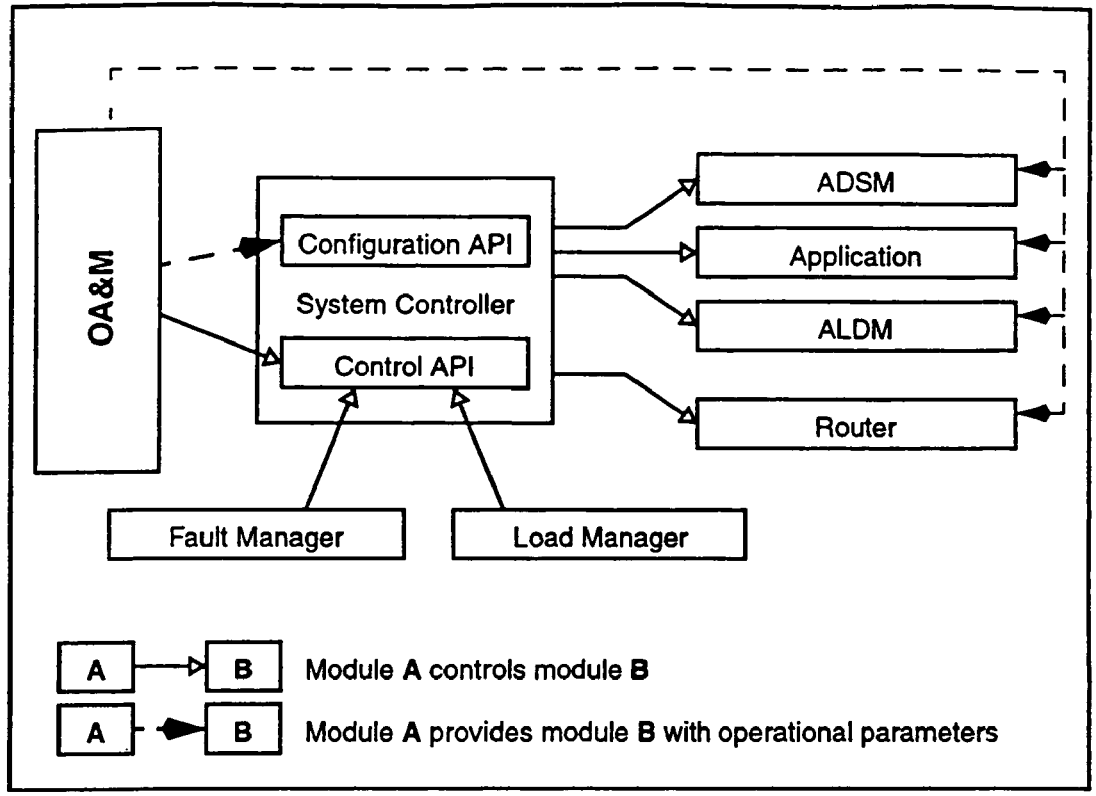
FIG. 17 illustrates control hierarchy between system components.

FIG. 17 depicts the control hierarchy between system components and OA&M. The interfaces provided by the System Controller are also depicted in this figure.

Within the Distributed Fault-Tolerant/High-Availability architecture, the System Controller maintains the state of each resource set of each application and provides procedures to implement the functionality described above.

The System Controller directly controls resource sets of an application, making them active and standby on various available processors in the system. In addition, the System Controller controls the Router architecture component directly.

Since the System Controller manages the system, a failure in the System Controller would result in loss of control of the system. To prevent the System Controller from becoming a single point of failure in the system, the System Controller is itself fault-tolerant and executes in a pure fault-tolerant active/standby redundant configuration.

If the active copy of the System Controller fails, the standby copy of the System Controller is sent a command to take over operation from the failed active (scForcedSwitchover). The System Controller has a built-in ADSM module to provide fault-tolerance functionality.

Each of these API categories of the System Controller and related functionality are explained in the following text.

The Configuration API:

The configuration section of the System Controller API is used by OA&M to configure the System Controller with system operational parameters. This API presents one function for the purpose of configuration as described below.

Before resource sets of an application can be activated or made standby, the OA&M must initialize the application and application-specific components with operational parameters. For distributed fault-tolerant applications, each copy of the application residing on multiple processors must be configured. After an application has been configured, all its resource sets are in the out-of-service state.

Configuration for the System Controller is specified by invoking a System Controller configuration API function as described below:

API Function: scConfigure

Synopsis:
This API function is invoked to configure the System Controller in the system.

Parameters:
1. Entity List—This parameter indicates the list of entity identifiers for each application that is present in the system.
2. Entity Type—This parameter specifies the mode of operation for each entity in the entity list. This parameter may take one of the following values: conventional, pure fault-tolerant, pure distributed, non-dedicated, or dedicated.
3. Resource Set List—This parameter indicates a list of resource sets, along along with the resource set type (critical or non critical), for each entity in the entity list.
4. Users and Providers—A list of entity identifiers for user and provider applications.

Return Value:
This function returns a value indicating the success or failure of the configuration operation. An optional reason may be included as part of the returned status value. If the returned value indicates failure, the System Controller has not been configured and the control API of the System Controller cannot be used by OA&M.

Description:
This API function is invoked by the OA&M to configure the System Controller.

The entity-type and resource-set-list information is maintained by the System Controller and used when the application is activated. This information is not passed on to the application.

Dependencies between multiple interacting applications are provided by the user and provider list parameter. The System Controller knows which dependent applications to inform when an application is activated or shut down.

The Control API:
The System Controller control API is divided into two sub-categories.

Resource set level control API allows operation on a resource set level. This API provides the flexibility to perform operations on resource set(s) of single or multiple applications in a single command. For example, the resource set level API command can be used to make resource set R1 of the application active on processor P1.

API provides an easy-to-use application level view to the user and can be used to perform operations on an application copy. For example, the application level command can be used to activate an application copy on processor P1. The System Controller activates active or standby resource sets on the application copy based on the configuration information provided using the configuration API. The application level API internally uses a set of resource set level API commands (see FIG. 62).

Each of the System Controller commands is explained in detail in the following API descriptions.

The Control API—Resource Set Control:
The resource set control API is used to control individual resource sets of an application. The System Controller does not use the entity type configuration information supplied by the scConfigure( ) function to perform resource set level API functions. Individual resource sets can be activated in active or standby state on different processors to enable application operation in the desired mode. The following table describes the functionality provided by the Resource Set level Control API:

| API Name | Parameters | Description |
|---|---|---|
| ScMakeActive | Processor ID<br>Entity List<br>Resource Set List<br>Last Resource Set Flag | This operation makes resource sets of one or more applications active on a specified processor. These may be critical or non-critical resource sets. |
| ScMakeStandby | Processor ID<br>Entity List<br>Resource Set List | This operation makes resource sets of one or more applications standby on a specified processor. The corresponding active resource set should exist in the system on a different processor. |
| ScShutdown | Processor ID<br>Entity List<br>Resource Set List | This operation shuts down a set of resource sets on a specified processor. The resource set could be in active or standby state. |
| ScControlledSwitchover | Entity<br>Resource Set List<br>New Processor ID | This operation swaps the states of pairs of active/standby resource sets. |
| ScForcedSwitchover | Entity List<br>Resource Set List<br>New Processor ID | This operation is used to recover from the failure of one or more active resource sets if the corresponding standby resource set exists. |
| ScControlledMove | Source Processor ID<br>Destination Processor ID<br>Entity List<br>Resource Set List | This operation is used to move a set of resource sets of one or more applications from its present location to a new location without loss of state information. This can be used for load balancing. |
| ScForcedMove | Source Processor ID<br>Destination Processor ID<br>Entity List<br>Resource Set List | This operation moves a set of resource sets from its present location to a new location. Loss of information may occur. This operation is used only if the active resource set has failed and there is no standby copy. |
| ScAbort |  | This operation is used to stop an ongoing control operation. Any partial effects of an aborted operation are removed. |

Each of the above-mentioned API functions is explained in detail below:

API Function: scMakeActive

Synopsis:

This API function is invoked to make one or more resource sets of one or more applications active on the specified processor. After this operation has completed, the application copy can handle input events for the specified resource sets.

Parameters:

1. Processor ID—This parameter identifies the processor on which the specified resource sets are to be activated.

2. Entity List—This parameter specifies the list of entity identifiers for each applications whose resource sets are to be activated on the specified processor.

3. Resource Set List—For each application specified in (2), this parameter contains a list of resource sets that are to be activated on the specified processor.

4. Last Resource Set Flag—For each application specified in (2), this boolean flag indicates whether this is the last set of resources being activated for the application.

Return Value:

The return value of this function indicates whether all specified resource sets of the specified application could be activated successfully on the specified processor. If the return value indicates failure, none of the specified resource sets of any of the specified applications will be activated. If the return value indicates success, all resource sets of all specified applications have been activated successfully.

Description:

When a set of resources of an application are made active on a processor, the application can process input events related to the activated resource sets.

Note that the scMakeActive( ) command is issued to activate a set of resources of a set of applications on a single processor. If the active resource sets of an application are to be distributed across two or more processors, multiple scMakeActive( ) commands must be issued.

The adsmGoActive( ) command is issued to the application on the specified processor for each specified resource set.

The Router on the specified processor is informed of the location of the active resource sets of the user and provider applications. This information is sent to the Routers on the specified processor to enable the activated resource sets to communicate or exchange input and output events with the user and provider applications. The rSetActiveMap( ) function provided by the Router is used to provide this mapping information to the Router on the specified processor.

Routers on processors containing user and provider applications are informed of the resource set identifiers (being made active) and the processor ID on which they have been activated. The rSetActiveMap( ) function provided by the Router is used to provide this mapping information to the service user and provider Routers.

The last-resource-set flag is set to true for an application when the application has no more resource sets to be activated in the system. When this flag is set, the System Controller informs the user(s) applications using the appNeighbor Alive( ) API that the application is completely activated. The System Controller also informs the application being activated about the already-activated service provider applications using the appNeighborAlive( ) API. At this point, the application may begin to interact with its user and provider applications.

Note that only full-activated user applications are informed. If a user or provider application is not fully activated, it is not informed that one of its user or provider applications has been fully activated. When pairs of user and provider applications are fully activated, each of them is informed of the status of the other.

In addition to non-critical resource sets, critical resource sets must also be activated. If the list of resource sets to be activated contains a critical resource set, the master copy of the critical resource set will be created on the specified processor.

Note that critical resource sets should be activated explicitly at only one location. Critical shadow resource sets are automatically created as necessary by the System Controller.

Critical shadow resource sets of an application are created on each processor containing either one or more active or standby resource sets of the application. When a critical shadow resource set is created on a processor, the Router on the processor containing the corresponding master copy of the critical resource set is informed of the location of the new critical shadow. This enables the critical master resource set to communicate or broadcast shared database updates to all its existing shadows in a transparent manner. The rAddMcastList( ) function provided by the Router is used to provide this information to the Router.

The Router on the processor containing the newly-created critical shadow resource set is informed of the processor containing the critical master. This enables the critical shadow to send updates to its master resource set in a transparent manner, if required by the application. The rSetMasterMap( ) function provided by the Router is used to provide this information to the Router.

The scMakeActive( ) command is implemented in the System Manager component in the preferred embodiment shown in FIG. 16. The System Manager allows multiple resource sets of multiple protocol layers to be activated on a specified processor in a single make active command.

The following algorithm lists each step of the scMakeActive( ) command. These steps are specific to the architecture components and layout of the preferred embodiment.

```
// This procedure prepares a processor to accept resource sets of the
// specified list of protocol layers (EntityList). To do this, all critical
// resource sets of each entity that are not already present on Processor
// should be created as a shadow on Processor. Note that all entities
// specified in EntityList must be distributed.
// EntityList — List of resource sets per entity that are to be made active
// MasterMappingList — Stores the master processor mapping for each critical
//                    resource set
PrepareNode(Processor, EntityList)
begin
    // For each existing critical resource set specified in EntityList, set
    // master mapping to location of the master critical resource set. This
    // mapping is sent to the router on Processor
    // initialize MasterMappingList to empty
    for (each entity E in EntityList)
    begin
        if (Processor contains an activated resource set of E) then ignore
        E;
            continue with loop
        for (each critical resource set R_r of E)
        begin
            let the master of C_r reside on processor P_x
            add (E:C_r :P_x) to MasterMappingList
        end
    end
    send a rSetMasterMap(MasterMappingList) to message router on
    Processor
    wait for rSetMasterMap( ) confirmation
    // Make standby copies of each critical resource set on Processor if
    they
    // do not already exist on the processor
    // CriticalRsetList: List of all activated critical master resource sets
    //                  for a entity
    initialize CriticalRsetList to empty
    for (each entity E in EntityList)
    begin
        if (Processor contains an activated resource set of E) then ignore
        E;
            continue with loop
        for (each critical resource set R_r of E)
            add C_r to CriticalRsetList
        send a adsmGoStandby(CriticalRsetList) to entity E on Processor
    end
```

```
    wait for all adsmGoStandby( ) confirmations
    // Add the new Processor to each existing critical resource sets
    // multicast lists and set it as the current (temporary) standby to it may
    // receive warmstart messages from the master
    // PxMCastAddList — contains router multicast add mapping
    information per
    //                                processor
    for (each processor P_x in the system)
        initialize P_xMCastAddList to empty
    for (each entity E in EntityList)
    begin
        if (Processor contains an activated resource set of E) then ignore
        E;
            continue with loop
        for (each critical resource set R_r of E)
        begin
            let the master of C_r reside on processor P_x
            add (E:C_r :Processor) to P_xMCastAddList
        end
    end
    for (each processor P_x in the system)
        if (P_xMCastAddList is empty) then continue with loop
        send rAddMcastList(P_xMCastAddList) to router on P_x
        send a rSetStandbyMap(P_xMCastList) to router on P_x
    end
    wait for rAddMcastList( ) confirmations
    wait for rSetStandbyMap( ) confirmations
    // make each critical master resource set warmstart the new shadows
    // created on Processor.
    for (each entity E in EntityList)
    begin
        if (Processor contains an activated resource set of E) then ignore
        E;
            continue with loop
        for (each critical resource set R_r of E)
        begin
            let the master of C_r reside on processor P_x
            send a adsmWarmStart (C_r) to entity E on processor P_x
        end
    end
    wait for adsmWarmStart( ) confirmations
    return ROK
end PrepareNode operation.
----------------
// This procedure makes the specified resource sets of the specified entity
// active on the specified processor. EntityResourceList specifies a list of
// resource sets to be activated for each entity.
//
// EntityResourceList — List of resource sets per entity that are to be made
//                     active
// DepMapping — List to store the user provider mapping to be
downloaded on
//              the router
// P_aMapList — Mapping information for router on Processor P_a
// EntityMapping — List of router mapping information for resource sets
// MulticastDestinations — Lst of processors where shadows are to be
created scMakeActive(Processor, EntityResourceList)
begin
    // First, for each entity being activated on Processor, the entities
    // User/Provider resource set mappings are provided to the router on
    // Processor
    Step A: Download available User/Provider mapping information
    initialize dependency mapping list DepMapping to empty
    for (each entity E in EntityResourceList)
    begin
        if (Processor contains an activated resource set of E) then ignore
        E;
            continue with loop
        for (each user entity U of entity E)
        begin
            if (entity U is not distributed)
                let U reside on processor P_x
                add (U:all :P_x) to the DepMapping list
            else
                for (each activated resource set R_u of user entity U)
                    let R_u reside on processor P_x
                    add (U:R_u :P_x) to the DepMapping list
        end
```

```
            for (each provider entity P of entity E)
            begin
                if (entity P is not distributed)
                    let P reside on processor P_x
                    add (P:all :P_x) to the DepMapping list
                else
                    for (each activated resource set R_p of provider entity P)
                        let R_p reside on processor P_x
                        add (P:R_p :P_x) to the DepMapping list
            end
        end
        send a rSetActiveMap(DepMapping) command to the Message
Router on Processor
        wait for rSetActiveMap( ) confirmation
        // For each entity being activated on Processor, make sure that all the
        // critical resource set shadows exist on the processor. If not, make
        // them standby there and warmstart them. All this is achieved by the
        // PrepareNode( ) function.
        Step B: Create existing critical resource set Shadows on new
            processor if they don't exist create a list of distributed only entities
            in EntityList from EntityResourceList
        call PrepareNode(Processor, EntityList)
        // For each new resource set coming up on Processor, their mappings
have to   // be downloaded to routers on all processors that contain the
        // entities service users and service providers.
        // The form of mapping information depends on whether the user/
        // provider is distributed and whether the entity being activated is
        // distributed. Note that mapping lists are constructed on a per
        // processor basis and then downloaded to the respective processors
        // with one download command for both service users and service
        // providers
        Step C: Download new active mappings to adjacent Message Routers
        for (each active processor P_a)
            initialize its router mapping list P_aMapList to empty
        for (each entity E in EntityResourceList)
        begin
            if (entity E is a conventional protocol layer) then ignore E;
                continue with loop
            initialize EntityMapping to empty
            if (entity E is not distributed)
                add (E:all:Processor) to EntityMapping
            else
                for (each resource set R_a of E in EntityResourceList)
                    add (E:R_a :Processor) to EntityMapping
            for (each user entity U of entity E)
            begin
                if (entity U is not distributed)
                begin
                    // Entity U contains one resource set — U is not
                    distributed let entity U reside on processor P_a
                    add EntityMapping to P_a router mapping list P_aMapList
                        if it is not present
                end
                else begin
                    // Entity U contains multiple resource sets — U is
                    distributed for (each resource set R_u of entity U)
                    begin
                        let R_u reside on processor P_a
                        add EntityMapping to router mapping list P_a
                        MapList if it is not present
                    end
                end
            end
            for (each provider entity P of entity E)
            begin
                if (entity P is not distributed)
                begin
                    // Entity P contains one resource set — P is not
                    distributed let entity P reside on processor P_a
                    add EntityMapping to P_a router mapping list P_a
                    MapList if it is not present
                end
                else begin
                    // Entity P contains multiple resource sets - P is
                    distributed for (each resource set R_p of entity P)
                    begin
                        let R_p reside on processor P_a
                        add EntityMapping to router mapping list P_a
                        MapList if it is not present
                    end
                end
            end
        end
        for (each active processor P_a)
            if (P_aMapList is not empty)
                send a rSetActiveMap(P_aMapList) to router on processor P_a
        wait for all rSetActiveMap( ) confirmations
        // Send the adsmGoActive command to all entities whose resource
        // sets have been activated on Processor. This will make the specified
        // resource sets active on the processor.
        //
        Step D: Activate new resource sets on new processor
        for (each entity E in EntityResourceList)
        begin
            initialize entities resource set list RsetList to empty
            if (entity E is not distributed)
                add all to RsetList
            else
                for (each resource R of E in EntityResourceList)
                    add (R:seqNo=0:mId=<crnt-rset-masterId:disable-
                        PeerSap>) to RsetList
            send adsmGoActive(RsetList) to entity E on Processor
        end
        wait for all adsmGoActive( ) confirmations
        // If any critical resource sets were activated on Processor by this
        // command, their shadow resource sets should be created on other
        // processors containing any resource sets of the entity.
        //
        Step E: For new critical resource Sets, create shadows on existing
processors
        for (each distributed entity E in EntityResourceList)
        begin
            initialize MulticastDestinations to empty
            for (each active processor P_a)
            begin
                if (P_a == Processor) then ignore P_a; continue
                if (P_a contains any resource set of entity E)
                    add P_a to MulticastDestinations
            end
            for (each critical resource C_r of E in EntityResrouceList)
            begin
                for (each P_a in MulticastDestinations)
                    send rSetMasterMap (E:C_r :Processor) to router on P_a
                wait for all rSetMasterMap( ) confirmations
                Initialize MulticastList to empty
                for (each P_a in MulticastDestinations)
                begin
                    send adsmGoStandby(C_r) to entity E on P_a
                    add P_a to MulticastList
                end
                wait for all adsmGoStandby( ) confirmations
                send a rAddMcastList (E:C_r :MulticastList) to message
                    router on Processor
                wait for rAddMcastList( ) confirmation
                for (each P_a in MulticastDestinations)
                begin
                    send a rSetStandbyMap(E:C_r :P_a) to message router
                    on Processor wait for rSetStandbyMap( ) confirmation
                    send adsmWarmStart(C_r) to E on Processor
                    wait for adsmWarmStart( ) confirmation
                end
            end
        end
        //
        Step F: Initiate Neighbor alive with adjacent Lower Layer
        for (each entity E in EntityResourceList)
        begin
            if (entity E is distributed)
                if (if lastProc flag for E is FALSE) then ignore E; continue
                    with loop
            for (each provider entity P of entity E)
            begin
                if (entity P is not distributed AND P has not been activated)
                    ignore entity P, continue with loop
```

-continued

```
        if (entity P is distributed AND all resource sets of P have not
                been activated)
            ignore entity P, continue with loop
        if (entity E is not distributed)
            if(P is a conventional protocol layer)
            begin
                let P be active on processor P_x
                send a appNeighborAlive(P, P_x) to E on Processor
            else
                send a appNeighborAlive(P, None) to E on Processor
        else begin
            let R_MGMT be the management resource set of entity E
            let R_MGMT reside on processor P_MGMT
            if(P is a conventional protocol layer)
            begin
                let P be active on processor P_x
                send a appNeighborAlive(P, P_x) to E:R_MGMT on
                    P_MGMT
            else
                send a appNeighborAlive(P, None) to E:R_MGMT on
                    P_MGMT
            end
        end
    end
    wait for all appNeighborAlive( ) confirmations
    //
    Step G: Initiate Neighbor alive with adjacent Upper Layer
    for (each entity E in EntityResourceList)
    begin
        if (entity E is distributed)
            if (if lastProc flag for E is FALSE) then ignore E; continue
                with loop
        for (each user entity U of entity E)
        begin
            if (entity U is not distributed AND U has not been
                activated)
                ignore entity U, continue with loop
            if (entity U is distributed AND all resource sets of U have
                not been activated)
                ignore entity U, continue with loop
            if (entity U is not distributed)
                let entity U reside on processor P_a
                    if(E is a conventional protocol layer)
                    begin
                        let E be active on processor P_x
                        send a appNeighborAlive(E, P_x) to U on P_a
                    else
                        send a appNeighborAlive(E, None) to U
                            on P_a
            else
                let R_MGMT be the management resource set of entity U
                let R_MGMT reside on processor P_MGMT
                if(E is a conventional protocol layer)
                begin
                    let E be active on processor P_x
                    send a appNeighborAlive(E, P_x) to U:R_MGMT on
                        P_MGMT
                else
                    send a appNeighborAlive(E, None) to U:R_MGMT
                        on P_MGMT
            end
        end
    wait for all appNeighborAlive( ) confirmations
    //
    send scMakeActive( ) confirmation
    //
end of scMakeActive( ) operation
```

Figure 18:
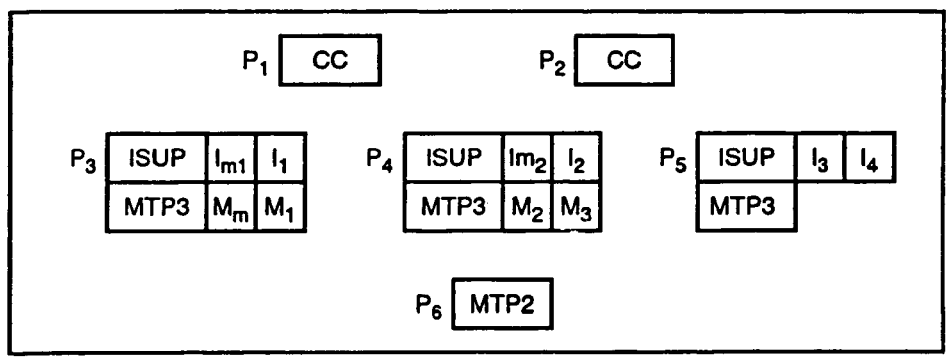
FIG. 18 illustrates a reference diagram with distributed and fault-tolerant layers in an SS7 stack.
Figure 19:
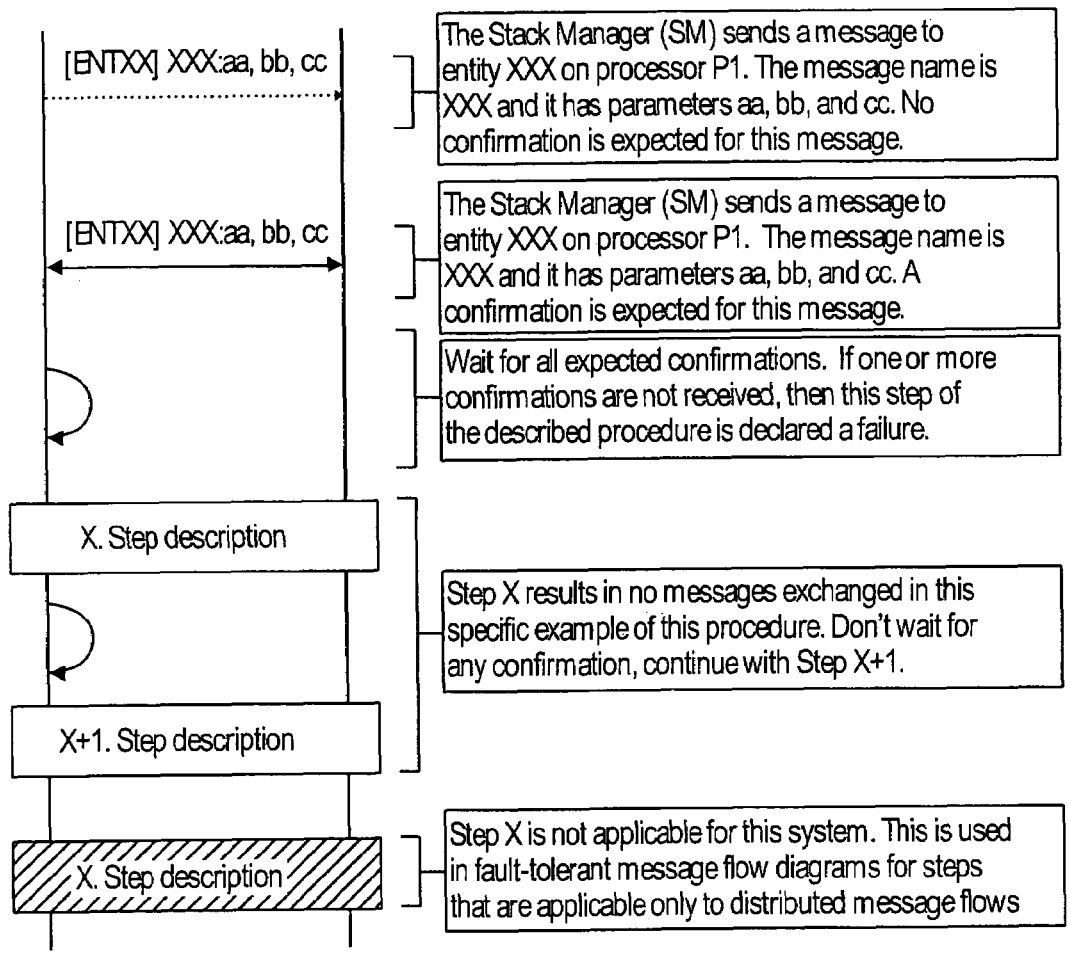
FIG. 19 illustrates message flow conventions used in the flow diagrams.
Figure 20:
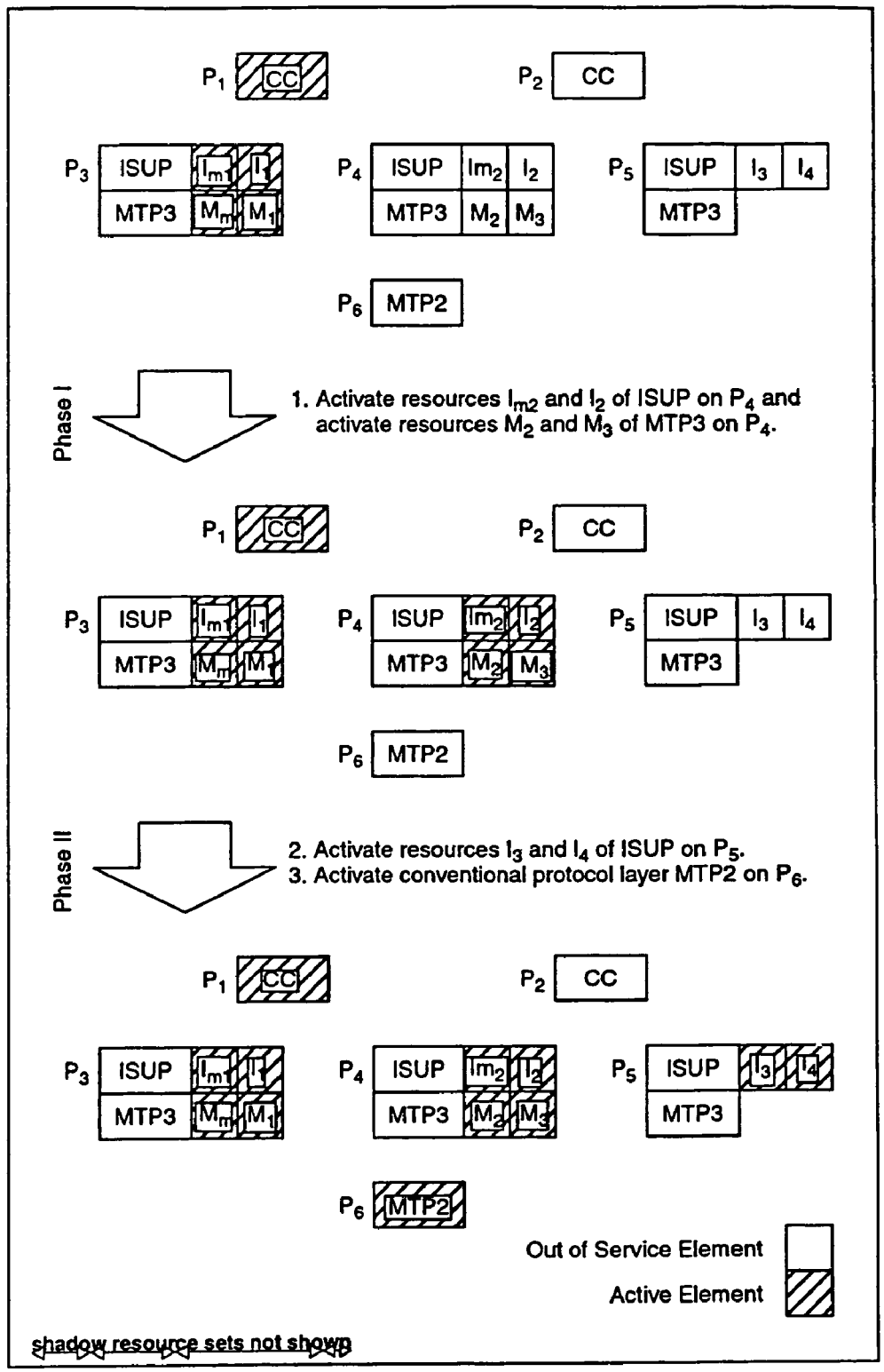
FIG. 20 illustrates the Make Active: system state change.
Figure 21:
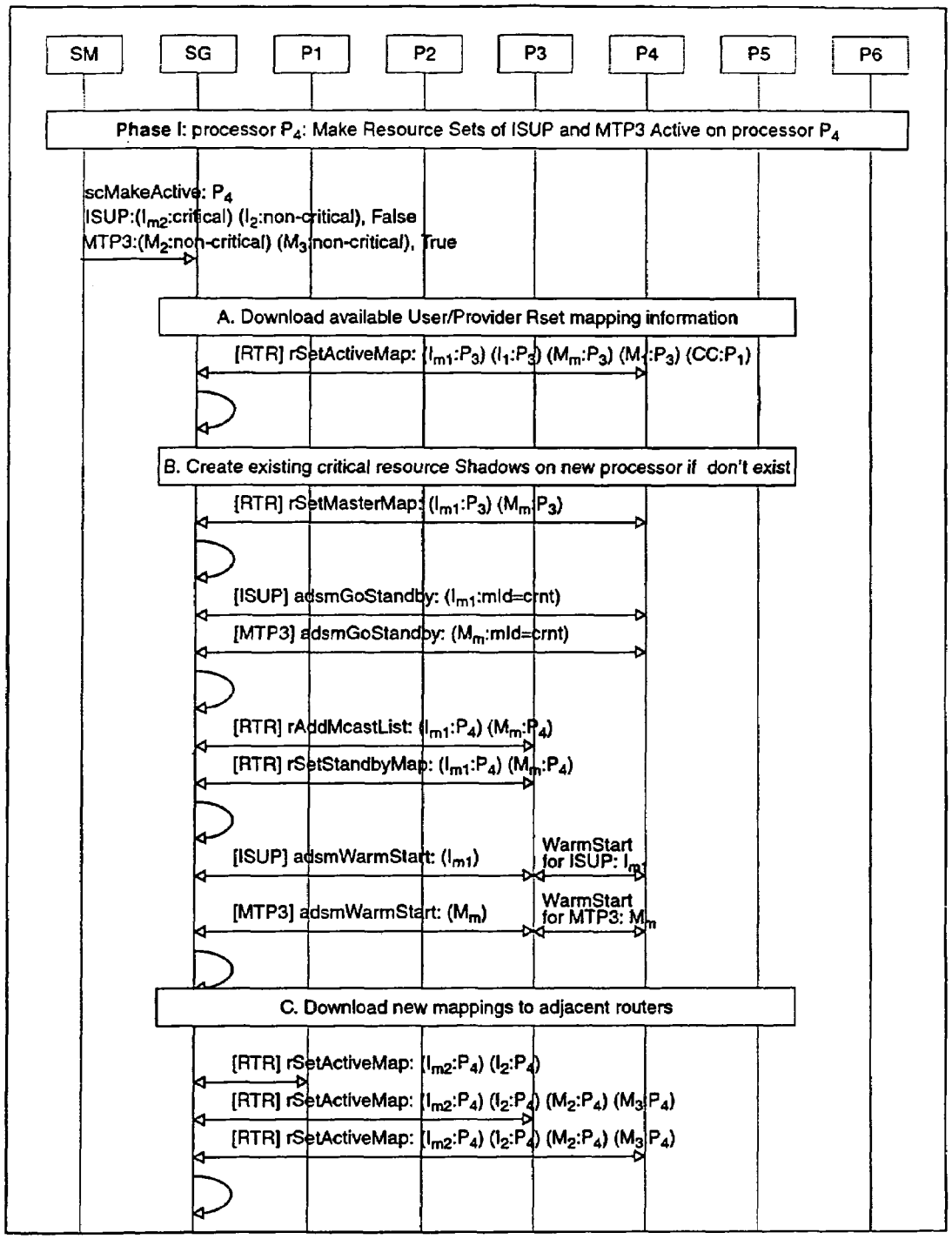
FIG. 21 illustrates the message flow: Make Active operation (1 of 6)
Figure 22:
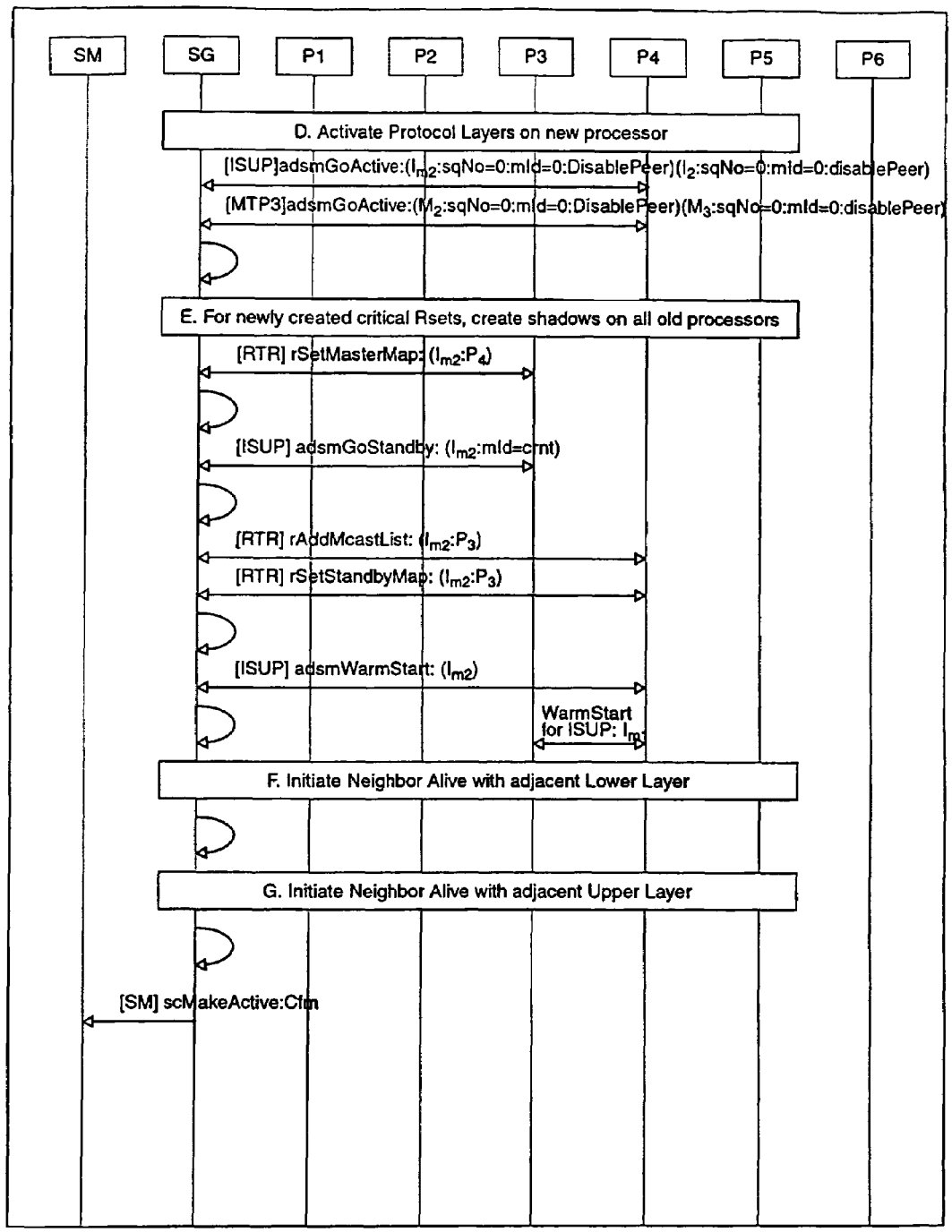
FIG. 22 illustrates the message flow: Make Active operation (2 of 6)
Figure 23:
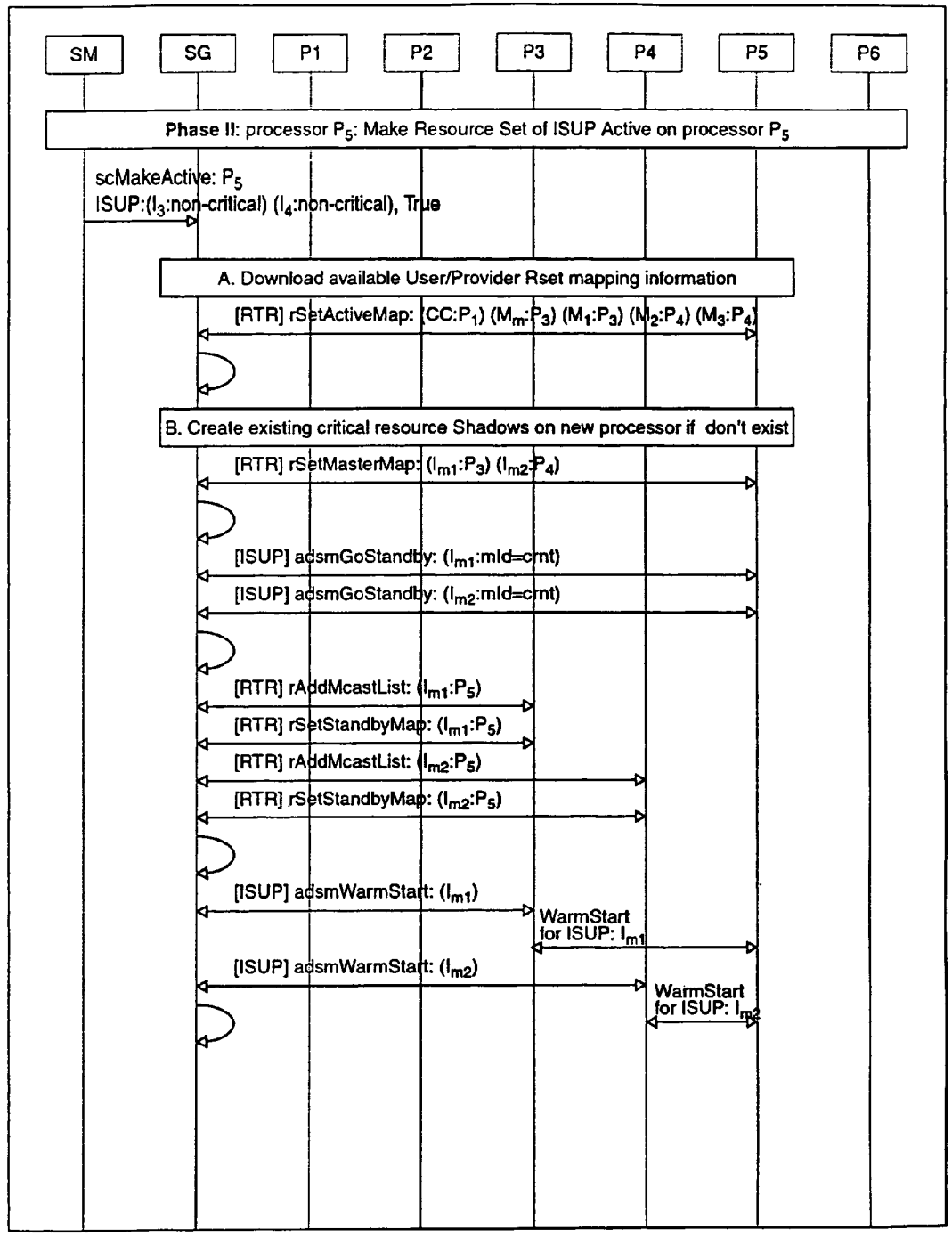
FIG. 23 illustrates the message flow: Make Active operation (3 of 6)
Figure 24:
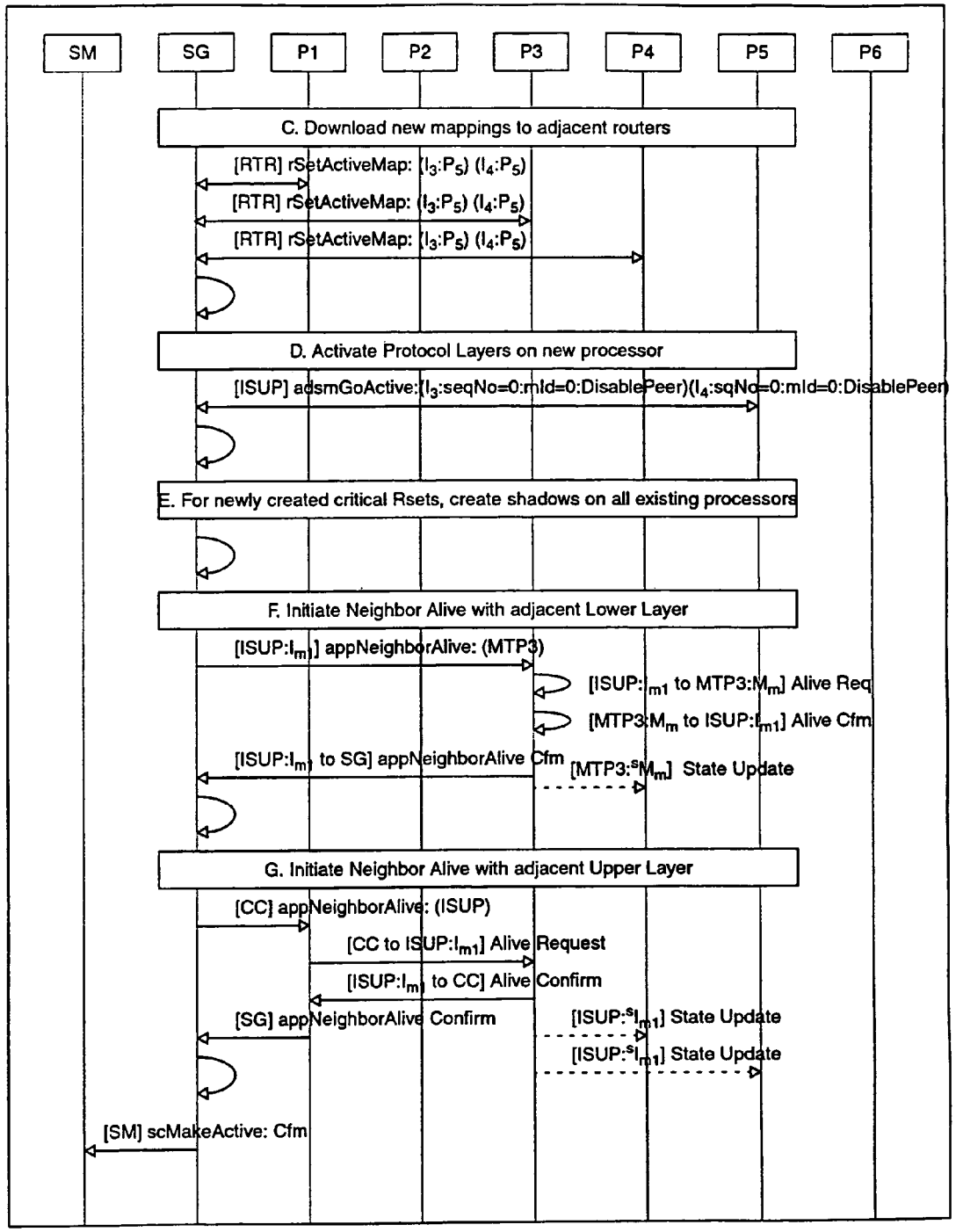
FIG. 24 illustrates the message flow: Make Active operation (4 of 6)
Figure 25:
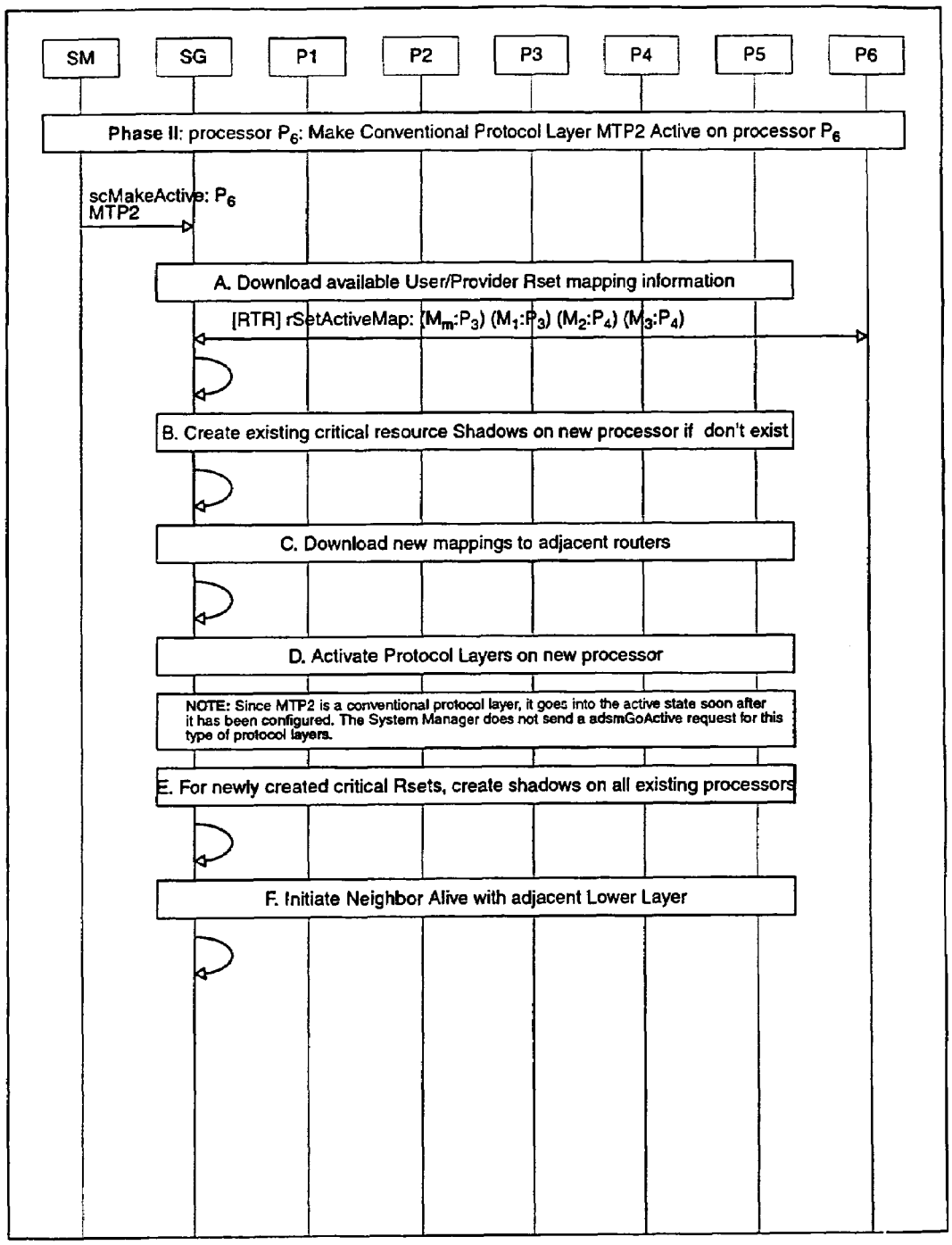
FIG. 25 illustrates the message flow: Make Active operation (5 of 6)
Figure 26:
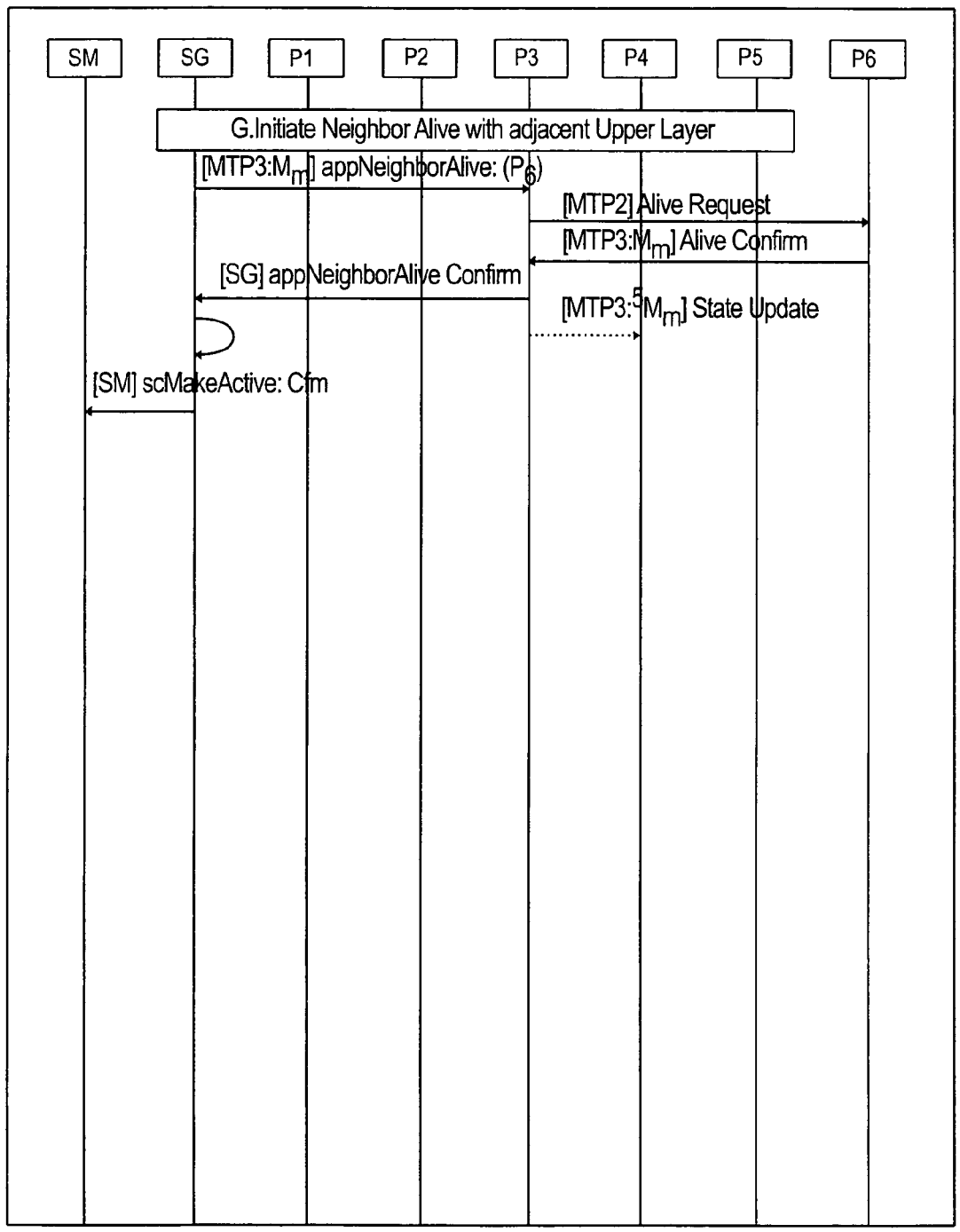
FIG. 26 illustrates the message flow: Make Active operation (6 of 6)
Figure 27:
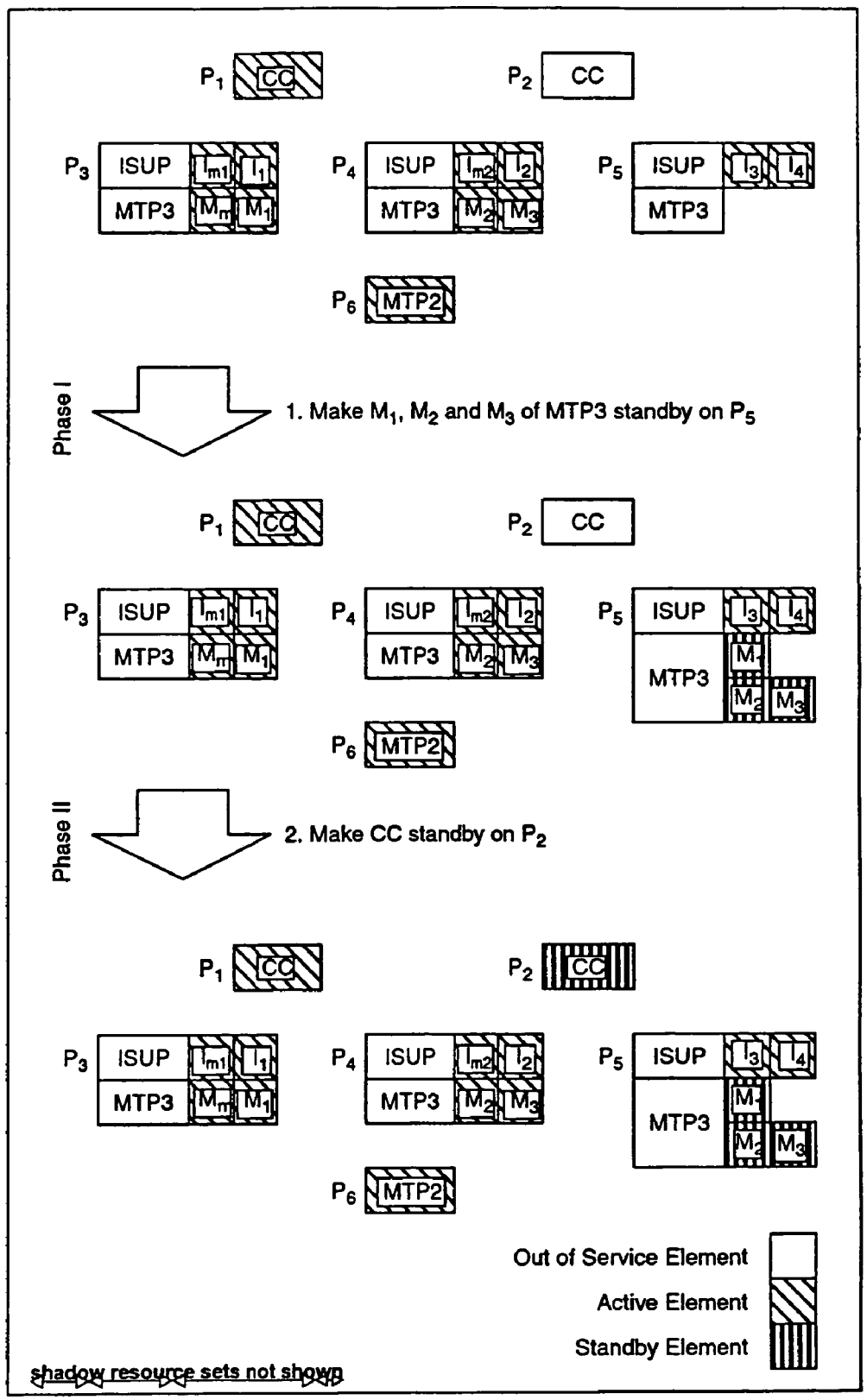
FIG. 27 illustrates the Make Standby: system state change.
Figure 28:
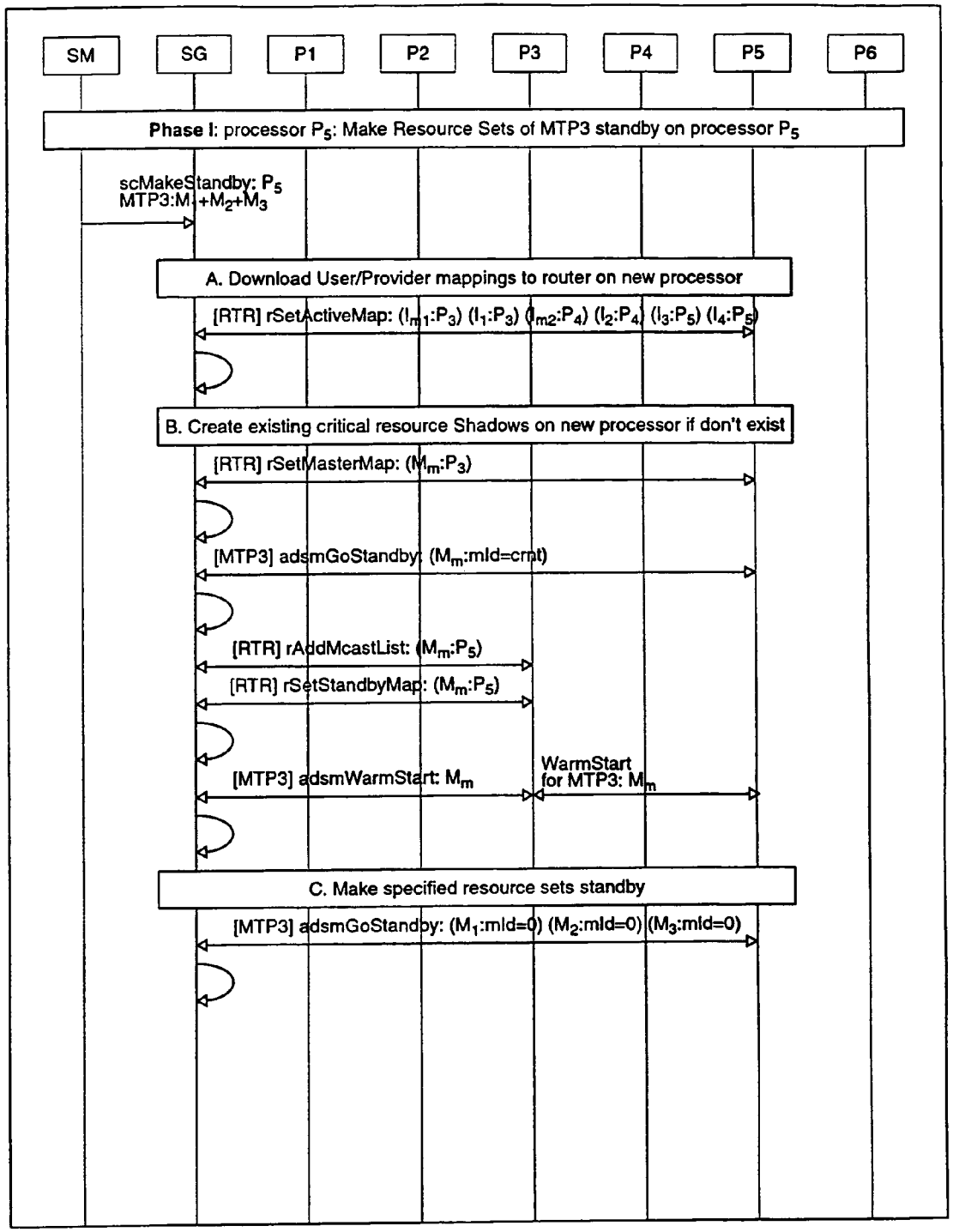
FIG. 28 illustrates the Make Standby: scenario (1 of 3)
Figure 29:
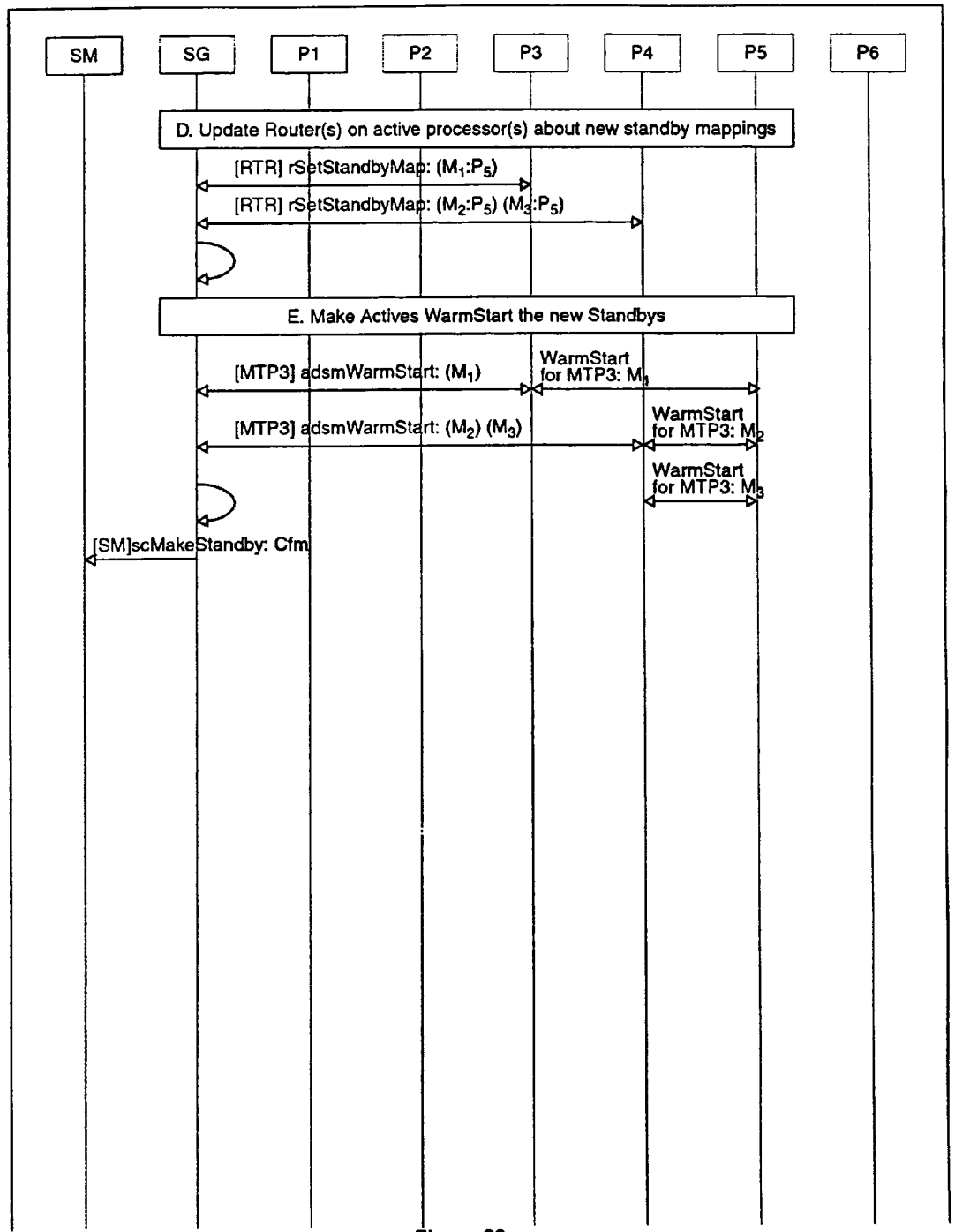
FIG. 29 illustrates the Make Standby: scenario (2 of 3)
Figure 30:
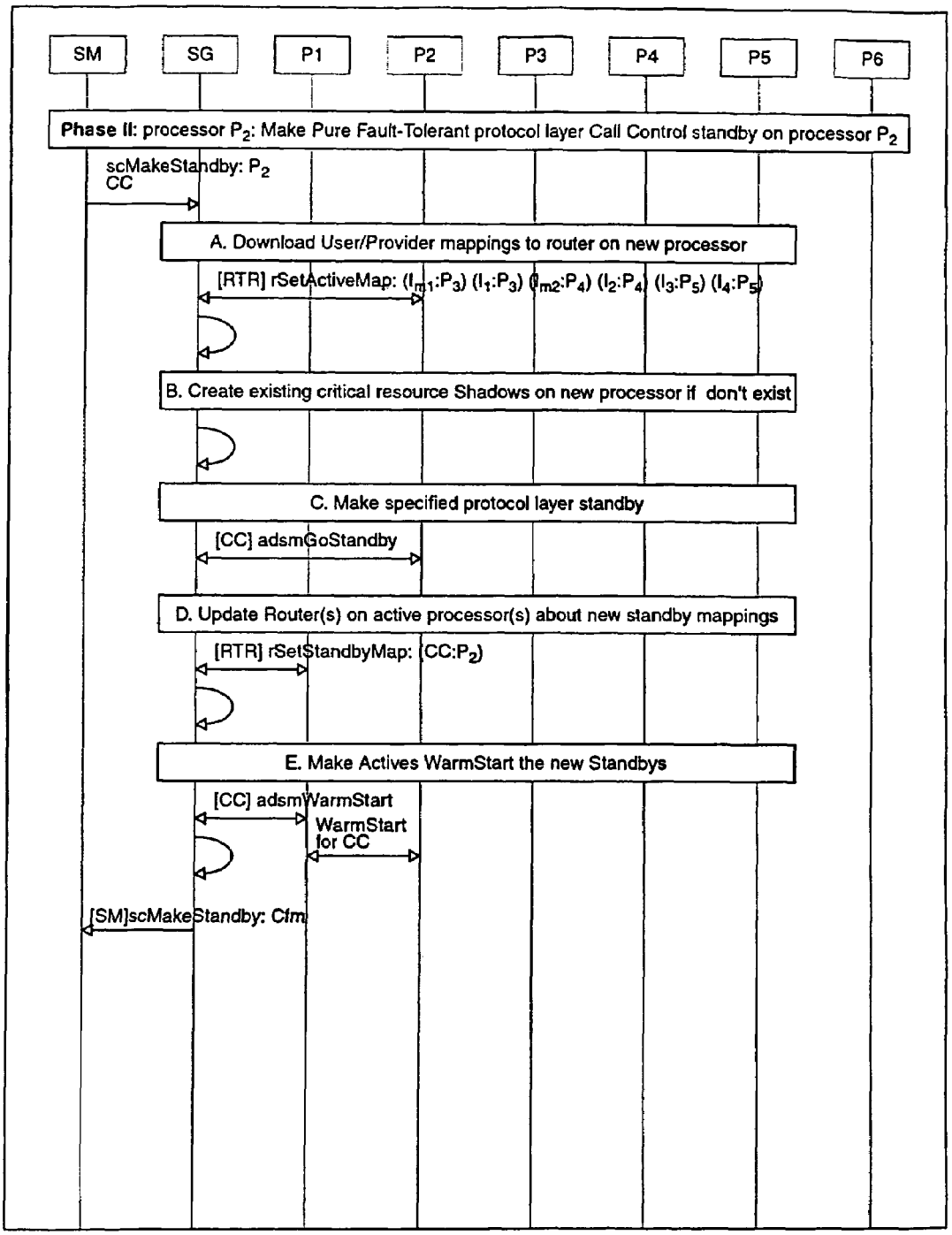
FIG. 30 illustrates the Make Standby: scenario (3 of 3)
Figure 31:
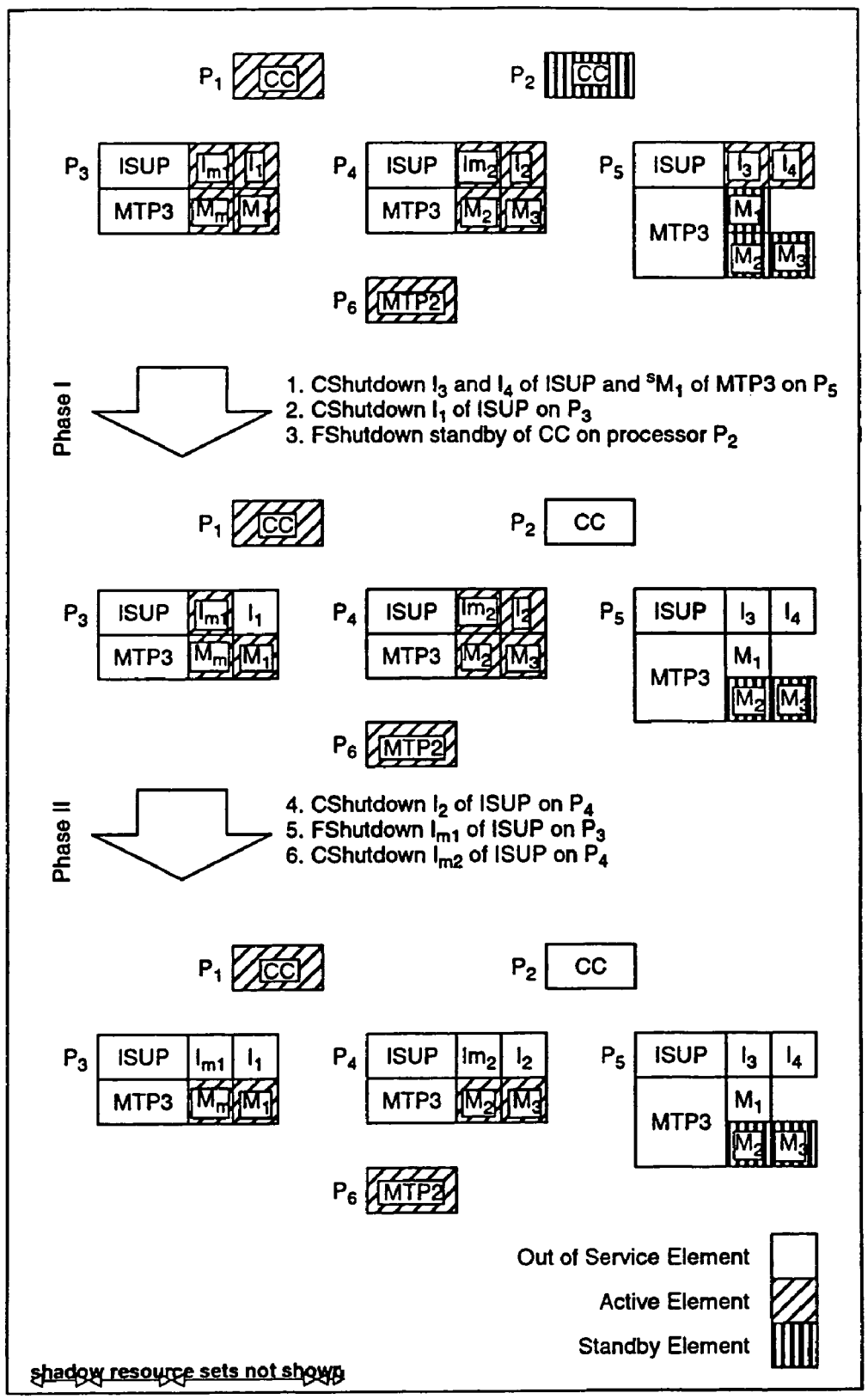
FIG. 31 illustrates the Shutdown: system state change.
Figure 32:
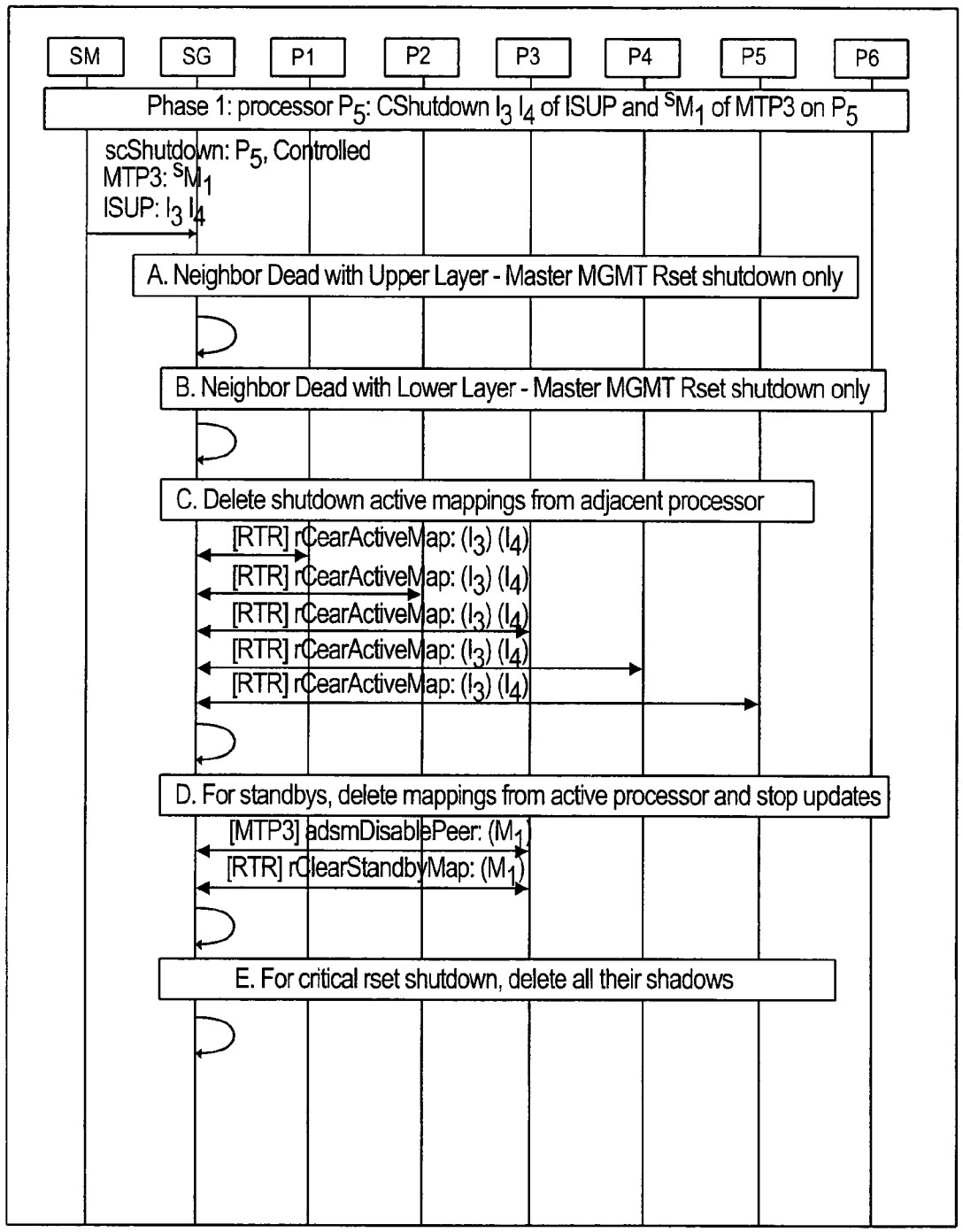
FIG. 32 illustrates the Shutdown: scenario (1 of 12)
Figure 33:
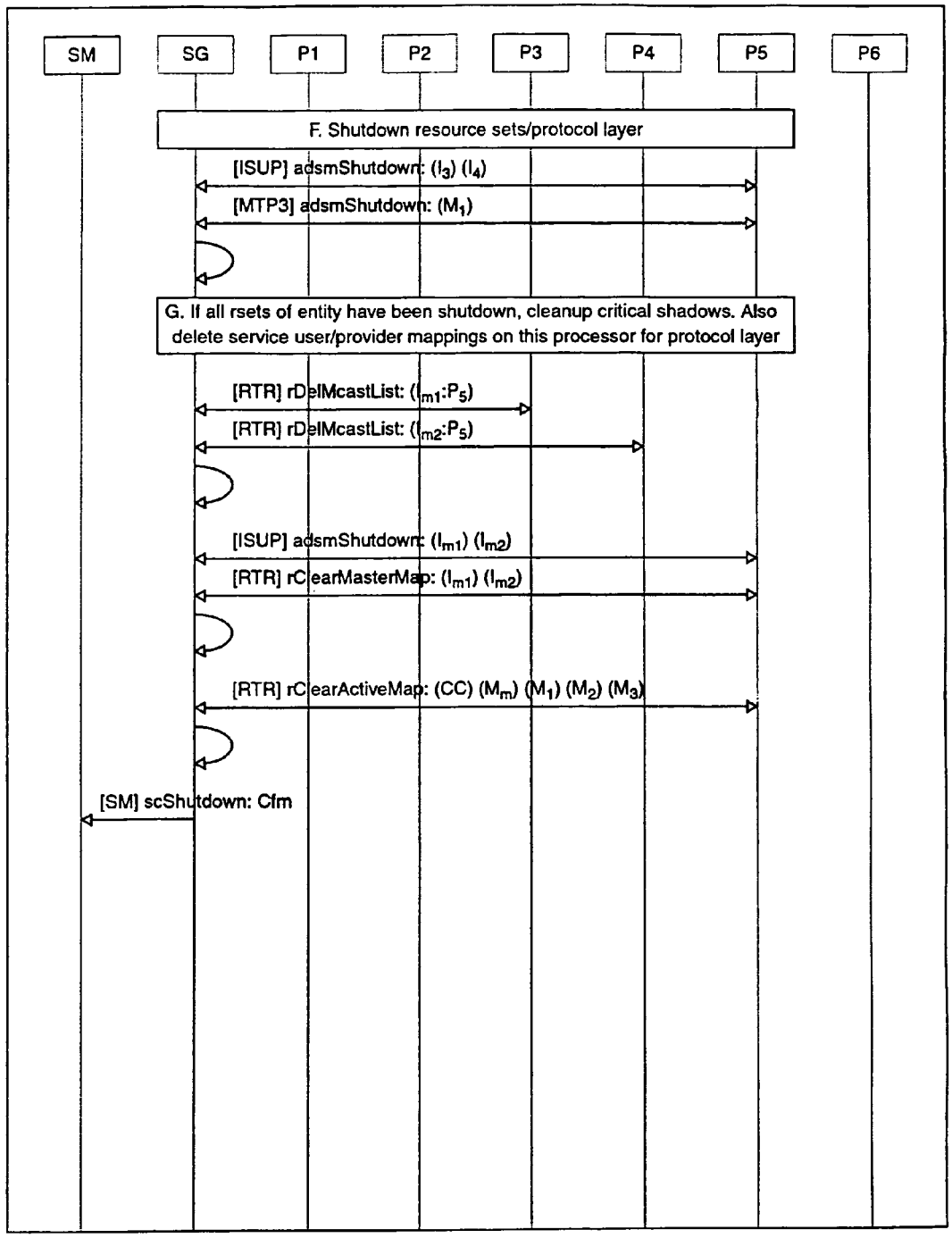
FIG. 33 illustrates the Shutdown: scenario (2 of 12)
Figure 34:
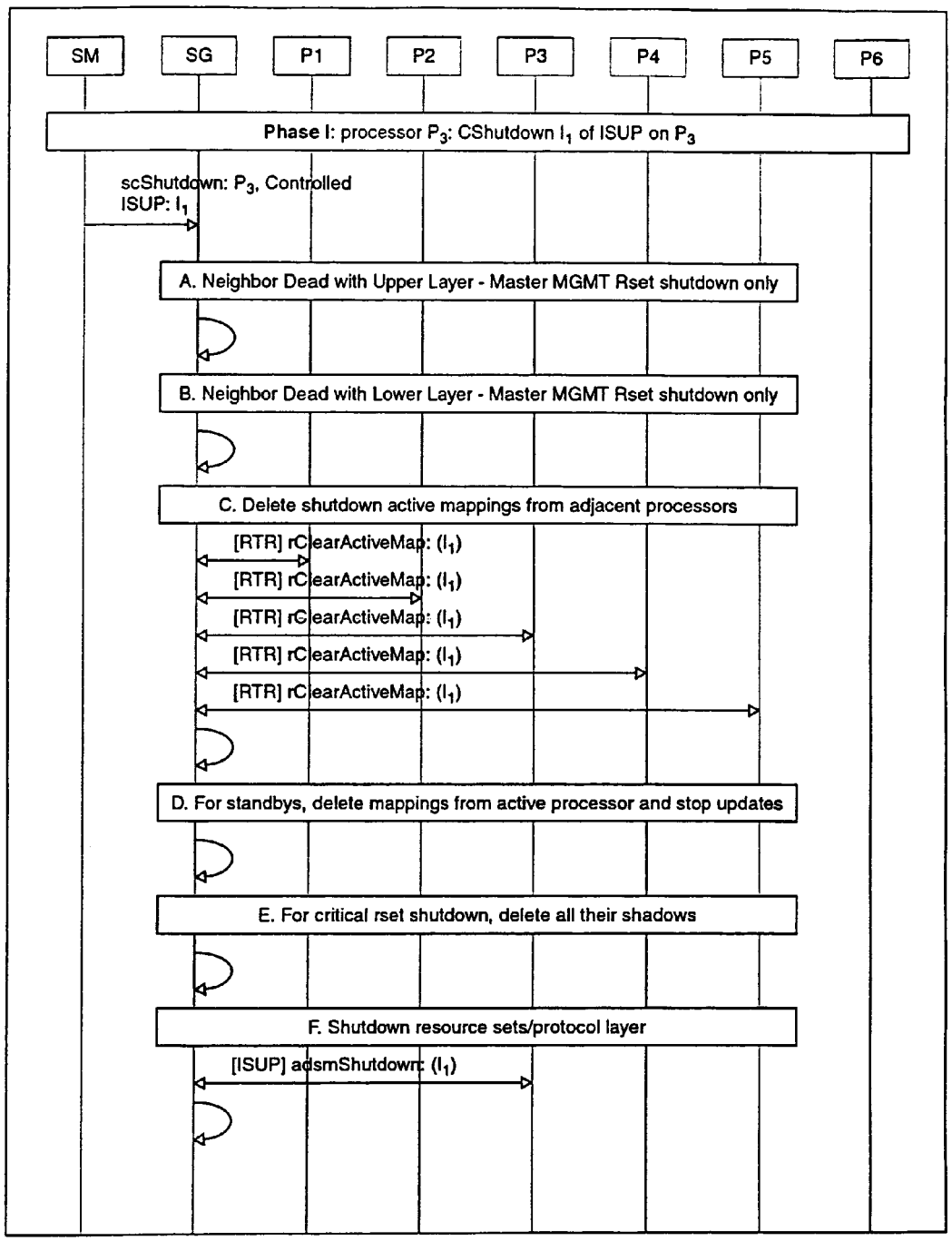
FIG. 34 illustrates the Shutdown: scenario (3 of 12)
Figure 35:
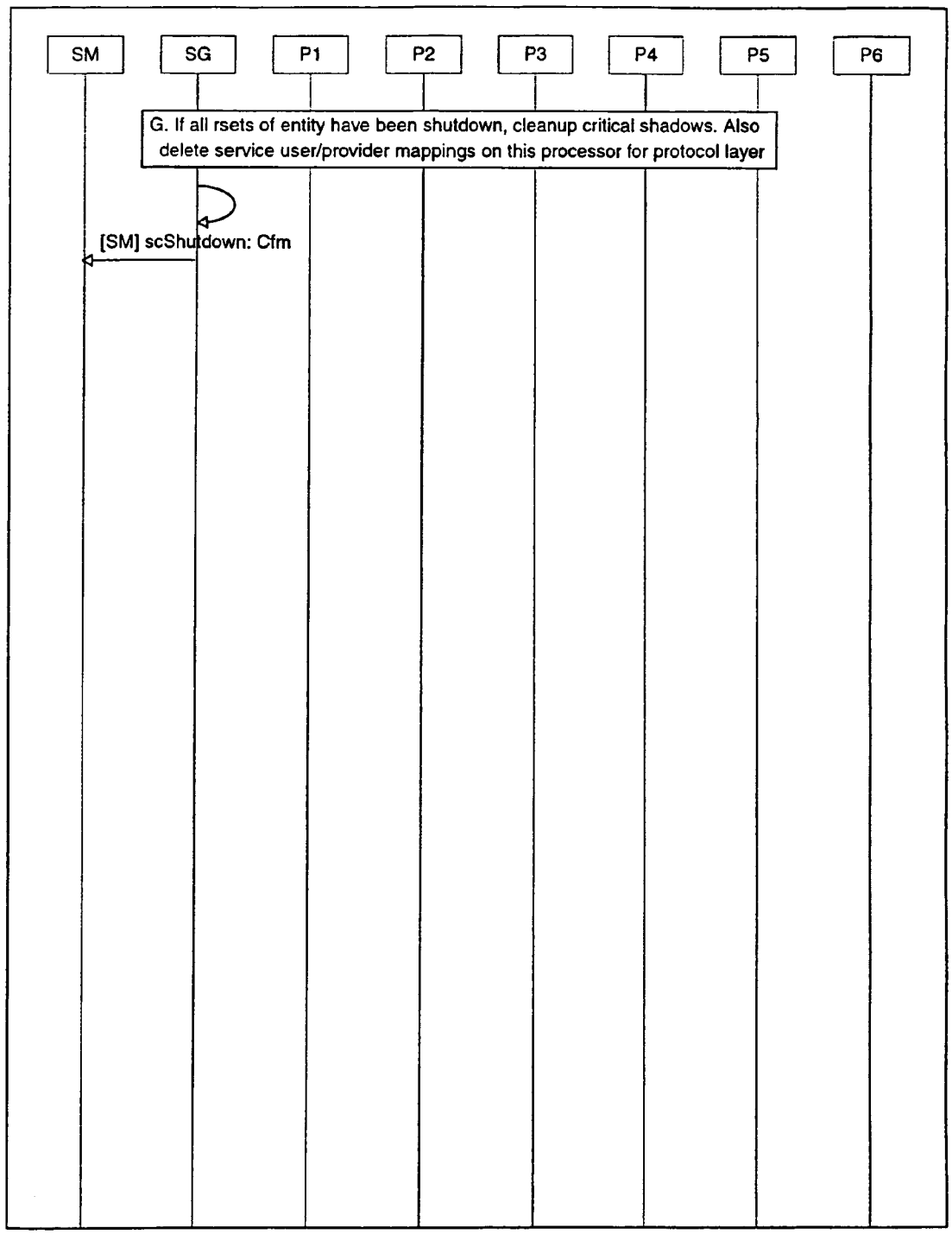
FIG. 35 illustrates the Shutdown: scenario (4 of 12)
Figure 36:
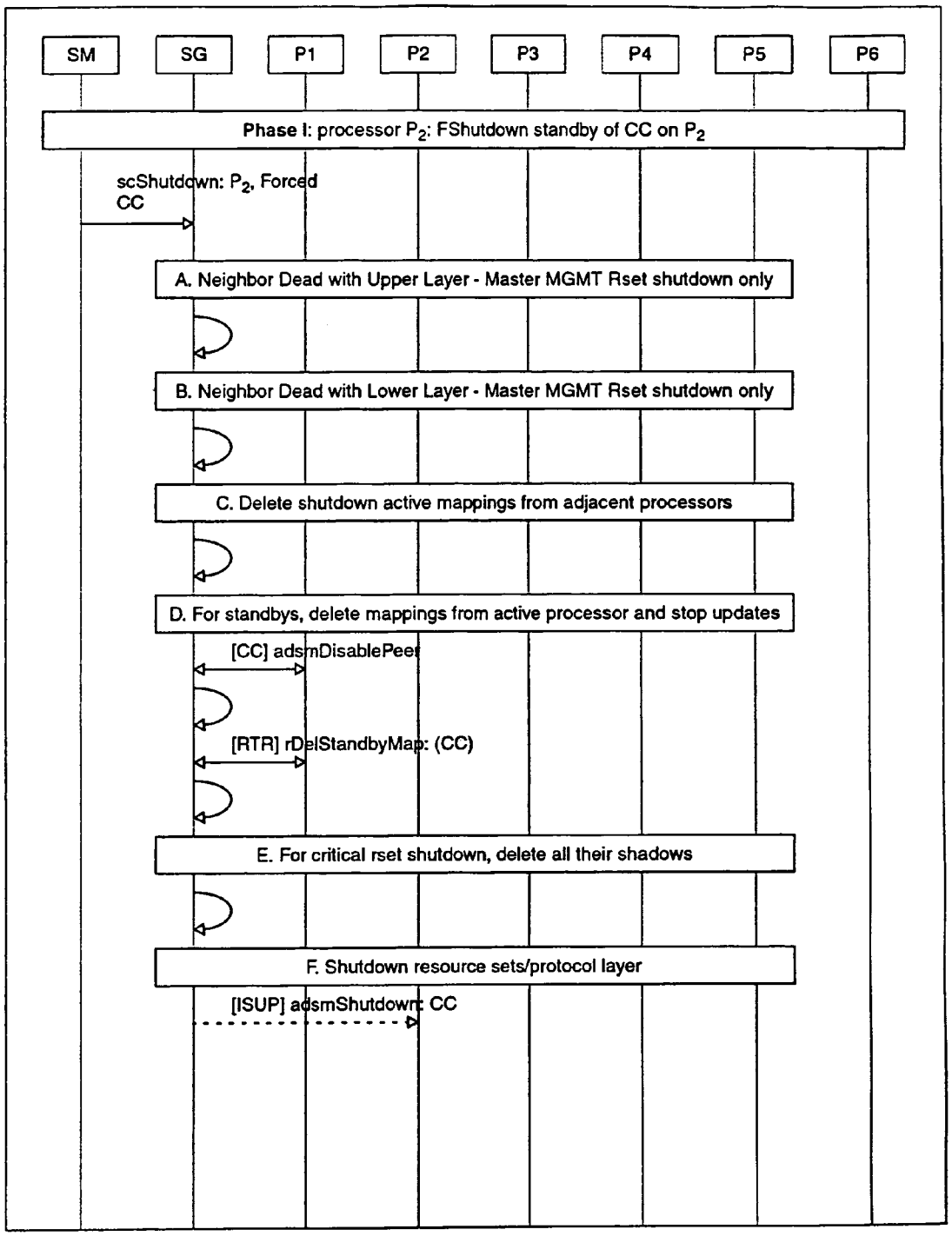
FIG. 36 illustrates the Shutdown: scenario (5 of 12)
Figure 37:
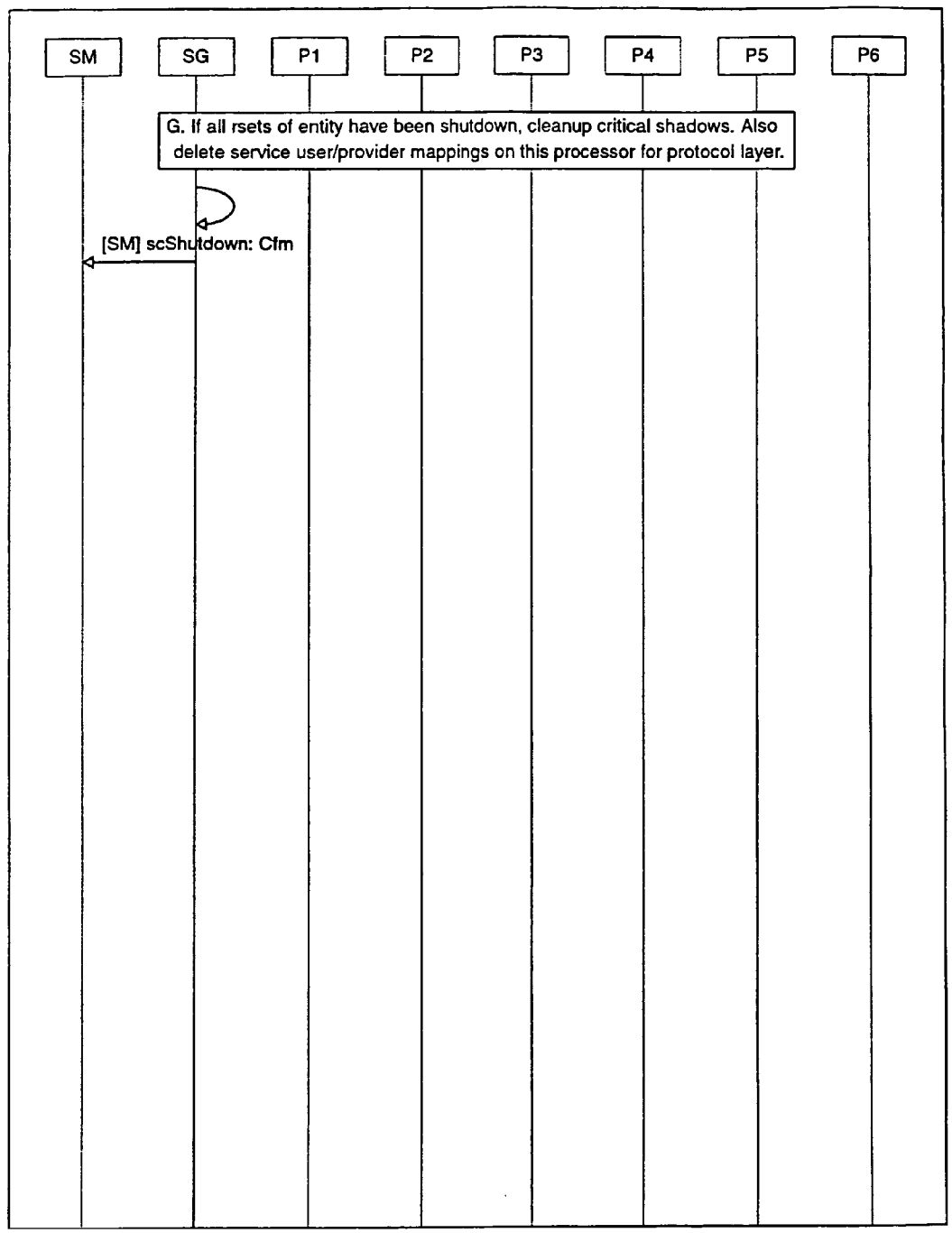
FIG. 37 illustrates the Shutdown: scenario (6 of 12)
Figure 38:
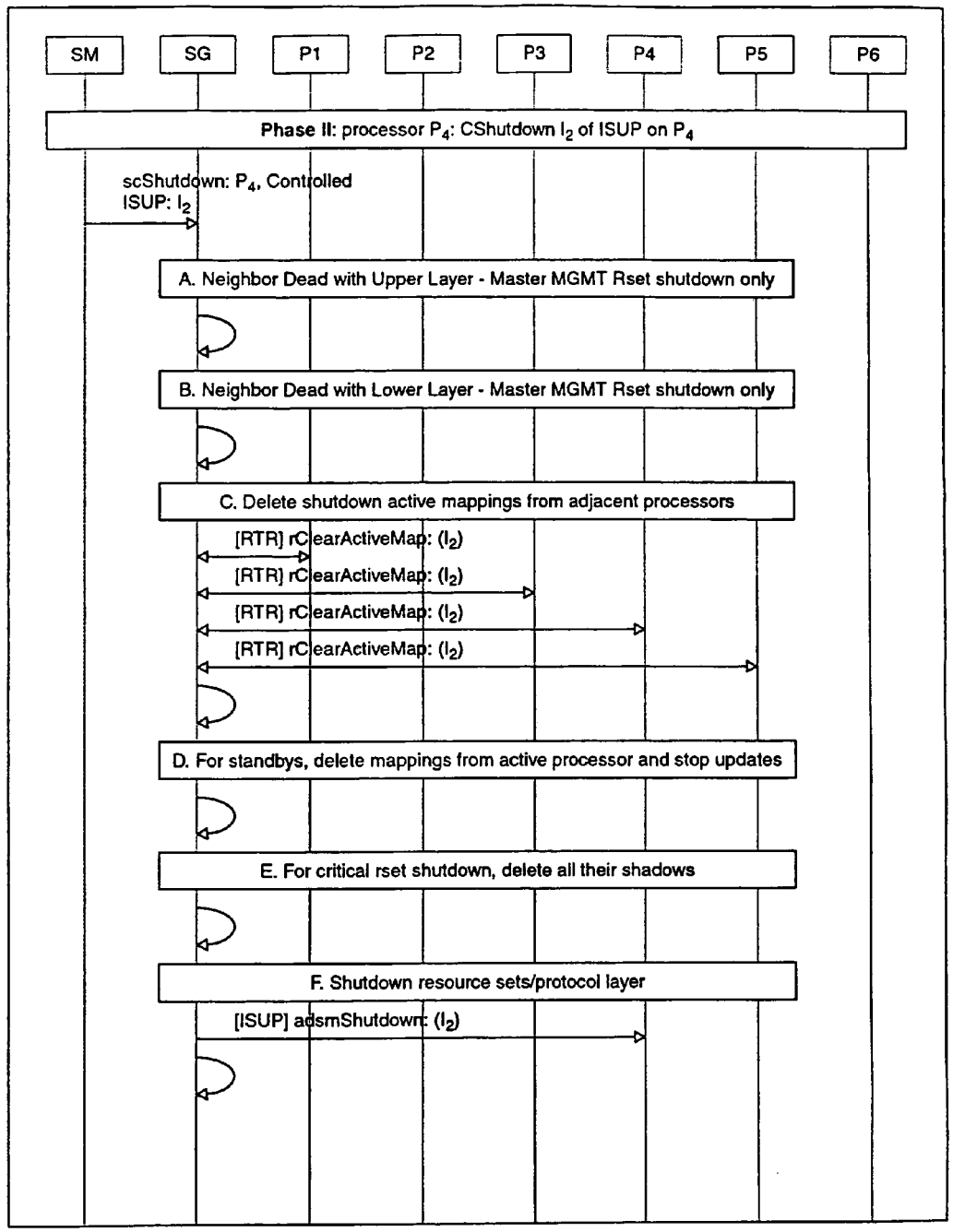
FIG. 38 illustrates the Shutdown: scenario (7 of 12)
Figure 39:
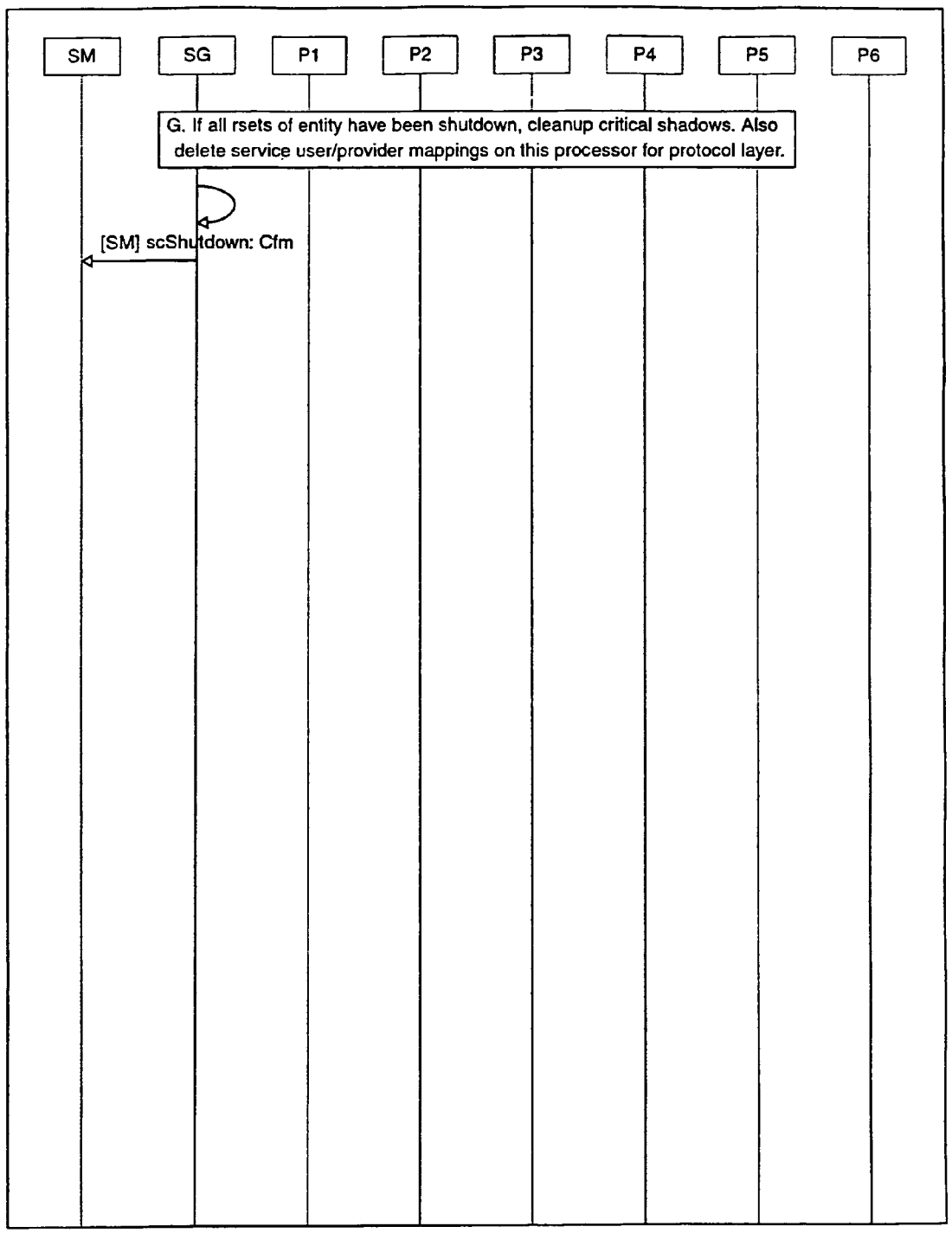
FIG. 39 illustrates the Shutdown: scenario (8 of 12)
Figure 40:
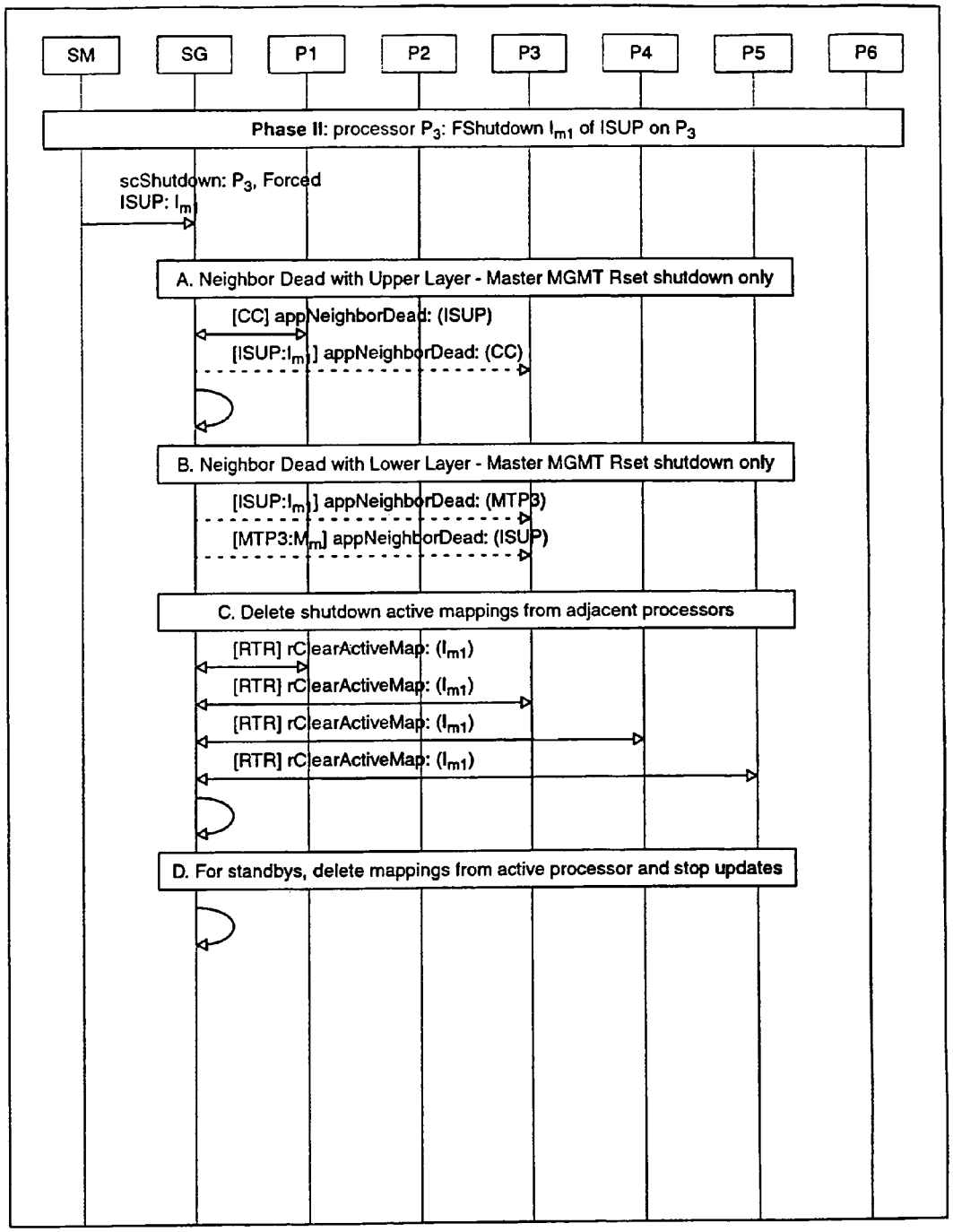
FIG. 40 illustrates the Shutdown: scenario (9 of 12)
Figure 41:
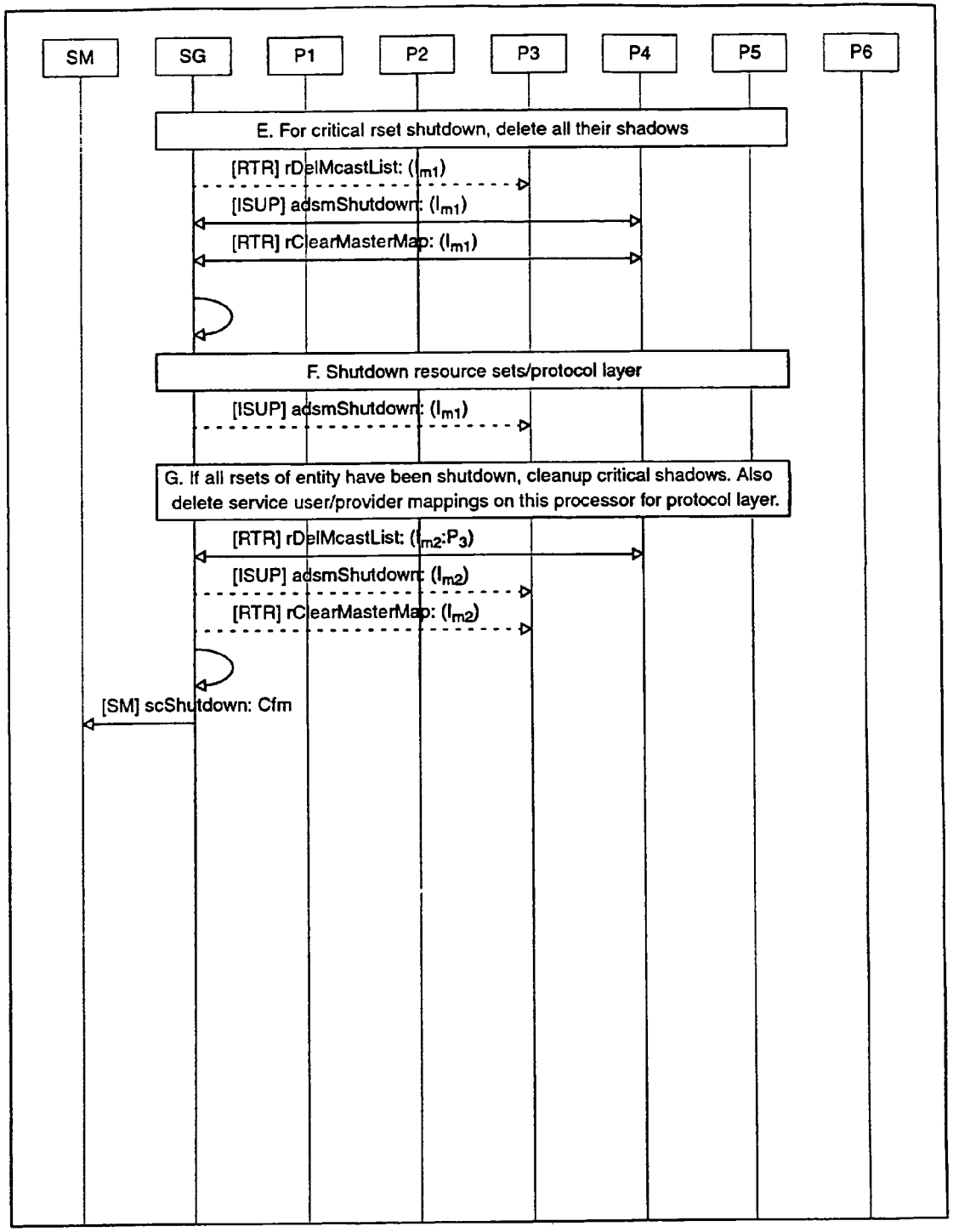
FIG. 41 illustrates the Shutdown: scenario (10 of 12)
Figure 42:
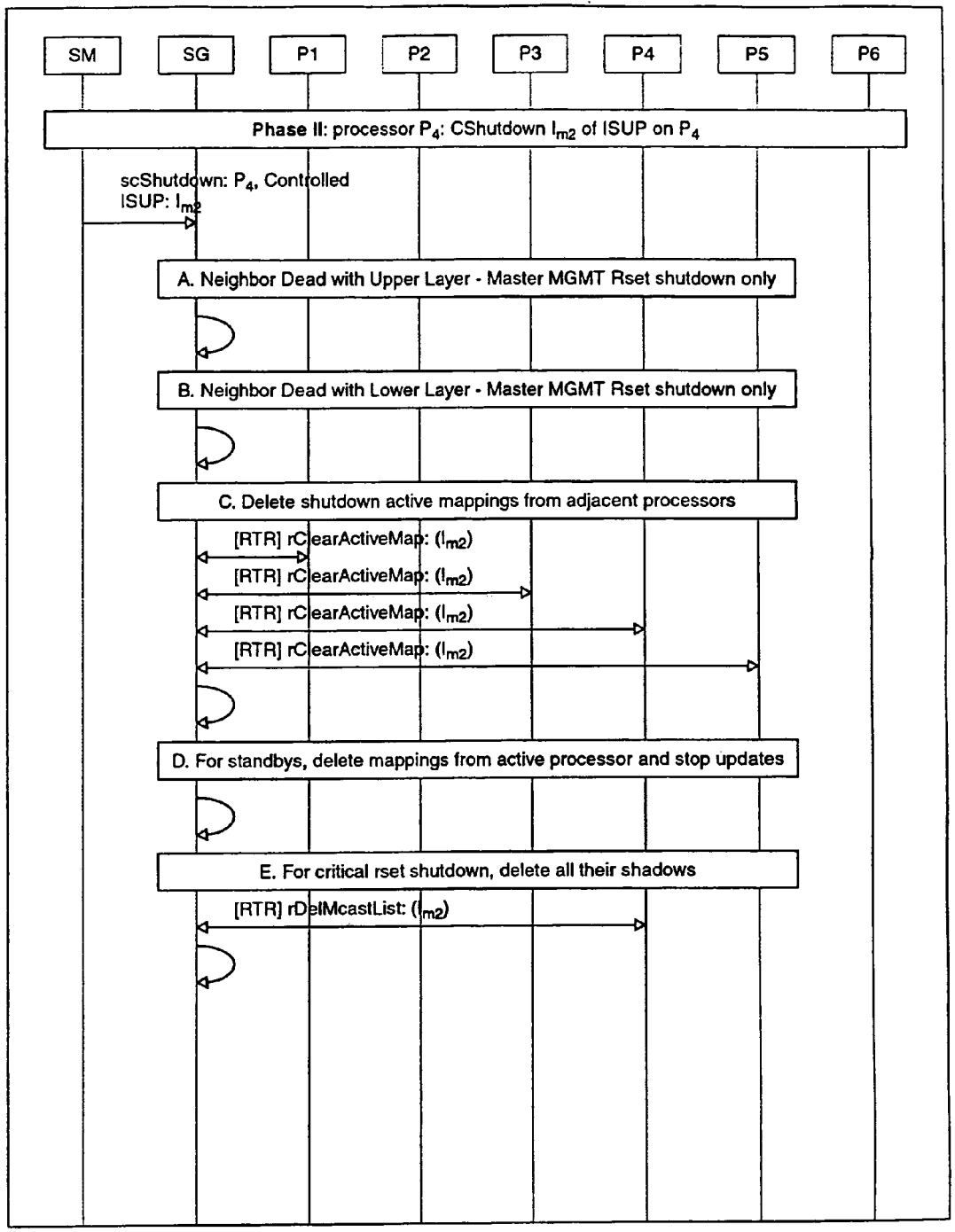
FIG. 42 illustrates the Shutdown: scenario (11 of 12)
Figure 43:
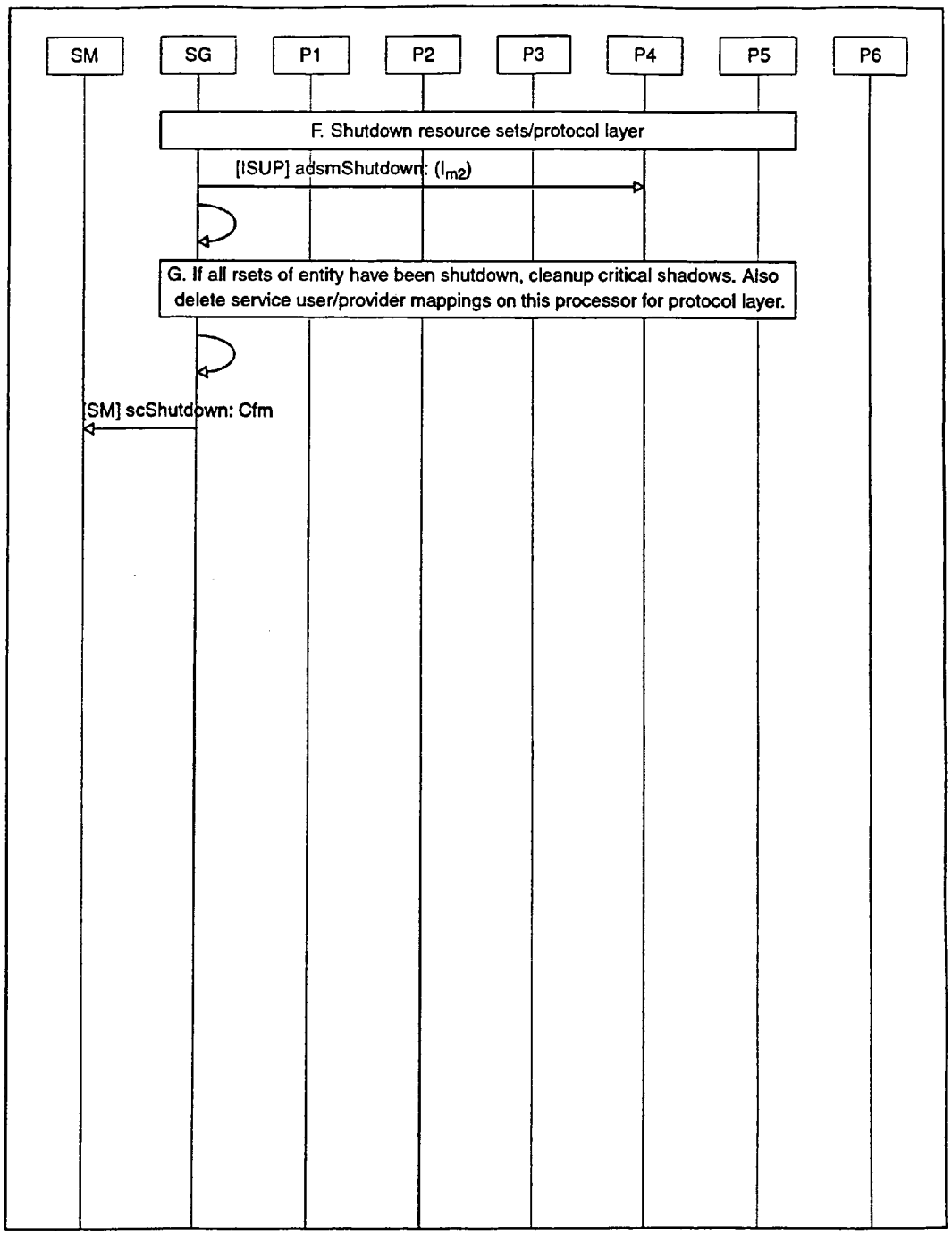
FIG. 43 illustrates the Shutdown: scenario (12 of 12)
Figure 44:
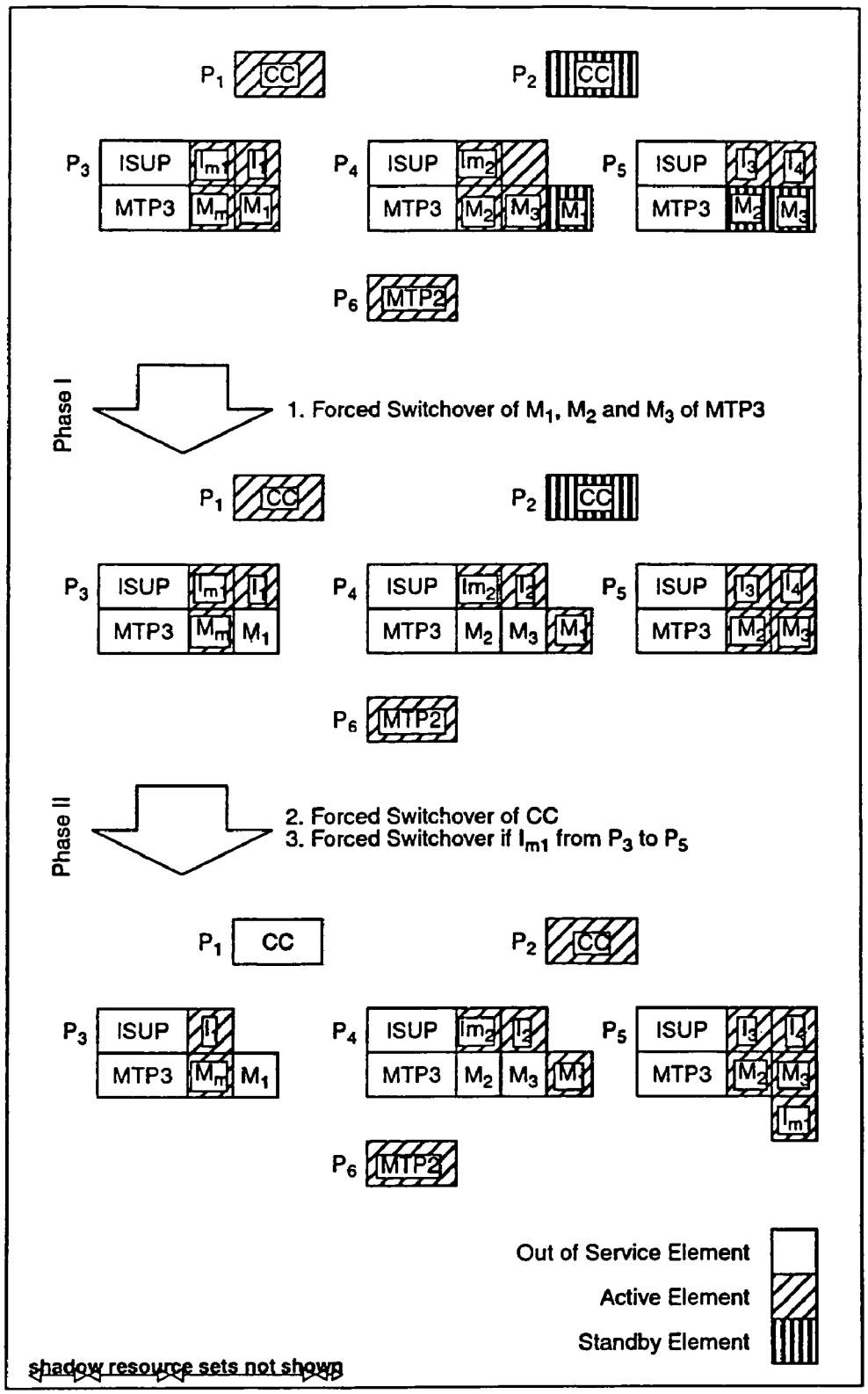
FIG. 44 illustrates scenario: Forced Switchover operation.
Figure 45:
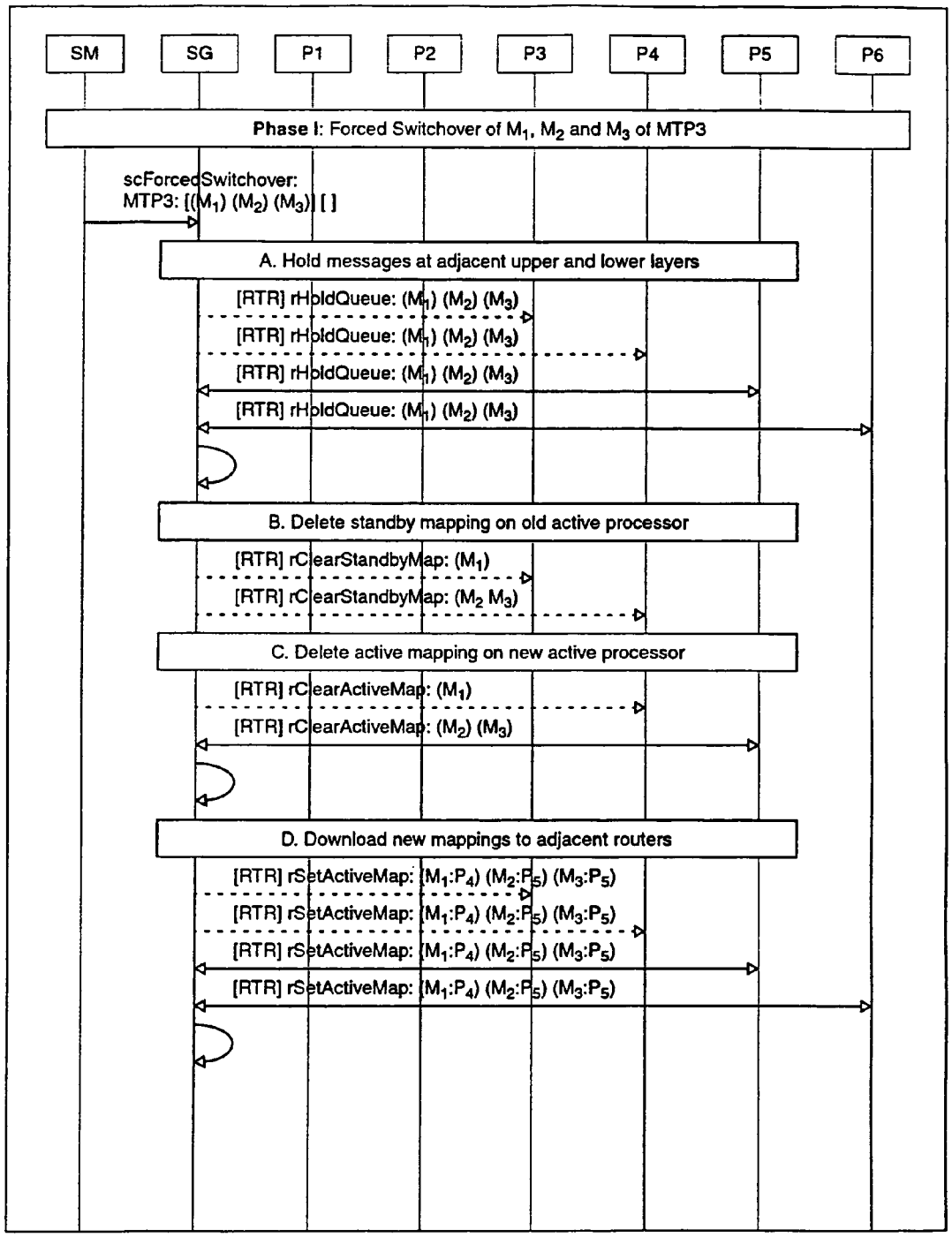
FIG. 45 illustrates message flow: Forced Switchover operation (1 of 6)
Figure 46:
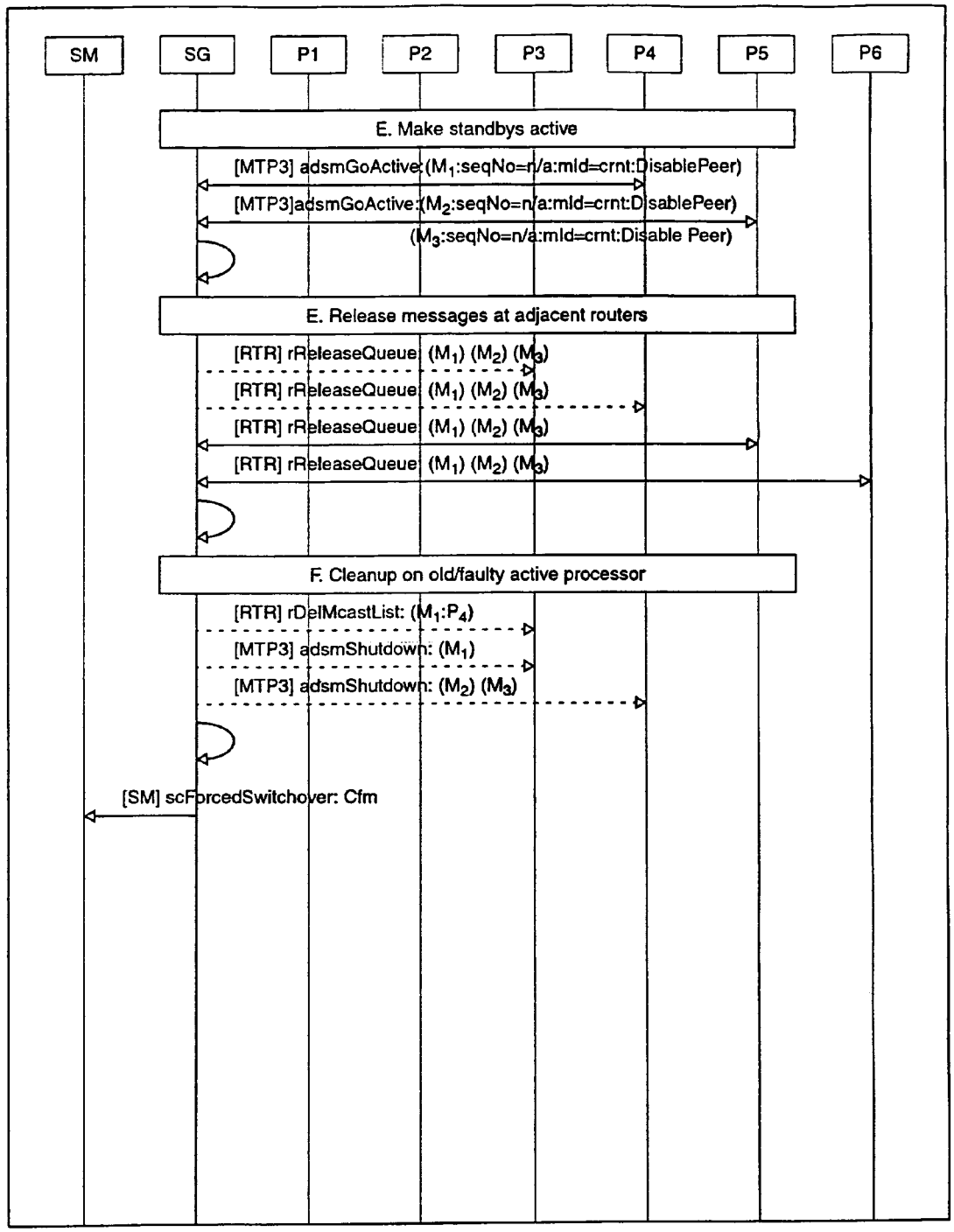
FIG. 46 illustrates message flow: Forced Switchover operation (2 of 6)
Figure 47:
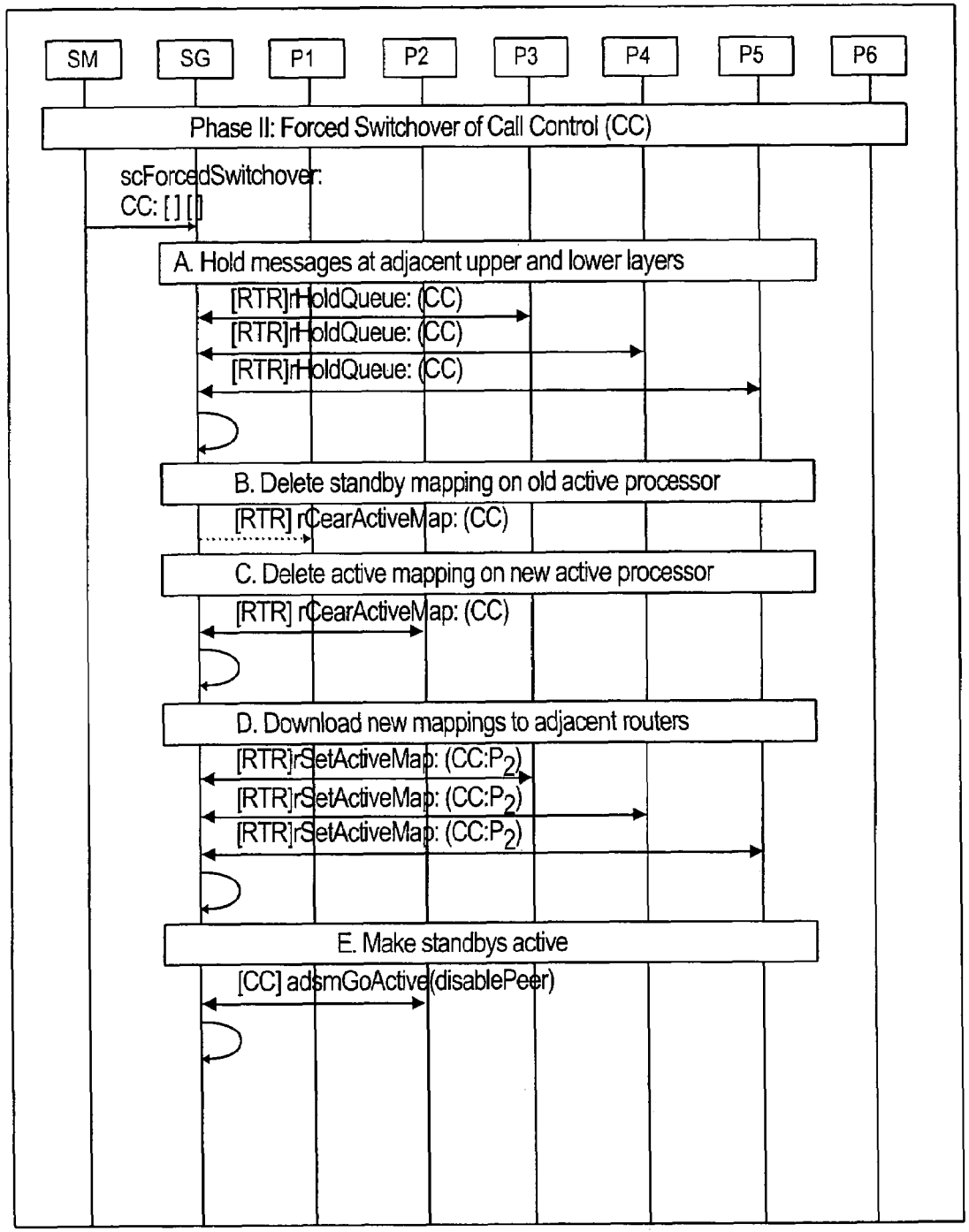
FIG. 47 illustrates message flow: Forced Switchover operation (3 of 6)
Figure 48:
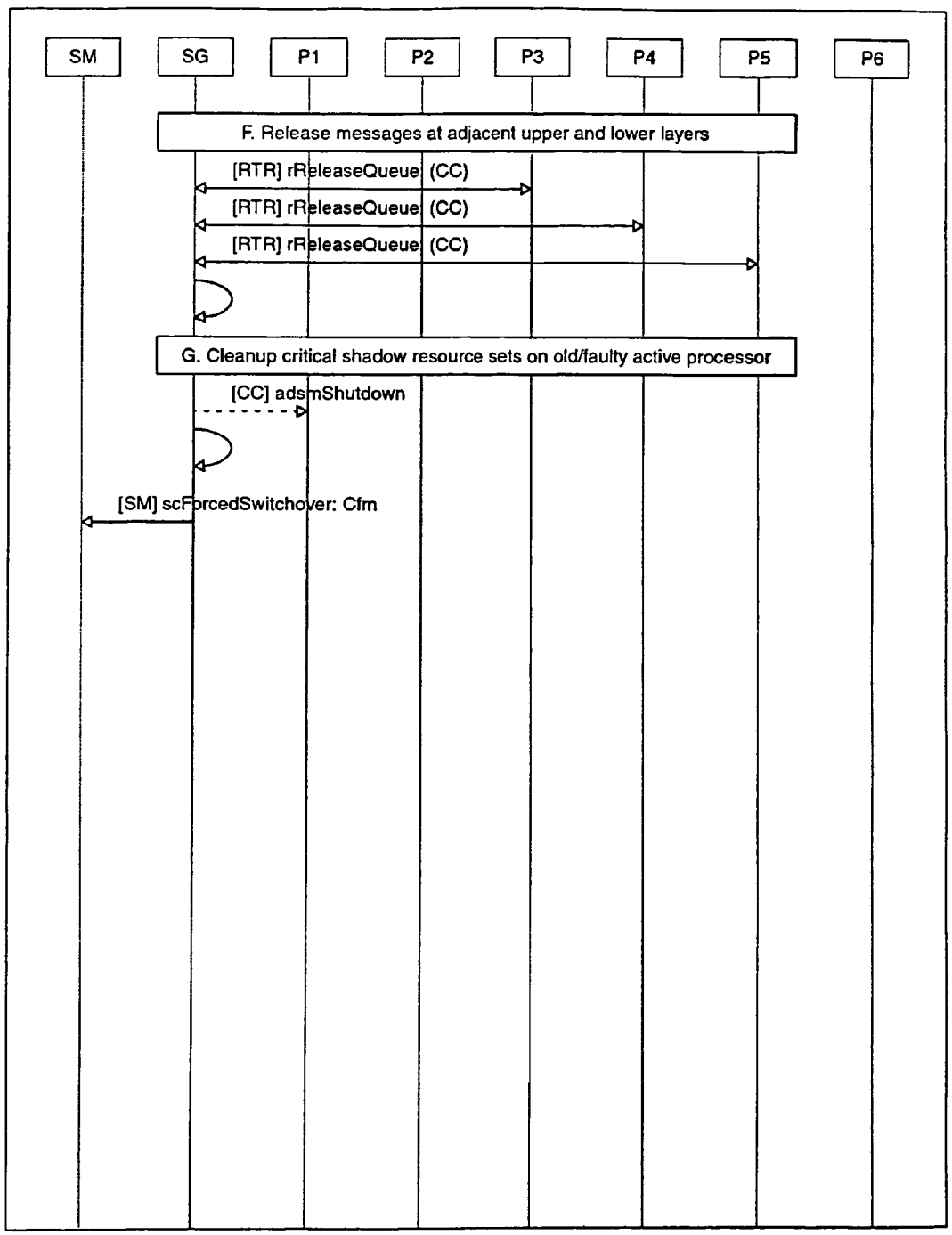
FIG. 48 illustrates message flow: Forced Switchover operation (4 of 6)
Figure 49:
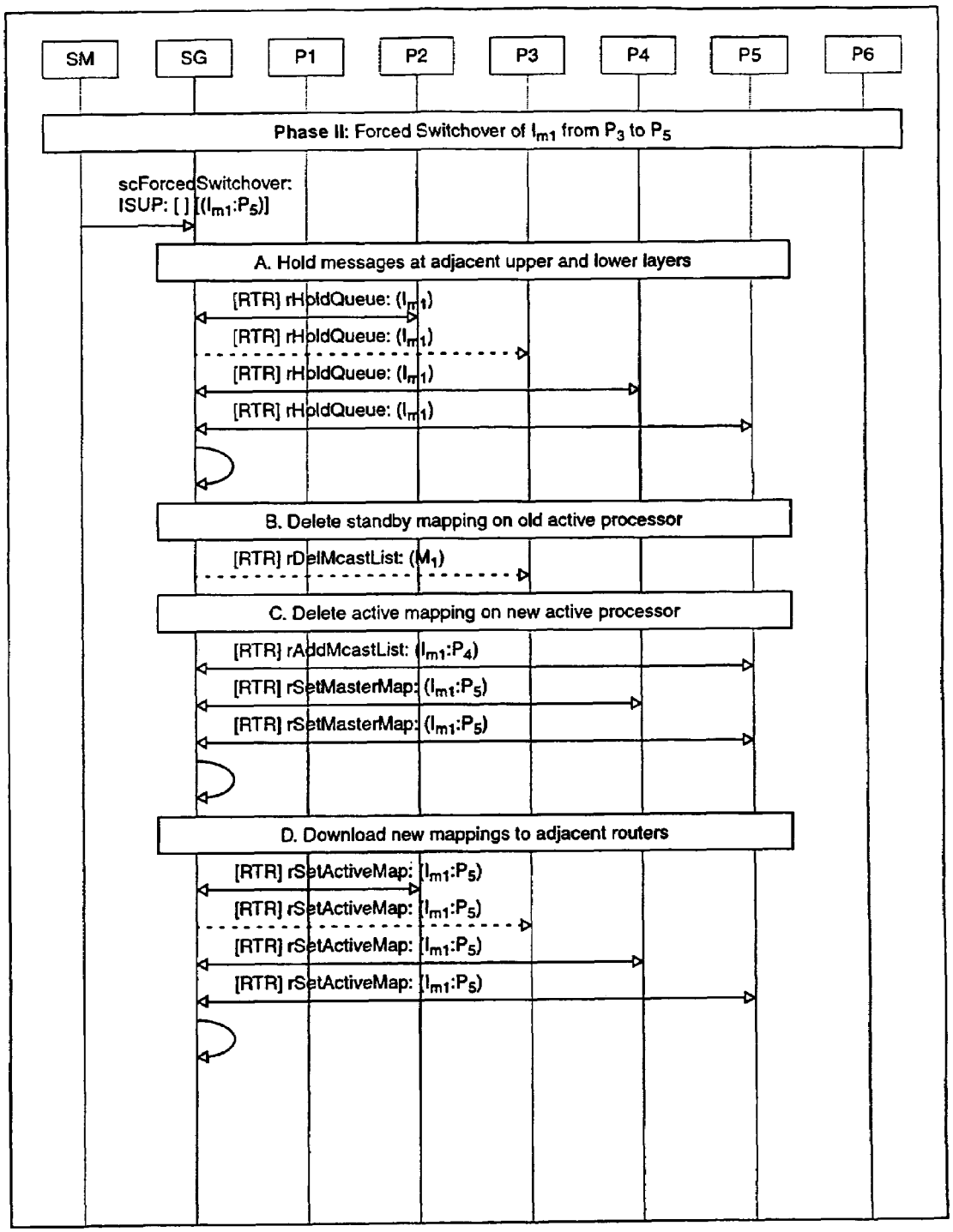
FIG. 49 illustrates message flow: Forced Switchover operation (5 of 6)
Figure 50:
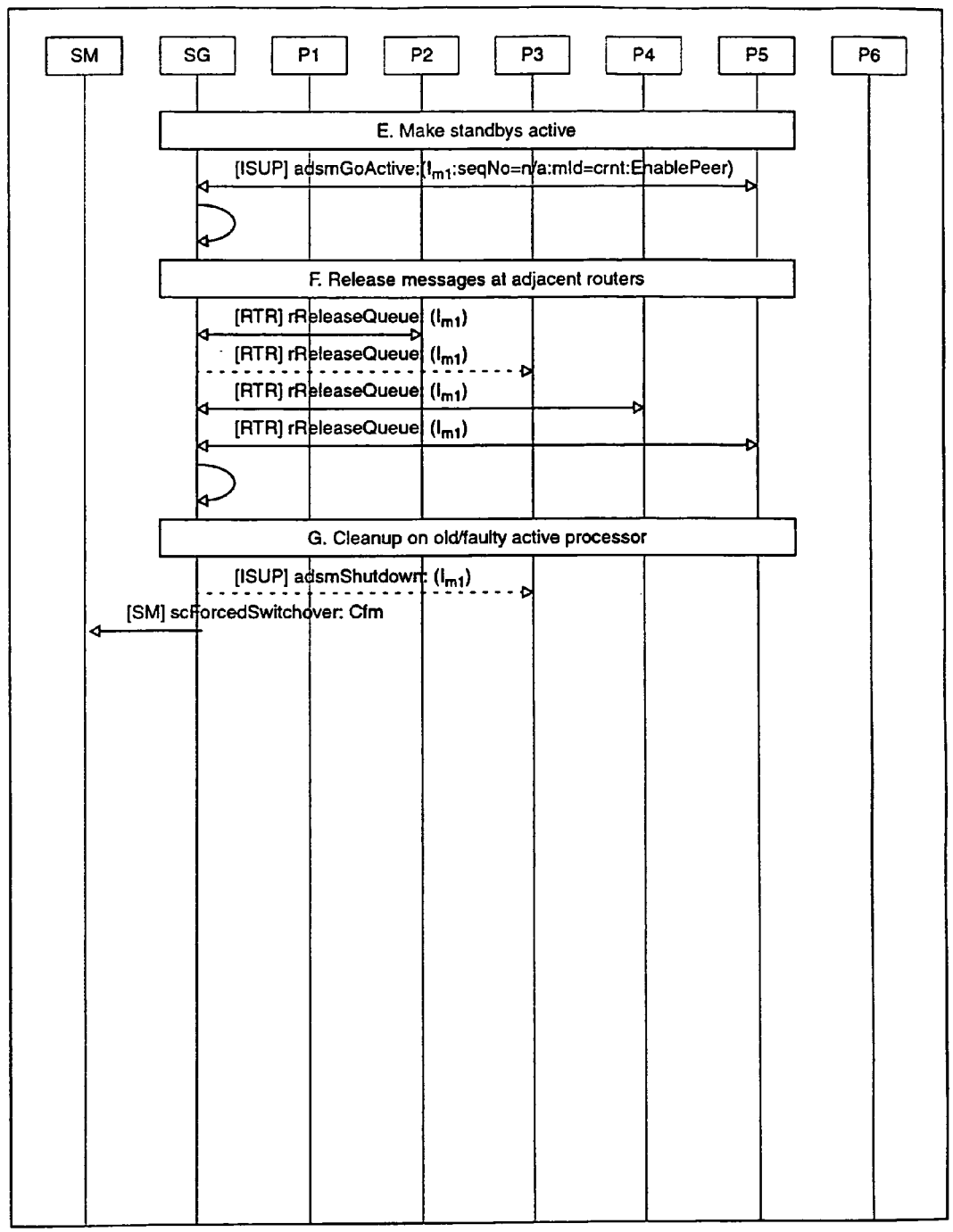
FIG. 50 illustrates message flow:-Forced Switchover operation (6 of 6)
Figure 51:
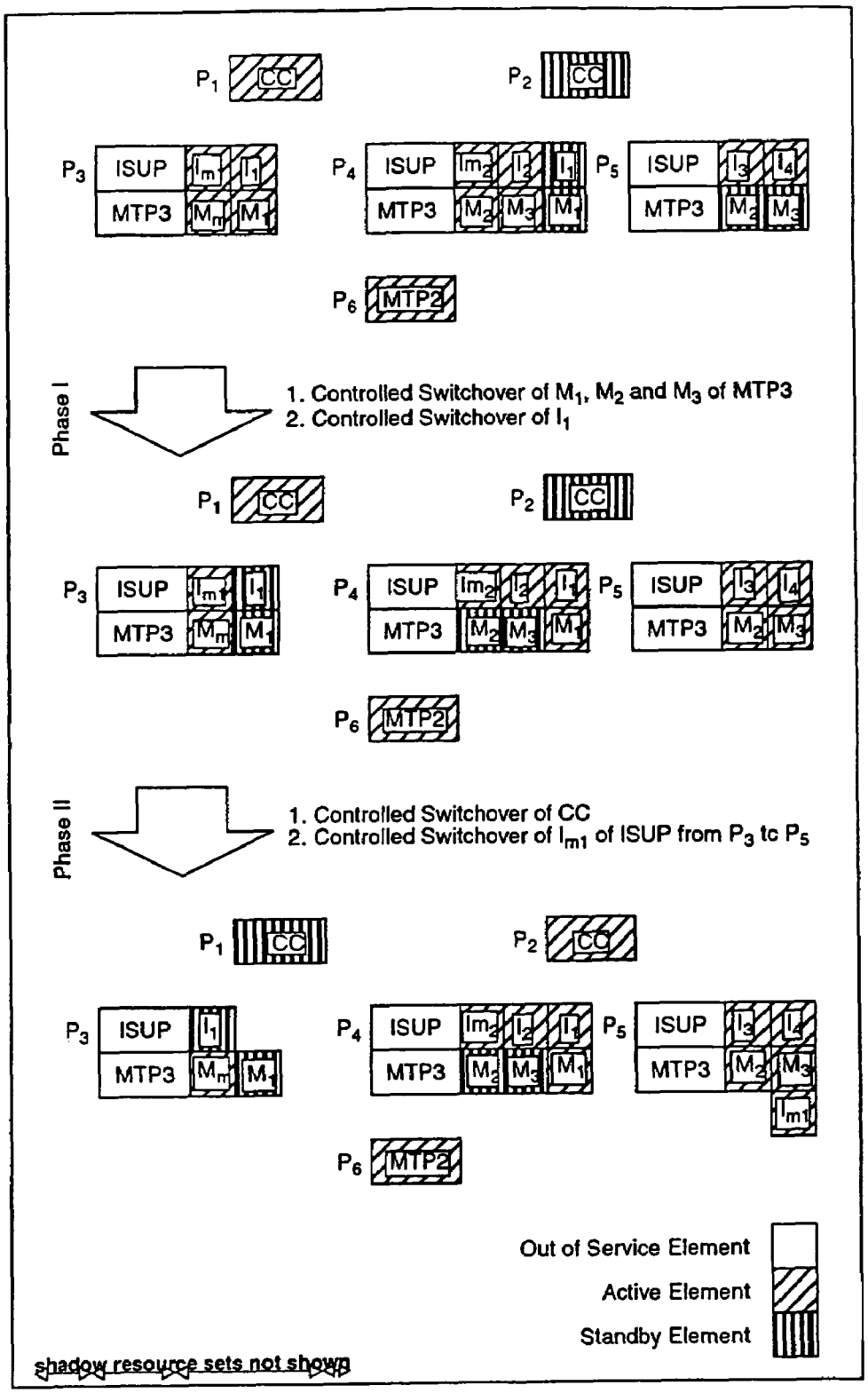
FIG. 51 illustrates Controlled Switchover: System State Change.
Figure 52:
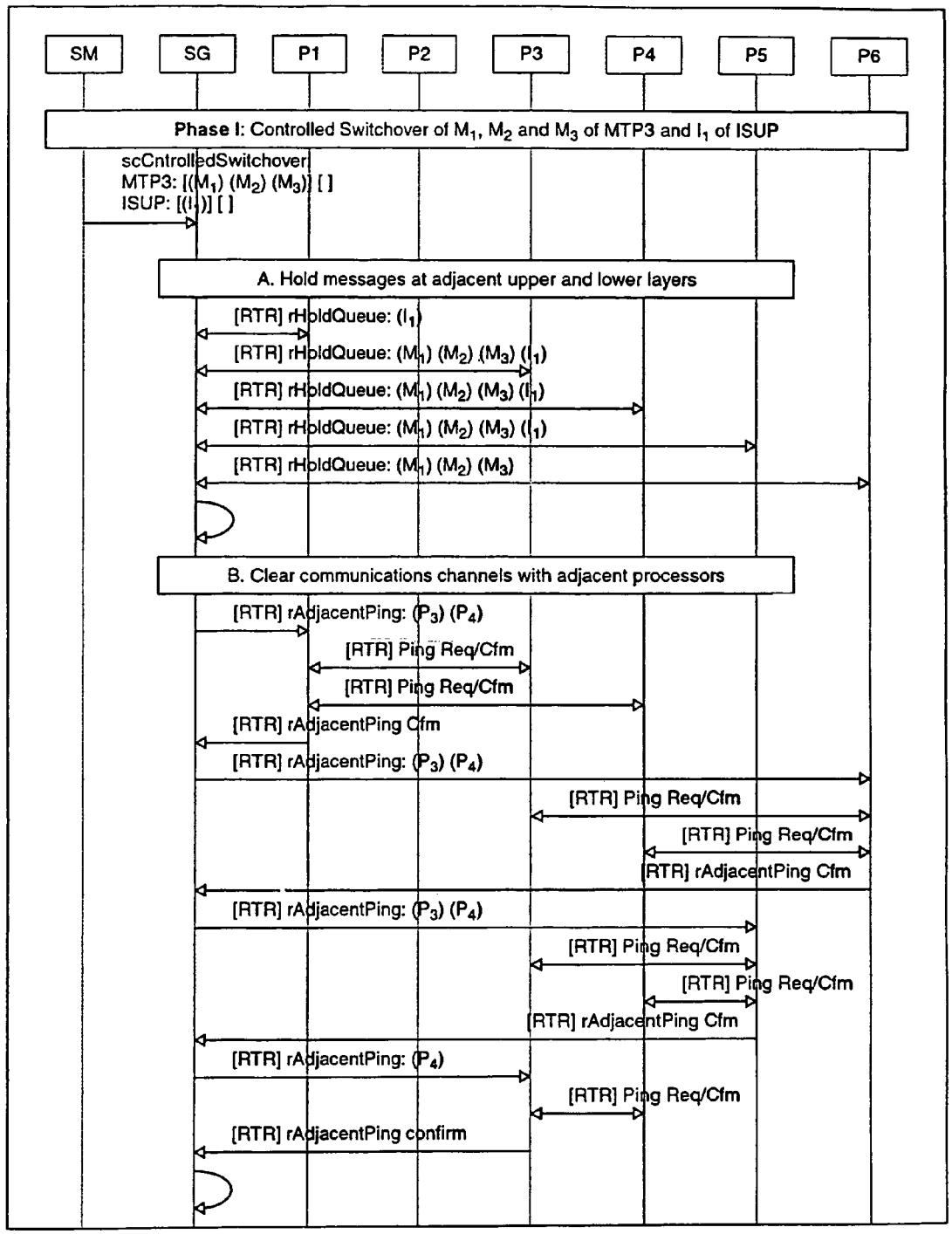
FIG. 52 illustrates Controlled Switchover: scenario (1 of 10)
Figure 53:
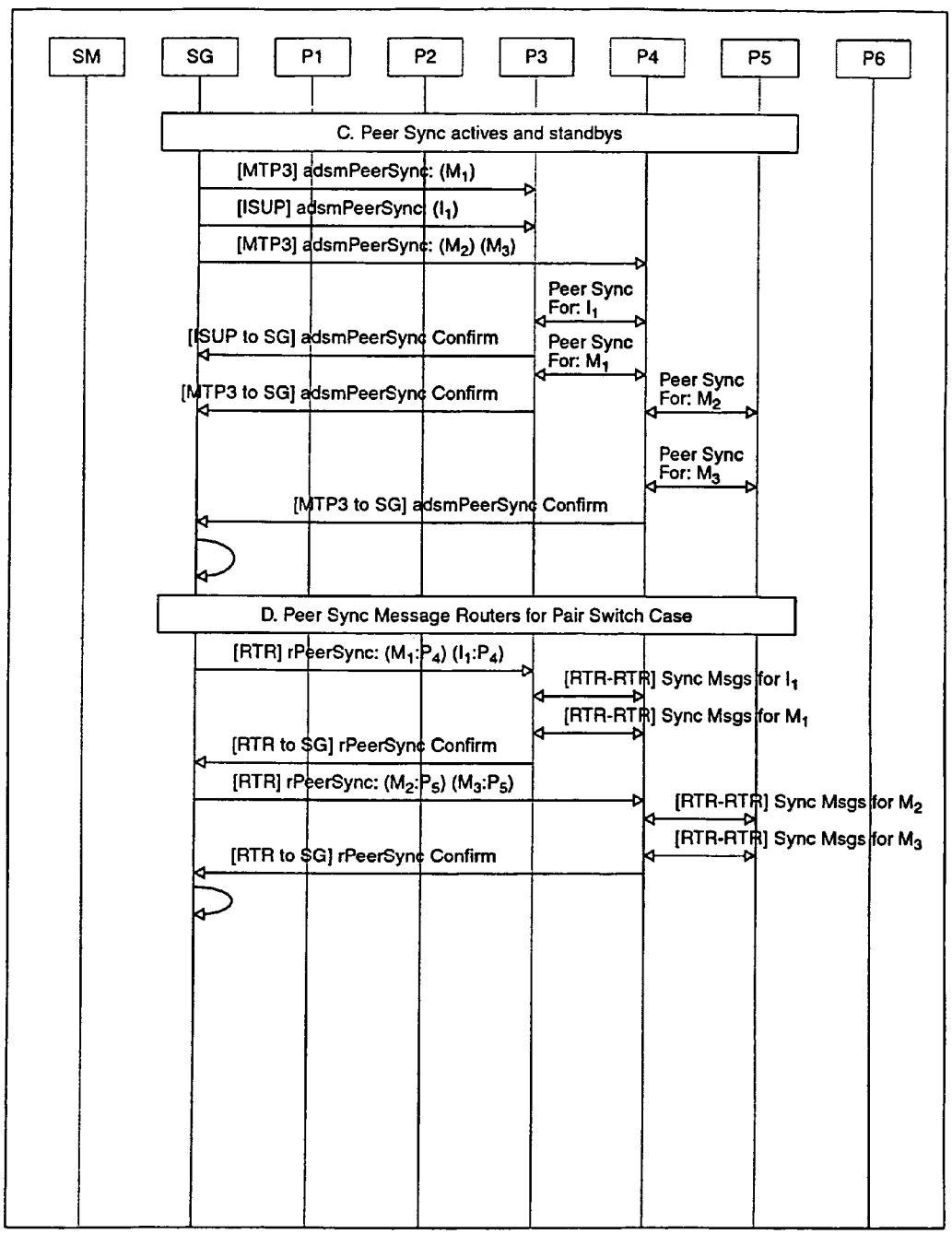
FIG. 53 illustrates Controlled Switchover: scenario (2 of 10)
Figure 54:
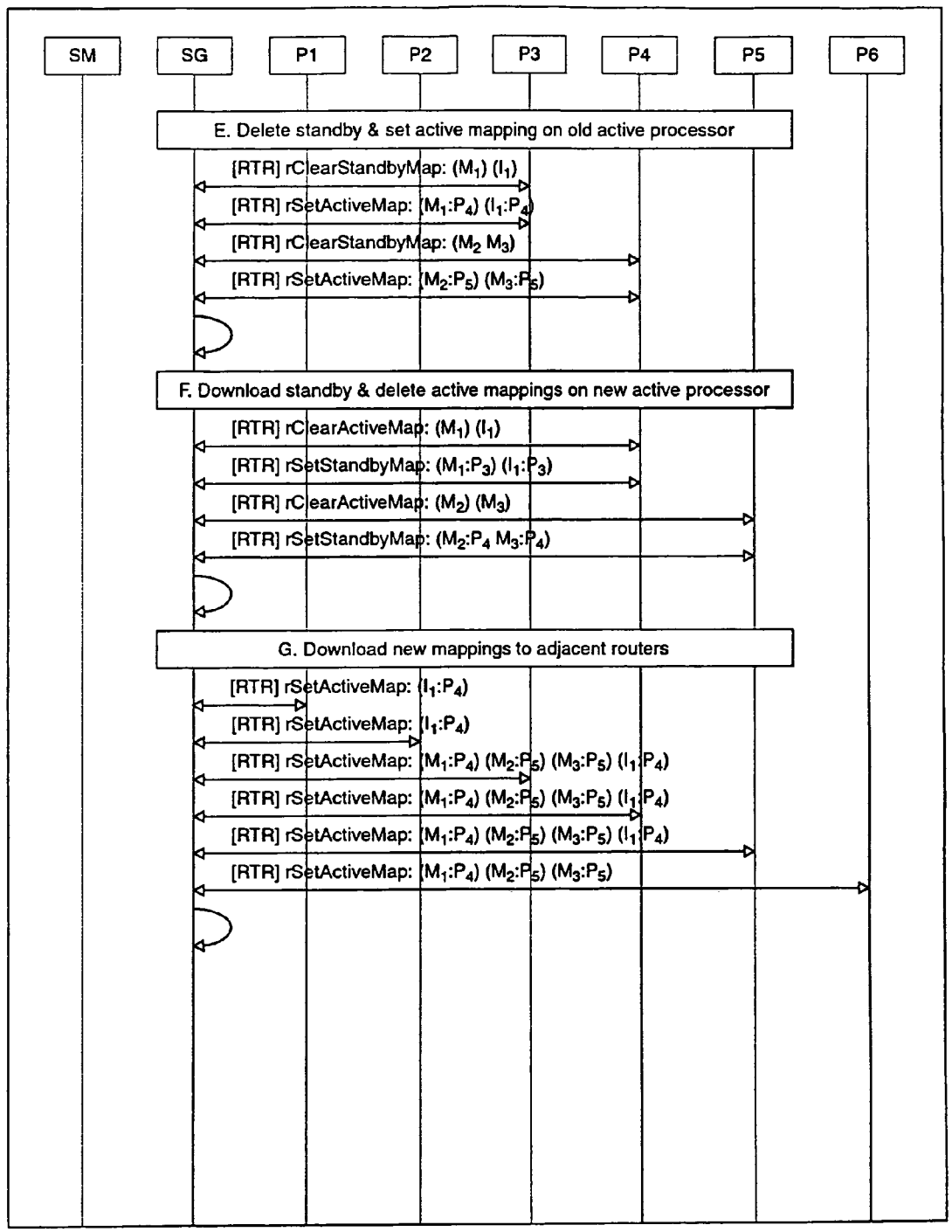
FIG. 54 illustrates Controlled Switchover (3 of 10)
Figure 55:
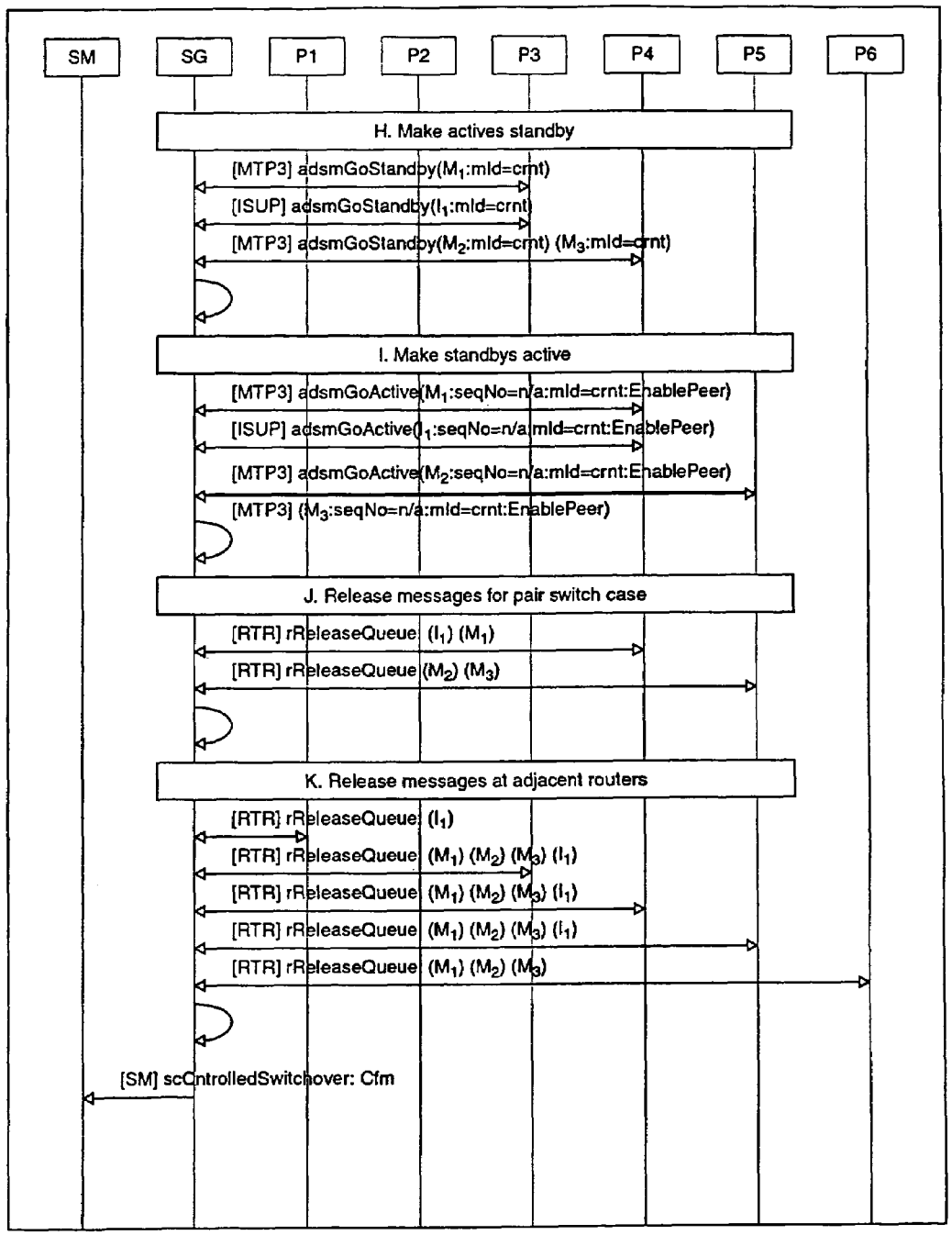
FIG. 55 illustrates Controlled Switchover: scenario (4 of 10)
Figure 56:
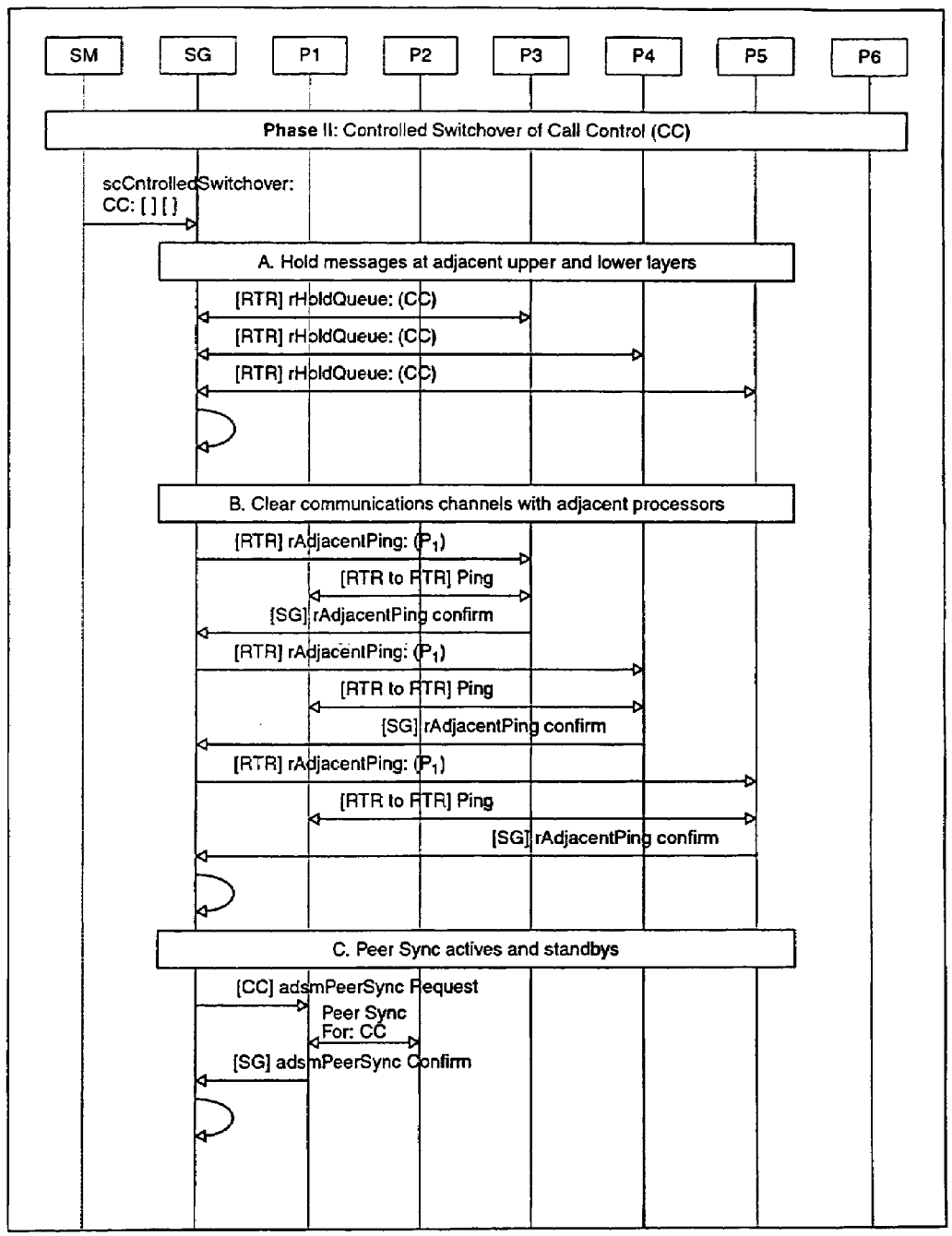
FIG. 56 illustrates Controlled Switchover: scenario (5 of 10)
Figure 57:
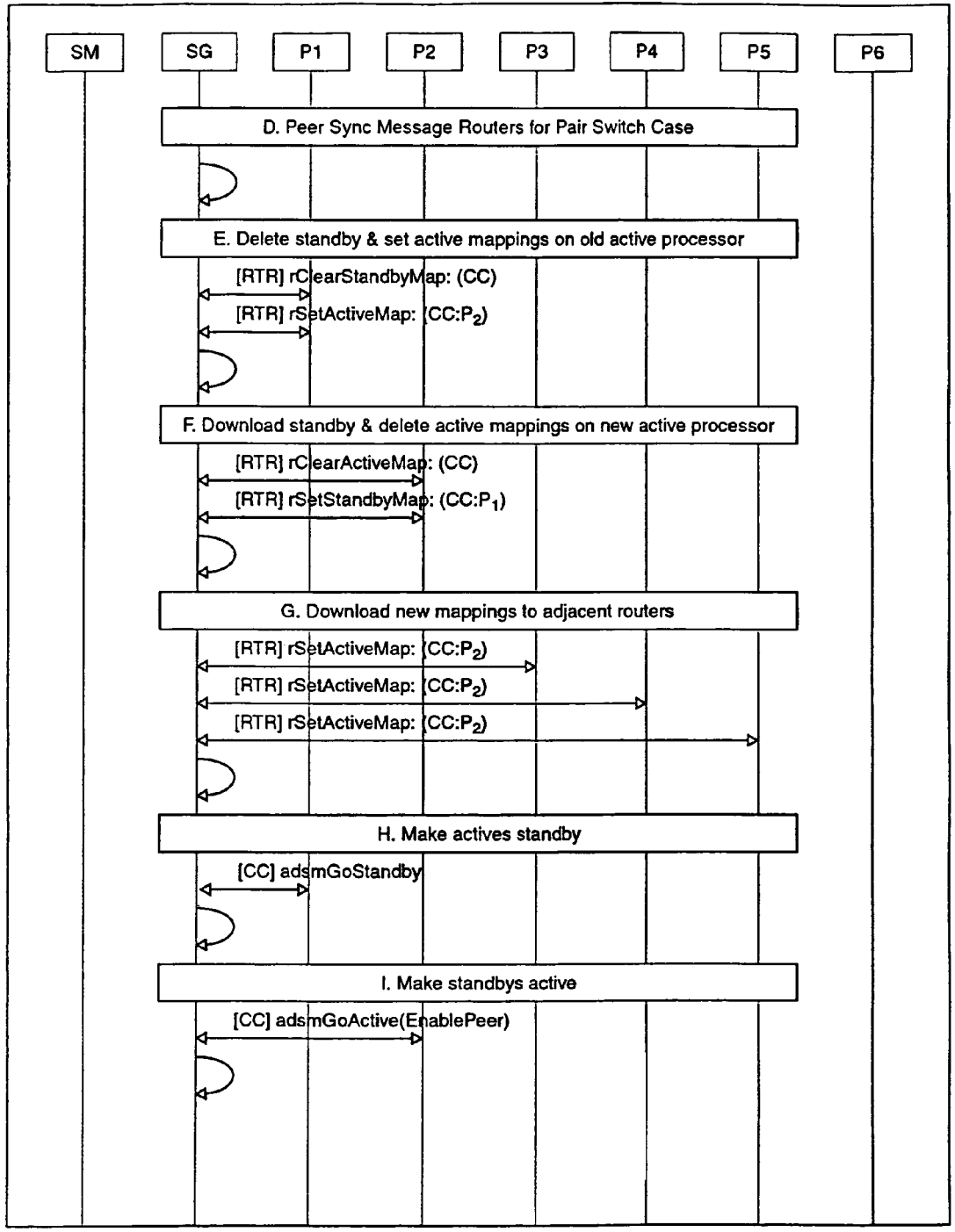
FIG. 57 illustrates Controlled Switchover: scenario (6 of 10)
Figure 58:
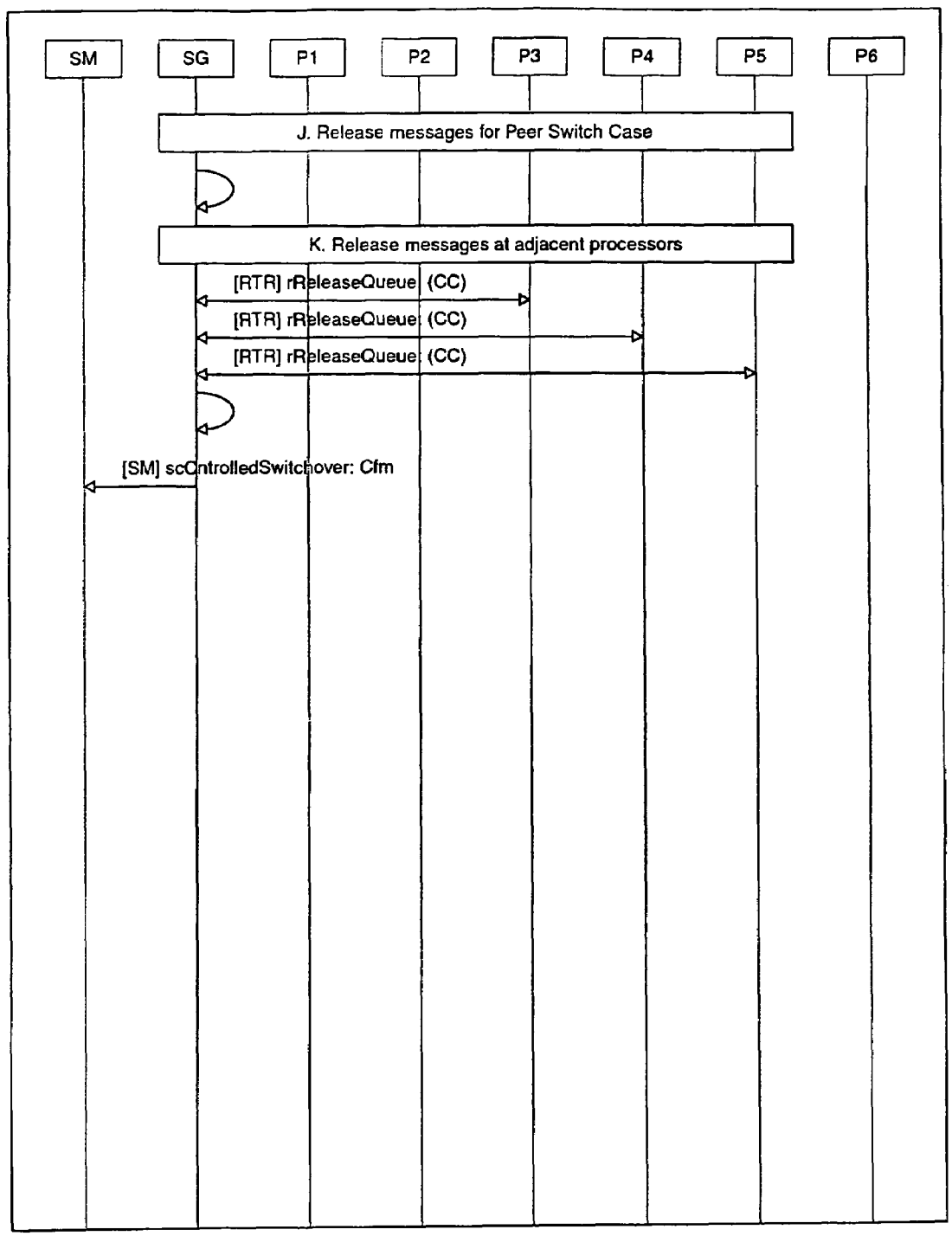
FIG. 58 illustrates Controlled Switchover: scenario (7 of 10)
Figure 59:
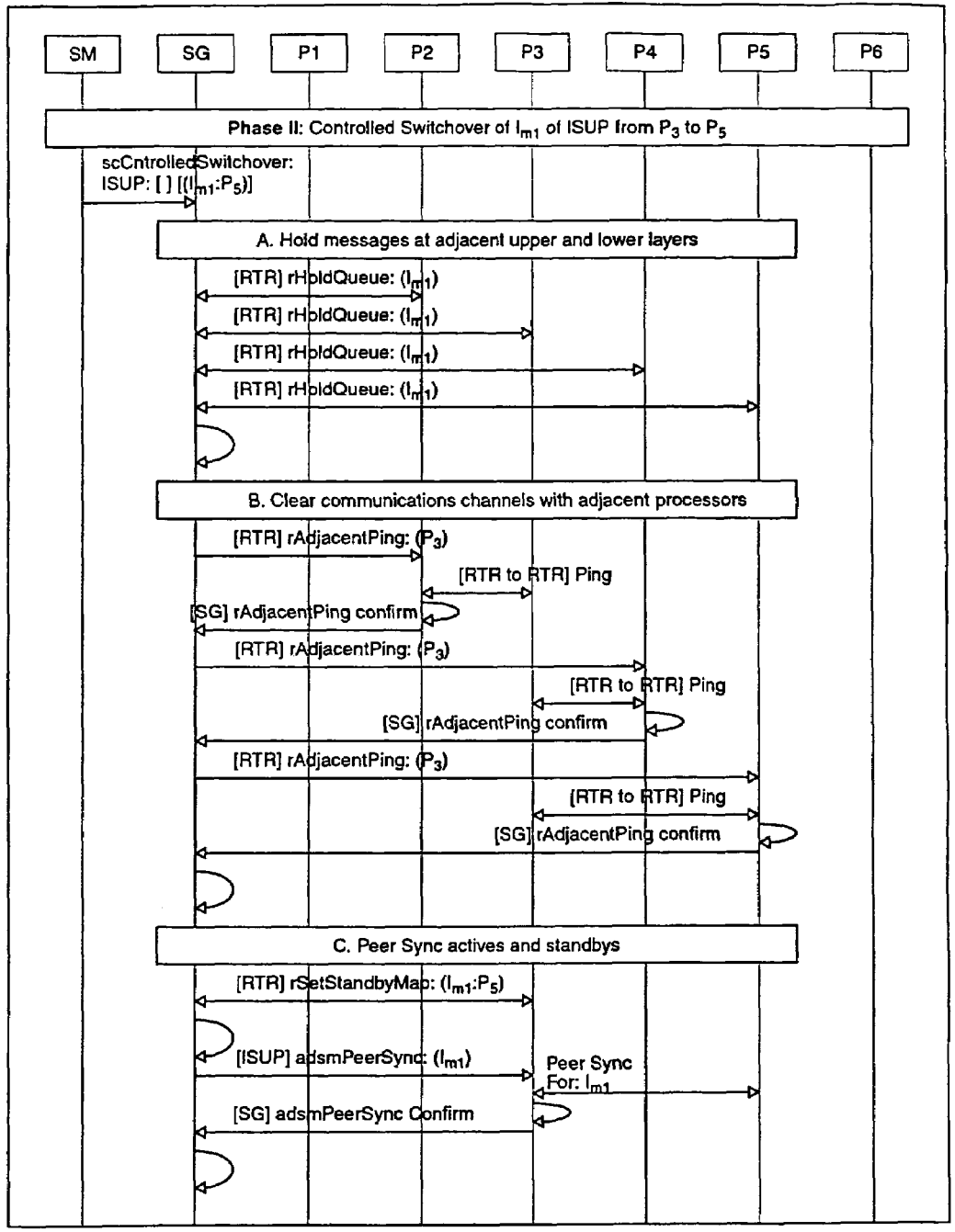
FIG. 59 illustrates Controlled Switchover: scenario (8 of 10)
Figure 60:
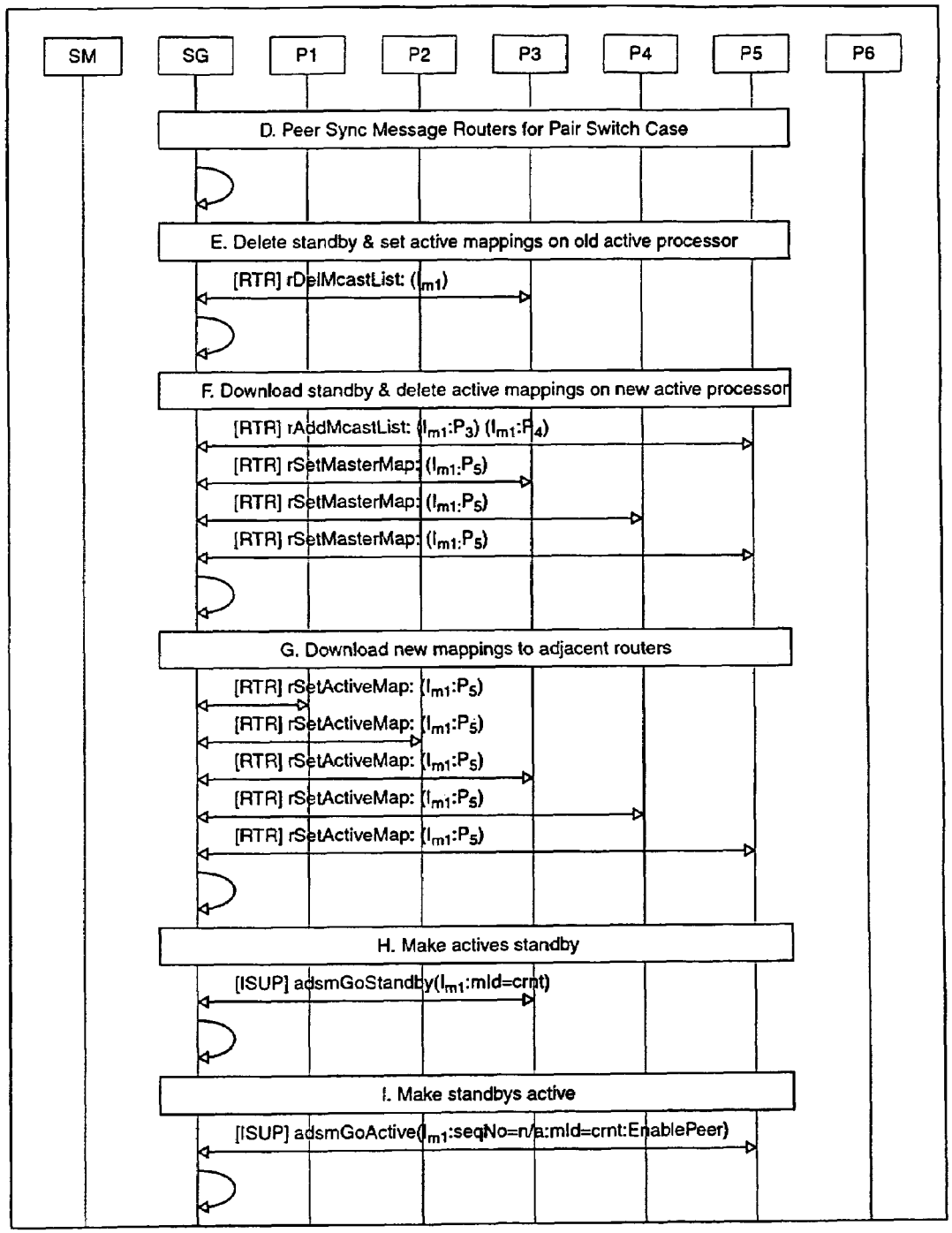
FIG. 60 illustrates Controlled Switchover: scenario (9 of 10)
Figure 61:
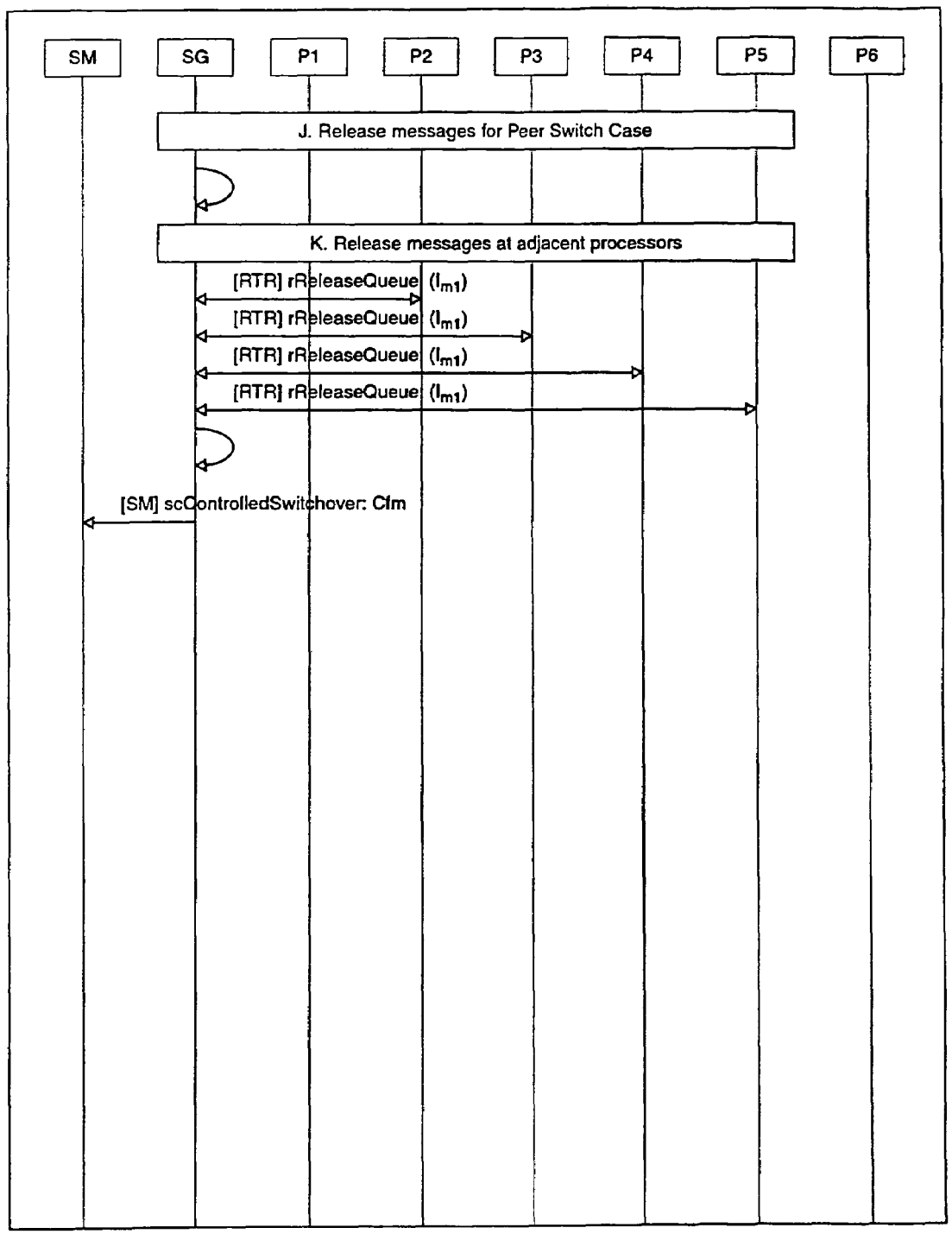
FIG. 61 illustrates Controlled Switchover: scenario (10 of 10)

FIG. 18 presents a reference diagram used to show event flows for all resource set level control API commands. FIG. 19 shows the notations used in the event flows.

An example set of make active commands and the resulting event flow between architecture components and protocol layers is shown in FIGS. 20 to 26.

If any of the above-mentioned steps of the scMakeActive command fail to complete successfully, the operation is aborted. Aborting a failed scMakeActive( ) command involves shutting down partially-activated resource sets and deleting their corresponding mapping information from Routers. The following two tables specify the steps of the scMakeActive( ) command and the steps to be executed if the scMakeActive( ) command fails at any step:

| Step | Command Steps |
|---|---|
| A | Download user/provider active mappings to target processor. |
| B | Create critical shadows on new processor. |
| | B1  Set master mappings on new processor. |
| | B2  Make critical resource sets standby on new processor. |
| | B3  Add new processor to critical resource sets multicast lists. |
| | B4  Set standby mappings on critical resource set master processors. |
| | B5  Make critical master resource sets warmstart new shadows. |
| C | Download new mappings to adjacent routers. |
| D | Activate resource sets on new processor. |
| E | For newly created critical resource sets, create shadows on all processors. |
| | E1  Set critical resource set master mappings on existing processors. |
| | E2  Make critical resource sets standby on existing processors. |
| | E3  Add existing processors to the multicast list of new critical resource sets. |
| | E4  Set standby mappings for new critical resource sets. |
| | E5  Make new critical resource sets warmstart new shadows. |
| F | Initiate neighbor alive with adjacent upper layer. |
| G | Initiate neighbor alive with adjacent lower layer. |

Each row of the above table indicates a step of the scMakeActive( ) command.

| Step | Failure Recovery steps |
|---|---|
| A | Clear downloaded active mappings. |
| B | Remove created critical shadows on new processor. |
| | B1  Clear master mappings on new processor. |
| | B2  Send shutdown to critical resource sets on new processor. |
| | B3  Delete new processor from critical master resource set multicast list. |
| | B4  Clear standby mappings on critical resource set master processors. |
| | B5  Send abort for ongoing warmstart to new critical resource sets. Also, disable peer SAP to critical master resource set if this is last critical shadow. |
| C | Clear active mappings downloaded to adjacent processors. |
| D | Shutdown resource sets on target processor. |
| E | For newly created critical resource sets, create shadows on all processors. |
| | E1  Clear new critical resource set master mappings on existing processors. |
| | E2  Send shutdown for critical resource set shadow on existing processors. |
| | E3  Delete critical master resource set multicast list on new processor. |
| | E4  Clear standby mappings for new critical resource sets. |
| | E5  Send abort for ongoing warmstart to new critical resource sets. |
| F | No operation, ignore failure/abort. |
| G | No operation, ignore failure/abort. |

Each row of the above table indicates the operation to be executed if the corresponding step of the scMakeActive( ) command fails. On failure, all the steps completed prior to the failed step are also rolled back. For example, if a failure occurs on step B5 in the first table, then steps B5, B4, B3, B2, B1, and A specified in second table are executed in this sequence to roll back the full operation.

On failure, the System Controller generates an alarm indicating the failure. This alarm is used to identify the location and cause of the failure by the Fault Manager module and generate appropriate commands to recover from the failure.

On completing the scMakeActive( ) command successfully for a set of applications and their resource sets, the System Controller records the state of each activated resource set of each application in its internal data base. This information is used by other System Controller commands to locate resource sets of the application.

API Function: scMakeStandby

Synopsis:

This API function is invoked to make one or more specified resource sets of one or more applications standby on the specified processor. After this operation has completed, the specified resource sets will become fault-tolerant and a failure of the active resource set may be recovered.

Parameters:
1. Processor ID—This parameter identifies the processor on which the specified resource sets are to be made standby.
2. Entity List—This parameter specifies the list of entity identifiers for each application whose resource sets are to be made standby on the specified processor.
3. Resource Set List—For each application specified in (2), this parameter contains a list of resource sets that are to be made standby on the specified processor.

Return Value:

The return value of this function indicates whether all the resource sets of the application could be made standby successfully on the specified processor. If the return value indicates failure, none of the specified resource sets of any of the specified applications will be made standby. If the return value indicates success, all resource sets of all specified applications have been made standby successfully.

Description:

When a resource set of an application is made standby on a processor, the resource set becomes fault-tolerant. If the active copy of the resource set fails, the standby copy of the resource set can be made active and it can take over operation of the failed active resource set.

If the standby resource sets of an application are to be distributed across two or more processors, multiple scMakeStandby( ) commands must be issued, one for each processor.

The adsmGoStandby( ) command is issued to the application on the specified processor for all specified resource sets. On receiving this command, the application allocates required resources to process and store state information of the resource sets as specified in update messages received from the active counterpart. Followed by the adsmGoStandby( ) command, the System Controller also sends a adsmWarmStart( ) command to the application, with the corresponding active resource sets, to warmstart the activated standby resource sets.

If scMakeStandby( ) is issued to activate the first resource set on the specified processor, and critical master resource sets have already been activated on some other processors in the system, the System Controller activates critical shadow resource sets on the specified processor.

In addition, the Router on the specified processor is informed of the location of active resource sets of user and provider applications. This information enables the standby resource sets to communicate with user and provider applications if the standby resource sets take over operation on failure of their active counterparts. The rSetActiveMap( ) function provided by the Router is used to download this mapping information to the Router on the specified processor.

The location of the active copy of each resource set is sent to the Router on the specified processor containing the newly-created standby resource sets. The rSetActiveMap( ) function provided by the Router is used to download this information to the Router. This enables the standby resource set to send updates to its active copy in a transparent manner, if required by the application.

The Router on the processor containing the active copy of each resource set being made standby is informed of the location of the standby copy of the resource set. The rSetStandbyMap( ) function provided by the Router is used to download this information to the Router. This enables the active copy of the resource set to send updates to its standby counterpart in a transparent manner.

The scMakeStandby( ) command is provided by the System Manager component in the preferred embodiment shown in FIG. 16.

The following algorithm lists each step of the scMakeStandby( ) command. These steps are specific to the architecture components and the layout of the preferred embodiment:

```
// This procedure creates backup copies of all resource sets of all entities
// specified in the EntityResourceList. The backup copies are created on
// the processor specified by Processor.
//
scMakeStandby(Processor, EntityResourceList)
begin
    // First, for each entity being backed up on Processor, the entities
    // User/Provider resource set mappings are downloaded to the
    // router on Processor
    //
    Step A: Download available User/Provider mapping information
    initialize dependency mapping list DepMapping to empty
    for (each entity E in EntityResourceList)
    begin
        if (Processor contains an activated resource set of E) then ignore
        E;
            continue with loop
        for (each user entity U of entity E)
        begin
            if (entity U is not distributed)
                let U reside on processor P_x
                add (U:all :P_x) to the DepMapping list
            else
                for (each activated resource set R_u of user entity U)
                    let R_u reside on processor P_x
                    add (U:R_u :P_x) to the DepMapping list
        end
        for (each provider entity P of entity E)
        begin
            if (entity P is not distributed)
                let P reside on processor P_x
                add (P:all :P_x) to the DepMapping list
            else
                for (each activated resource set R_p of provider entity P)
                    let R_p reside on processor P_x
                    add (P:R_p :P_x) to the DepMapping list
        end
    end
    send a rSetActiveMap(DepMapping) command to the Message
Router on Processor
    wait for rSetActiveMap( ) confirmation
    //
    // For each entity being activated on Processor, make sure that all the
    // critical resource set shadows exist on the processor. If not, make
    // them standby there and warmstart them. All this is achieved by
    // the PrepartNode( ) function.
    //
    Step B: Create existing critical Resource set Shadows on new
        processor if they don't exist create a list of entities in EntityList
        from EntityResourceList
        call PrepareNode(Processor, EntityList)
        // Make specified resource sets on Processor standby. The
        // adsmGoStandby(all) operation indicated to
        // the PSF that the operation (GoStandby) is to be applied to all
```

-continued

```
        // resource sets or the entire protocol layer.
        //
        Step C: Make specified resource sets standby
        for (each entity E specified in EntityResourceList)
        begin
            if (entity E is not distributed)
            begin
                send a adsmGoStandby(all) command to entity E on
                Processor
            end
            else begin
                initialize ResourceList to empty
                for (each resource set R of E specified in
                EntityResourceList)
                    add (R:mId=<crnt-rset-master-id>) to ResourceList
                send a adsmGoStandby(ResourceList) command to entity E
                on Processor
            end
        end
        wait for all adsmGoStandby( ) confirmations
        //
        // Update Message Routers on active processor(s) about the new
        // standbys
for         // specified resource sets/conventional protocol layers.
        //
        Step D: Update router(s) on active processor(s) about new standby
        mappings for (each active processor P_a in the system)
            initialize its standby mapping list P_aStandbyMappingList to
        empty for (each entity E specified in EntityResourceList)
        begin
            if (entity E is not distributed)
            begin
                let the active copy of E reside on processor P_a
                add (E:all:Processor) to P_aStandbyMappingList
            end
            else begin
                for (each resource set R of entity E specified in
EntityResourceList)
                begin
                    let the active copy of R reside on processor P_a
                    add (E:R:Processor) to P_aStandbyMappingList
                end
            end
        end
        for (each active processor P_a in the system)
            if (P_aStandbyMappingList is not empty)
                send a rSetStandbyMap(P_aStandbyMappingList) command
        to router on P_a
        wait for all rSetStandbyMap( ) confirmations
        // Make active copies of all resource sets/protocol layers warmstart
        // their standby copies.
        //
        Step E: Make active(s)WarmStart new Standbys
        for (each entity E specified in EntityResourceList)
        begin
            if (entity E is not distributed)
            begin
                let active copy of entity E reside on processor P_a
                send a adsmWarmStart(all) command to entity E on
                processor P_a
end
            else begin
                for (each resource set R of entity E)
                begin
                    let active copy of entity E reside on processor P_a
                    send a adsmWarmStart(R) command to entity E on
                    processor P_a
                end
            end
        end
        wait for all adsmWarmStart( ) confirmations
        //
        send scMakeStandby( ) confirmation
        //
end
```

An example set of make standby commands and the resulting event flow between architecture components and protocol layers are shown in FIGS. 27 to 30.

If any of the above-mentioned steps of the scMakeStandby command fail to complete successfully, the operation is aborted. Aborting a failed scMakestandby( ) command involves shutting down partially-created standby resource sets and deleting their corresponding mapping information from Routers. The following two tables specify the steps of the scMakestandby( ) command and the steps to be executed if the scMakeStandby( ) command fails:

| Step | Command Steps |
| --- | --- |
| A | Download user/provider active mappings to target processor. |
| B | Create critical shadows on target processor. |
|  | B1 Set master mappings on new processor. |
|  | B2 Make critical resource sets standby on new processor. |
|  | B3 Add new processor to critical resource sets multicast lists. |
|  | B4 Set standby mappings on critical resource set master processors. |
|  | B5 Make critical master resource sets warmstart new shadows |
| C | Make specified resource sets standby on target processor. |
| D | Download new standby mappings to router on active processor. |
| E | Make actives warmstart new standbys. |

Each row of the table indicates a step of the scMake-Standby command.

| Step | Failure Recovery Steps |
| --- | --- |
| A | Clear downloaded active mappings. |
| B | Remove created critical shadows on new processor. |
|  | B1 Clear master mappings on new processor. |
|  | B2 Send shutdown to critical resource sets on new processor. |
|  | B3 Delete new processor from critical master resource set multicast list. |
|  | B4 Send abort for ongoing warmstart to new critical resource sets. |
|  | B5 Send abort for ongoing warmstart to new critical resource sets. Also send disable peer to master critical resource set if this is last shadow. |
| C | Shut down resource sets on target processor. |
| D | Clear standby mappings downloaded to active processors. |
| E | Abort warmstart sent to protocol layers. |

Each row of the above table indicates the operation to be executed if the corresponding step of the scMakeStandby( ) command fails. On failure, all the steps completed prior to the failed step are also rolled back. For example, if a failure occurs on step B5 in first table, then steps B5, B4, B3, B2, B1, and A specified in the second table are executed in this sequence to roll back the full operation.

On failure, the System Controller generates an alarm indicating the failure. This alarm is used to identify the location and cause of the failure by the Fault Manager module and generate appropriate commands to recover from the failure.

On completing the scMakestandby( ) command successfully for a set of applications and their resource sets, the System Controller records the state of each standby resource set of each application in its internal database. This information is used by other System Controller commands to locate resource sets of the application.

API Function: scShutdown

Synopsis:

This API function is invoked to shut down and remove active or standby resource sets from the specified processor.

Shutdown of the specified resource sets can be performed in a forced manner when the resource sets have failed or in a controlled manner when the operational resource sets have to be shutdown. When an active resource set is shut down, no more input events associated to the resource set will be accepted or processed. When a standby resource set is shut down, the resource set is no longer fault-tolerant, and a failure of the active copy of the resource set cannot be recovered.

Parameters:
1. Processor ID—This parameter identifies the processor on which the specified resource sets are to be shut down.
2. Entity List—This parameter specifies the list of entity identifiers for each application whose resource sets are to be shut down on the specified processor.
3. Resource Set List—For each application specified in (2), this parameter contains a list of resource sets that are to be shut down on the specified processor.
4. Forced Flag—This Boolean field specifies whether the resource sets are to be removed from the system in a forced (TRUE) or controlled (FALSE) manner. Failed resource sets are removed from the system in a forced manner. Resource sets are gracefully removed from the system in a controlled manner.

Return Value:
If a controlled shutdown is performed (forced-flag is FALSE), the return value will indicate success or failure of the shutdown operation. If the return value indicates failure, none of the specified resource sets will be removed from the specified processor. If the return value indicates successful completion of the operation, all specified resource sets residing on the specified processor will have been removed.

If a forced shutdown is performed (forced-flag is TRUE), the return value will always indicate success and all the specified resource sets will have been removed.

Description:
The scShutdown( ) command is issued to make a set of resources sets of a set of applications shut down (out of service) on a single processor in a forced or controlled manner. If the resource sets to be shut down are distributed across multiple processors, multiple scShutdown( ) commands must be issued, one for each processor.

The adsmShutdown( ) command is issued to the application on the specified processor for all the specified resource sets. On receiving this command, the application releases all resources associated with the specified resource sets. For the forced shutdown command, the System Controller does not expect a success from adsmShutdown( ), because the resource sets being shut down may have failed. In a controlled shutdown, success from adsmShutdown( ) command is expected.

When an active resource set is shut down on a processor, mapping information associated with the resource set is removed from the user and provider application processor Routers using the rClearActiveMap( ) function provided by the Routers.

When a standby resource set is shut down on a processor, the mapping information contained in the Router on the specified processor is removed via the rClearActiveMap( ) function. Mapping information on the processor containing the active counterpart of the shutdown standby resource set is removed using the rClearStandbyMap( ) function provided by the Router.

Critical shadow resource sets may not be explicitly shut down. When the last resource set (active or standby) of an application is shut down on a processor, all supporting critical shadow resource sets are also shut down by issuing an adsmShutodwn( ) command to the application on the specified processor for these resource sets. Associated mapping information on Routers on the specified processor and on the processor containing the critical master resource set is removed by invoking the rClearMasterMap( ) and rClearMulticastMap( ) functions provided by the Router.

When a master critical resource set is shut down, the following steps are executed:
a) Shut down all shadows of the critical resource set. This procedure is similar to shutting down the standby copy of a non-critical resource set. Location of the master copy of the critical resource set is removed from the processor containing each critical shadow via the rClearMasterMap( ) function provided by the Router.

Shut down the critical master copy of the critical resource set. The multicast list containing the list of shadow resource sets and their locations is removed from the Router containing the critical master resource set via the rDelMcastList( ) function provided by the Router.

When the critical master resource set of an application (on all processors) is shut down, user and provider applications are informed that the application is no longer in service using the appNeighborDead( ) API. User and provider applications must not generate additional input events to the application after receiving this indication. In addition, all user and provider resource set mapping information contained in the Router on the specified processor is removed via the rClearActiveMap( ) function provided by the Routers.

The scShutdown( ) command is implemented in the System Manager component in the preferred embodiment shown in FIG. 16.

The following algorithm lists each step of the scShutdown command. These steps are specific to the architecture components and layout of the preferred embodiment:

```
// This procedure shuts down all resource sets of all entities specified in
// EntityResourceList contained on Processor.
//
scShutdown(Processor, forcedFlag, EntityResourceList)
begin
    // If any of the resource sets being shutdown are Master management
    // resource sets all service users of the protocol layer are sent
    // neighbor dead for the protocol layer.
    Step A: Neighbor dead with adjacent Upper Layer — Master
management Resource set shutdown only
    for (each entity E contained in EntityResourceList)
    begin
        if (EntityResourceList does not contain a critical resource set of
           E)
        then
            continue with loop
        if (entity E is a conventional entity)
            set UnbindProc to processor on which E resides
            set UnbindParam to UnbindProc
            set UnbindRset to all
        if (entity E is pure fault-tolerant)
            set UnbindProc to the location of the active copy of E
            set UnbindParam to None
            set UnbindRset to all
        if (entity E is distributed)
            set UnbindRset to the management resource set of E
            set UnbindProc to the location of the active copy of
              UnbindRset
            set UnbindParam to None
        for (each service user U of E)
```

```
begin
    if (U is a conventional entity)
        let U reside on P_x
        send a appNeighborDead(E, UnbindParm) to U on P_x
        send a appNeighborDead(U, P_x) to E:UnbindRset on
            UnbindProc
    else if (U is a pure fault-tolerant entity)
        let active copy of U reside on P_a
        send a appNeighborDead(E, UnbindParam) to U on P_a
        send a appNeighborDead(U, None) to E:UnbindRset
            on UnbindProc
    else if (U is a distributed entity)
        let R_MGMT be the management resource set of U
        let R_MGMT reside on processor P_x
        send an appNeighborDead(E , UnbindParam) to
            U:R_MGMT on P_x
        send a appNeighborDead(U, None) to E:UnbindRset
            on UnbindProc
    end
end
if (forcedFlag is TRUE)
    wait for appNeighborDead( ) confirmations from all processors
        P_x where
            P_x != Processor
    wait for appNeighborDead( ) confirmations from all processors
        P_x where
            P_x != Processor
else
    wait for all appNeighborDead( ) confirmations
    wait for all appNeighborDead( ) confirmations
// If any of the resource sets being shutdown are Master management
// resource sets, the protocol layer they belong to must unbind from
// its service providers.
//
Step B: Neighbor dead for adjacent Lower Layer — Master management
Resource set shutdown only
for (each entity E contained in EntityResourceList)
    begin
        if (EntityResourceList does not contain a critical resource set of
        E)
then
            continue with loop
        for (each service provider P of E)
            begin
                if (entity P is a conventional entity)
                    set UnbindProc to processor on which P resides
                    set UnbindParam to UnbindProc
                    set UnbindRset to all
                if (entity P is pure fault-tolerant)
                    set UnbindProc to the location of the active copy of P
                    set UnbindParam to None
                    set UnbindRset to all
                if (entity P is distributed)
                    set UnbindRset to the management resource set of P
                    set UnbindProc to the location of the active copy of
                        UnbindRset
                    set UnbindParam to None
                if (entity E is a conventional entity)
                    let entity E reside on P_a
                    send a appNeighborDead(P, UnbindParam) to E on P_a
                    send a appNeighborDead(E, P_a) to P:UnbindRset on
                        UnbindProc
                else if (entity E is a pure fault-tolerant entity)
                    let active copy of E reside on P_a
                    send a appNeighborDead(P, UnbindParam) to E on P_a
                    send a appNeighborDead(E, None) to P:UnbindRset on
                        UnbindProc
                else if (entity E is a distributed entity)
                    let active copy of management resource set R_MGMT of
                        E reside on P_a
                    send a appNeighborDead(P, UnbindParam) to
                        E:R_MGMT on P_a
                    send a appNeighborDead(E, None) to P:UnbindRset on
                        UnbindProc
    end if (forcedFlag is TRUE)
    wait for appNeighborDead( ) confirmations from all processors
        P_x where
            P_x != Processor
    wait for appNeighborDead( ) confirmations from all processors
        P_x where
            P_x != Processor
else
    wait for all appNeighborDead( ) confirmations
    wait for all appNeighborDead( ) confirmations
// For the resource sets/protocol layers being shutdown, all their
mappings
// need to be deleted from message routers residing on adjacent
processors.
// This is done to force any subsequent messages generated for the
shutdown
// resource sets to be routed to the default resource set/processor of
// the protocol layer.
//
Step C: Delete active mappings from adjacent processor message
routers for (each active processor P_a in the system)
    initialize processors mapping delete list P_aMapDeleteList to
    empty for (each active processor P_a in the system)
    begin
        for (each entity E specified in EntityResourceList)
            if (entity E has a service user or service provider UP on P_a)
                if (E is not distributed)
                    add (E:all :Processor) to P_aMapDeleteList
                else
                    for (each resource set R of E specified in Entity-
                        ResourceList) add (E:R:Processor) to P_a
                        MapDeleteList
    end
    for (each active processor P_a in the system)
        if (P_aMapDeleteList is non-empty)
            send a rClearActiveMap(P_aMapDeleteList) to Message
                Router on P_a
    if (forcedFlag is TRUE)
        wait for rClearActiveMap( ) confirmations from all processors
            P_x where P_x
                != Processor
    else
        wait for all rClearActiveMap( ) confirmations
//
// If any of the resource sets/protocol layers being deleted are standby,
// the actives should stop generating update messages and all standby
// mapping information contained in the routers on the active copy
// processor should be removed.
//
Step D: For Standbys, delete standby mapping on active processors
and stop run time updates
for (each entity E specified in EntityResourceList)
    begin
        if (entity E is not distributed AND is standby)
            let the active copy of E reside on processor P_x
            send a adsmDisablePeer command to E on P_x
            send a rClearStandbyMap(E) to router on P_x
        else
            for (each non-critical resource set R of E)
                if (R is a standby resource set)
                    let active copy of R reside on processor P_x
                    send a adsmDisablePeer(R) command to
                        entity E on P_x
                    send a rClearStandbyMap(E:R) to router on
                        P_x
            for (each critical resource set R of E)
                if (R is a shadow resource set)
                    let master copy of R reside on processor P_x
                    send a rClearMcastList(E:R:Processor) to router
                        on P_x if (R is last shadow resource set)
                            send a adsmDisablePeer(R) command to
                                entity E on P_x
    end
```

-continued

```
if (forcedFlag is TRUE)
    wait for adsmDisablePeer( ) confirmations from all processors
        P_x where
            P_x != Processor
    wait for rClearStandbyMap( ) confirmations from all processors
        P_x where
            P_x != Processor
else
    wait for all adsmDisablePeer( ) confirmations
    wait for all rClearStandbyMap( ) confirmations
// If any critical resource set Masters are being shutdown, their
// shadows on other active active should be shutdown also. In
// addition, the multicast list should be delete and all Master mappings
// should be removed from Routers on processors containing three
// shadows.
Step E: For Critical Resource set Master shutdown, delete all their
shadows
    for (each entity E specified in EntityResourceList)
        for (each critical resource set R_c of entity E specified in
                EntityResourceList)
            send a rDelMcastList(E:R_c) to the Message Router on
                Processor
            for (each non-critical resource set R of entity E)
                let R reside on processor P_r
                if (P_r == Processor) then ignore P_r; continue with loop
                send a rClearMasterMap(E:R_c) to the Message Router
                    on processor P_r
                send an adsmShutdown(R_c) to entity E on processor P_r
            end
        end
    end
if (forcedFlag is TRUE)
    wait for rDelMcastList( ) confirmations from all processors P_x
        where
            P_x != Processor
    wait for rClearMasterMap( ) confirmations from all processors
        P_x where
            P_x != Processor
    wait for adsmShutdown( ) confirmations from all processors P_x
        where P_x !=
Processor
else
    wait for all rDelMcastList( ) confirmations
    wait for all rClearMasterMap( ) confirmations
    wait for all adsmShutdown( ) confirmations
//
// All misc. stuff has been cleaned up, send the resource sets on
Processor
// the shutdown request to shut them down. We don't really expect
// confirmations from these entities completion of this request is based
on
// a timer. If all confirmations are received, the operation will
// complete at that point (before the timer expires.)
//
Step F: Shutdown Resource Sets
    for (each entity E specified in EntityResourceList)
        if (entity E is not distributed)
            send a adsmShutdown( ) request to entity E on Processor
        else
            for (each resource set R of entity E specified in
EntityResourceList)
                send a adsmShutdown(R) to entity E on Processor
        if (forcedFlag is TRUE)
            wait for adsmShutdown( ) confirmations from all processors P_x
where P_x != Processor
        else
            wait for all adsmShutdown( ) confirmations
// If all resource sets of an entity have been removed from Processor,
// we have to automatically remove all the critical shadow resource
// sets from the processor.
//
Step G: If all resource sets have been shutdown, cleanup critical
shadows set MulticastDeleteFlag to FALSE
    for (each entity E specified in EntityResourceList)
        begin
            if (entity E is distributed)
                if (Processor does not contain any more non-critical
resource sets of E)
                    for (each critical resource set R_c of E)
                        begin
                            let the Master resource set of R_c reside on
                                processor P_x
                            send a adsmShutdown(R_c) to entity E on
                                Processor
                            send a rDelMcastListEntry(E:R_c :Processor)
                                to Message
                                    Router on P_x
                            send a rClearMasterMap(E:R_c) to Message Router
                                on Processor
                        end
                end
            if (forcedFlag is TRUE)
                wait for Shutdown confirmations from all processors P_x where
P_x != Processor
                wait for rDelMcastList( ) confirmations from all processors P_x
                    where
                        P_x != Processor
                wait for rClearMasterMap( ) confirmations from all processors
                    P_x where
                        P_x != Processor
            else
                wait for all adsmShutdown( ) confirmations
                wait for all rDelMcastList( )confirmations
                wait for all rClearMasterMap( ) confirmations
            //
            send scShutdown( ) confirmation
        end
```

An example set of shutdown commands and the resulting event flow between architecture components and protocol layers is shown in FIGS. 31 to 43.

If the scShutdown( ) command is issued for a forced shutdown, then the command is not aborted on failures. Forced shutdown ignores the failure and proceeds with the next step of the scShutdown( ) operation.

If the scShutdown( ) command is issued for a controlled shutdown and any of the above-mentioned steps of the scShutdown( ) command fail to complete successfully, the operation is aborted. Depending on the point at which the failure has occurred, aborting a failed scShutdown( ) command may reactivate any resource sets that were shut down in the previous steps. The following two tables specify the steps of the scShutdown( ) command and the steps to be executed if the scShutdown( ) command fails:

| Step | Command Steps |
|---|---|
| A | Indicate neighbor dead to service user. |
| B | Indicate neighbor dead to service provider. |
| C | For active resource sets, delete mapping on adjacent layer routers. |
| D | For standbys, delete standby mapping on peer processor and disable peer update on active resource sets. |
| D1 | Disable peer update on active resource sets. |
| D2 | Clear standby mapping on the active processors. |
| E | For critical master resource set, delete shadows on all processors. |
| E1 | Delete critical resource set multicast list. |
| E2 | Delete master mapping for critical resource set on processors with shadows. |
| E3 | Shut down critical resource set on all processors. |
| F | Shut down non-critical resource sets. |

-continued

| Step | Command Steps |
| --- | --- |
| G | If all non-critical resource sets on a processor are shut down, remove critical shadows. |
| | G1    Delete processor from critical resource set multicast list on master processor. |
| | G2    Delete master mapping for critical resource set on the target processor. |
| | G3    Shut down critical resource set on target processor. |

Each row of the table above indicates a step of the scShutdown( ) command.

| Step | Failure Recovery Steps |
| --- | --- |
| A | Indicate neighbor alive to service user. |
| B | Indicate neighbor alive to service provider. |
| C | For active resource sets, download mapping on adjacent layer routers. |
| D | For standbys, download standby mapping on peer processor and enable peer update on active resource sets. |
| | D1    Enable peer update on active resource sets. |
| | D2    Download standby mapping on the active processors. |
| E | For critical master resource set, reactivate shadows on all processors if failure in step E1, E2. |
| | E1    Download critical resource set multicast list. |
| | E2    Download master mapping for critical resource set on processors with shadows. |
| | E3    None. Continue operation. |
| F | None. Continue operation. |
| G | None. Continue operation. |
| | G1    None. Continue operation. |
| | G2    None. Continue operation. |
| | G3    None. Continue operation. |

Each row of the table above indicates the operation to be executed if the corresponding step of the scShutdown( ) command fails. On failure, all the steps completed prior to the failed step are also rolled back. For example, if a failure occurs on step C in first table, then steps B and A specified in the second table are executed in this sequence to roll back the full operation.

On failure, the System Controller generates an alarm indicating the failure. This alarm is used to identify the location and cause of the failure by the Fault Manager module and generate appropriate commands to recover from the failure.

On completing the scShutdown( ) command of the applications and their resource sets successfully, the System Controller deletes all references to the shutdown resource sets from its internal database. Configuration information about the resource sets received in the entity configuration is maintained for future reference.

When the shutdown resource sets are made active or standby by subsequent scMakeActive( ) and scMakeStandby( ) commands, respectively, the System Controller re-creates associated resource set information in its internal database.

API Function: scForcedSwitchover

Synopsis:

This API function is invoked to recover from the failure of an active resource set of an application on a specified processor.

Parameters:

1. Entity List—This parameter specifies the list of entity identifiers for each application to which the failed active resource set belongs.
2. Resource Set List—For each application specified in (1), this parameter contains a list of failed active resource sets. Note that these resource sets must have a standby copy in the system.
3. New processor ID—This parameter is used when a critical master resource set has failed. The processor ID indicates the location of the shadow that is to take over as the new critical master in the system.
4. Master ID—This parameter indicates the new logical master ID to be assigned to the new critical master resource set if the command is issued to recover from the critical master resource set failure.
5. Sequence Number—This parameter indicates the update message sequence number from which the new master resource set should broadcast the critical update messages to the remaining shadows if the command is issued to recover from the critical master resource set failure.

Return Value:

The return value of this function will always indicate success, and the standby of all the specified active resource sets will become active and take over the input event processing.

Description:

This command makes the standby copy of the failed active resource sets active. The new active copy takes over all processing from the failed active resource sets. User and provider application input events are re-directed to the new active copy of the resource set for processing.

Since the active copy continually updates its standby with internal state changes prior to the failure, the standby copy contains enough information to process incoming input events and provide service to its user applications.

Input events are redirected to the new active resource set copy by updating the resource set to the active processor mappings in the Router module. This is accomplished by using the rSetActiveMap( ) API on all user and provider processors. New events generated by these applications will be routed to the active resource set at the new location.

It is assumed that the Fault Manager isolates the failed active resource sets before issuing this recovery command to recover the resource sets.

For any resource set in the system, the System Controller is aware of the processor on which the active and standby copies of the resource set reside. When recovering a non-critical resource set, the System Controller automatically makes the resource set at the known standby location active to recover from the failure.

To recover from the failure of a critical master resource set, the Fault Manager needs to specify one of multiple critical shadow resource sets to become the new critical master. This information is supplied by specifying the processor ID on which the critical shadow resides (parameter 3, New Processor ID). The System Controller is aware of the current location of the failed critical master resource set from its internal database.

Note that when a critical master resource set fails, the system may have multiple critical shadows. These shadows may not be synchronized, because different shadows may have received different last run-time update message before the failure. The Fault Manager should choose the processor with the shadow that has received the maximum critical update messages from the master. The Fault Manager should also supply the minimum update message sequence number (Parameter 5, Sequence Number) received by any shadow resource set as part of this command. The Fault Manager can inquire the update message sequence number from all shadows by using the adsmGetSeqNum( ) function. As part of the adsmGetSeqNum( ) function, the Fault Manger also supplies a new logical master ID to the critical shadow resource set. The application copy having the shadow resource set returns the last received critical update message sequence number to the Fault Manager. From this point, the application copy rejects any critical update messages that do not come from the assigned logical master ID. This way, any critical update messages from the failed critical master are discarded by the shadows until one shadow becomes the new master. The Fault Manager also supplies this new logical master ID to the System Controller (Parameter 4, Master ID) as part of the forced switchover command. The System Controller invokes the adsmGoActive( ) function with the new master ID and sequence number to make the shadow on the specified processor the master. On receipt of the adsmGoActive( ) command, the new master resource set updates all remaining shadows with the critical update messages starting from the sequence number specified in the command.

This procedure of selecting a new processor ID and supplying a new logical master ID and sequence number is done internally by the System Controller if the application level control API command scDisableNode( ) is used to recover from a failure.

The System Controller in itself is a pure fault-tolerant application to avoid single point of failure in the system. This command can be sent to the System Controller on the standby location to recover from the failure of the System Controller at the active location.

The scForcedSwitchover( ) command is implemented in the System Manager component in the preferred embodiment shown in FIG. 16. The System Manager allows multiple resource sets of multiple protocol layers on a processor to be recovered in a single forced switchover command.

The following algorithm lists each step of the scForcedSwitchover command. These steps are specific to the architecture components and layout of the preferred embodiment:

```
// This procedure performs a forced switchover for all resource sets of all
// entities specified in EntityResourceList. For conventional protocol layers,
// the resource set list is empty.
//
scForcedSwitchover(EntityResourceList)
begin
    // Make routers hold messages towards the resource sets/protocol
    // layers that are going to be switched over. If a critical resource set is
    // being switched over, the hold messages command will be sent to
    // processors containing its shadows.
    //
    // AdjacentP_xList — List of processors where affected service users
    // and               providers exist
    //
    Step A: Hold messages at adjacent upper and lower layers
    for (each active processor P_x in the system)
        initialize adjacent user/provider list AdjacentP_xList to empty
    for (each entity E specified in EntityResourceList)
    begin
        for (each service user and service provider entity X of entity E)
            if (entity X is not distributed)
                let X reside on processor P_x
                add (E:P_x) to AdjacentP_xList if not already present in
                    list
            else
                for (each resource set R of entity X)
                    let R reside on processor P_x
                    add (E:P_x) to AdjacentP_xList if not already
                        present in list
```

```
        if (EntityResourceList contains a critical resource set of E)
            for (each resource set R of entity E)
                let R reside on P_r
                add (E:P_r) to AdjacentP_xList if not already present in
                    list
        end
    end
    for (each active processor P_x in the system)
    begin
        for (each entity E contained in AdjacentP_xList)
            if (entity E is not distributed)
                send a rHoldQueue(E:all) to Message Router on P_x
            else begin
                for (each resource set R of E)
                    send a rHoldQueue(E:R) to Message Router on P_x
            end
    end
    wait for rHoldQueue( ) confirmations from processors not containing
        failed active(s)
    // Delete all standby mappings on the active processor and set the
    // active mapping to current standby processor on this processor.
    //
    Step B: Delete standby mapping & set active mapping on (old) active
        processor
    for (each distributed entity E specified in EntityResourceList)
        for (each resource set R of entity E specified in
            EntityResourceList) if (R is a critical resource set)
                let active copy of R reside on processor P_active
                send a rDelMcastList(E:R) to Message Router on
                    P_active
            else
                let active copy of R reside on processor P_active
                let standby copy of R reside on processor P_standby
                send a rClearStandbyMap(E:R) to Message Router on
                    P_active
                send a rSetActiveMap(E:R:P_standby) to Message Router
                    on P_active
    for (each pure fault-tolerant entity E specified in EntityResourceList)
        let active copy of E reside on processor P_active
        let standby copy of E reside on processor P_standby
        send a rClearStandbyMap(E) to Message Router on P_active
        send a rSetActiveMap(E:all:P_standby) to Message Router on P_active
    wait for rClearStandbyMap( ) confirmations from processors not
        containing
            failed active(s)
    wait for rSetActiveMap( ) confirmations from processors not
        containing failed active(s)
    wait for rDelMcastList( ) confirmations from processors not
        containing failed active(s)
    // Download new standby mappings to the new active processor.
    // Note that at this point, none of the internal data structures have
    // been updates and hence, for a resource set, P_active is the OLD
    // active processor and P_standby is the OLD standby processor.
    //
    Step C: Download new standby mappings and delete old active
        mappings on new
            active processor
    for (each distributed entity E specified in EntityResourceList)
    begin
        for (each resource set R of entity E specified in
            EntityResourceList) begin
            if (resource set R is critical)
            begin
                initialize MCastList to empty
                for (each processor N containing a resource set of E)
                    if (N == P_standby) ignore N; continue with loop
                    add N to MCastList
                if (MCastList is non-empty)
                    send a rAddMcastList(E:R:MCastList) to
                for (each processor N containing a resource set of E)
                    if (N == P_standby) ignore N; continue with loop
                    send a rSetMasterMap(E:R:P_standby) to Message
                        Router on N
        end
```

-continued

```
        if (resource set R is non-critical)
        begin
            let the active of R reside on processor P_active
            let the standby of R reside on processor P_standby
            send a rClearActiveMap(E:R) to Message Router on P_standby
            send a rSetStandbyMap(E:R:P_active) to Message
                Router on P_standby
        end
    end
end
for (each pure fault-tolerant entity E specified in EntityResourceList)
begin
    let active of E reside on P_active
    let standby of E reside on P_standby
    send a rClearActiveMap(E:all) to Message Router on P_standby
    send a rSetStandbyMap(E:all:P_active) to Message Router on
        P_standby
end
wait for rClearActiveMap( ) confirmations from processors not
containing
        failed active(s)
wait for rSetStandbyMap( ) confirmations from processors not
        containing failed active(s)
wait for rAddMcastList( ) confirmations from processors not
        containing failed active(s)
wait for rSetMasterMap( ) confirmations from processors not
        containing failed active(s)
// Download the new resource set to active processor mappings to
// adjacent protocol layer Message Routers.
//
Step D: Download new mappings to adjacent Message Routers
for (each active processor P_x in the system)
        for (each entity E contained in AdjacentP_xList)
            if (entity E is not distributed)
                let the standby of E rside on processor P_standby
                send a rSetActiveMap(E:P_standby) to Message Router
                    on P_x
            else
                for (each resource set R of E)
                    let the standby of resource set R reside on
                        processor P_standby, send a rSetActiveMap(E:P_standby)
                        to
                        Message Router on P_x
wait for rSetActiveMap( ) confirmations from processors not
        containing failed active(s)
// Now, the original actives have become standby so we go ahead
// and make the standby copies active.
//
Step E: Make standbys active
for (each entity E specified in EntityResourceList)
        if (entity E is not distributed)
            let the standby of E reside on processor P_standby
            send a adsmGoActive(enablePeerSap) to E on P_standby
        else
            for (each resource set R of entity E)
                let the standby of R reside on processor P_standby
                send adsmGoActive(R: seqNo=n/a:mId=
                    <crnt-rset-master-id>:disPSap)
                    to entity E on P_standby
wait for adsmGoActive( ) confirmations from processors not
containing failed active(s)
// We now release messages at the adjacent routers. At this point,
protocol
// traffic through the switched entities/resource sets will resume.
Step F: Release messages held at adjacent processors
for (each active processor P_x in the system)
        for (each entity E contained in AdjacentP_xList)
            if (entity E is not distributed)
                send a rReleaseQueue(E:all) to Message Router on P_x
            else
                for (each resource set R of E)
                    send a rReleaseQueue(E:R) to Message Router on
                        P_x
wait for rReleaseQueue( ) confirmations from processors not
        containing failed active(s)
```

-continued

```
Step G: Cleanup critical shadow resource sets on old/faulty
    processors for (each distributed entity E specified in
    EntityResourceList)
        for (each processor P_x on which entity E resided before the
                forced switchover)
            if (all resource sets of E have been shutdown on P_x)
                for (each critical resource set R of entity E)
                    let the master resource set of R reside on P_master
                    send a rDelMcastListEntry(E:R:P_x) to Message
                        Router on P_master
                    send a adsmShutdown(R) to entity E on processor
                        P_x
    for (each pure fault-tolerant entity E specified in EntityResourceList)
        let old active copy reside on P_active
        send a adsmShutdown( ) to E on P_active
    wait for rDelMcastList( ) confirmations from processors not
        containing failed active(s)
    send scForcedSwitchover( ) confirmation
end
```

An example set of forced switchover commands and the resulting event flow between architecture components and protocol layers is shown in FIGS. 44 to 50.

On failure, the scForcedSwitchover( ) command is not aborted but ignores the failure and proceeds with the next step of the scForcedSwitchover( ) operation.

If any of the above-mentioned steps of the scForcedSwitchover( ) command fail to complete successfully, the System Controller generates an alarm indicating the failure. The Fault Manager module uses this alarm to identify the location and cause of the failure. The Fault Manager isolates the new failure and typically issues a new scForcedSwitchover( ) command to the System Controller to recover from the new failure. This cycle continues until all failures have been recovered.

On completion of the scForcedSwitchover( ) operation, the standby copy of the resource set becomes active, and the System Controller discards the old active copy of the resource set. The scMakeStandby( ) command can be used to dynamically create a new standby resource set at a new location to replace the lost standby resource set (which is now active).

API Function: scControlledSwitchover

Synopsis:

This API function is invoked to swap the states of a pair of active/standby resource sets. This command is used for maintenance purposes. It may also be used to perform application software upgrade operations without disrupting the service provided by the application.

Parameters:
1. Entity List—This parameter specifies the list of entity identifier for each application whose resource sets have to be swapped.
2. Resource Set List—For each application specified in (1), this parameter contains a list of resource sets. Note that these resource sets must have a standby copy in the system.
3. New processor ID—This parameter is used when a critical master resource set is being swapped. The processor ID indicates the location of the shadow that is to take over as the new critical master in the system.

Return Value:

The return value of this function indicates whether all specified resource sets of the specified applications could be switched over. If the return value indicates failure, none of the specified resource sets of any of the specified applications will switch over. If the return value indicates success, switchover of all resource sets of all specified applications has been accomplished.

Description:

This command makes the standby copy of the active active resource set active and the active copy of the resource set standby. The new active copy of the resource set will take over all processing from the old active resource set. User and provider application input events are re-directed to the new active copy of the resource set for processing.

The System Controller instructs the active copy of the resource set to update all internal transient state information to the standby using the adsmPeerSync( ) command. Before the peersync command can be executed, the System Controller must ensure that the active copy of the resource set does not receive any input events that will cause it to undergo an internal state change after it has updated its standby counterpart.

This blocking of all input events is achieved by informing the Router components on all user and provider processors to hold all input messages scheduled for delivery to the resource set undergoing the controlled switchover. This is achieved via the rHoldQueue( ) Router API function.

Once input events are held at the Routers, the communications links between processors must be flushed to ensure that no input events are on the way from the service user/provider applications to the resource set undergoing the switchover. This is achieved by sending a message through the links to be flushed and waiting for a response to the message. This is performed via the rAdjacentPing( ) API function provided by the Router.

If the resource sets in a service user and provider application are being switched over in the same scControlledSwitchover( ) command, then the router on the active processor needs to update all the messages being held for the resource set to the Router on the standby processor. This procedure is called Router synchronization, and this scenario is known as a pair switch case. The System Controller uses the rPeerSync( ) API to initiate router synchronization for the pair switch case.

After the active resource set updates all transient information to the standby resource set, the system controller uses the adsmGoStandby( ) API to make the active resource set standby and the adsmGoStandby( ) API to make the standby resource set active.

Input events are redirected to the new active resource set copy by updating the resource set to active processor mappings in the Router module using the rSetActiveMap( ) API on all user and provider processors. New events generated by these applications will be routed to the active resource set at the new location.

For any resource set in the system, the System Controller is aware of the processor on which the active and standby copies of the resource set reside. When recovering a non-critical resource set, the System Controller automatically makes the resource set at the known standby location active and the resource set at the known active location standby.

To swap states of a critical master resource set, the Fault Manager must specify one of multiple critical shadow resource sets to become the new critical master. This information is supplied by specifying the processor ID on which the critical shadow resides (parameter 4, New Processor ID). The critical shadow at this location is made the new master, and the current critical master resource set becomes a critical shadow.

The scControlledSwitchover( ) command is implemented in the System Manager component in the preferred embodiment shown in FIG. 16. The System Manager allows multiple resource sets of multiple protocol layers to be swapped in a single controlled switchover command.

The following algorithm lists each step of the scControlledSwitchover( ) command. These steps are specific to the architecture components and layout of the preferred embodiment:

```
// This procedure performs a controlled switchover for all resource sets of
// all entities specified in EntityResourceList. For conventional protocol
// layers, the resource set list is empty.
//
scControlledSwitchover(EntityResourceList)
begin
    // Make routers hold messages towards the resource sets/protocol
    // layers that are going to be switched over. If a critical resource set is
    // being switched over, the hold messages command will be sent to
    // processors containing its shadows.
    //
    Step A: Hold messages at adjacent upper and lower layers
    for (each active processor P_x in the system)
        initialize adjacent user/provider list AdjacentP_xList to empty
    for (each entity E specified in EntityResourceList)
    begin
        for (each service user and service provider entity X of entity E)
            if (entity X is not distributed)
                let X reside on processor P_x
                add (E:P_x) to AdjacentP_xList if not already present in
                list
            else
                for (each resource set R of entity X)
                    let R reside on processor P_x
                    add (E:P_x) to AdjacentP_xList if not already
                    present in list
        if (EntityResourceList contains a critical resource set of E)
            for (each resource set R of entity E)
                let R reside on P_r
                add (E:P_r) to AdjacentP_xList if not already present in
                list
    end
    for (each active processor P_x in the system)
    begin
        for (each entity E contained in AdjacentP_xList)
            if (entity E is not distributed)
                send a rHoldQueue(E:all) to Message Router on P_x
            else begin
                for (each resource set R of E)
                    send a rHoldQueue(E:R) to Message Router on P_x
                end
    end
    wait for all rHoldQueue( ) confirmations
    // Now, we have to flush out all messages destined to the
    entities/resource        // sets that are going to be switched. These
    messages may be stuck
    // on the wire so we send a ping message to make sure the wire is
    clean.
Receiving
    // the ping confirmation indicates that no more messages towards the
    // affected resource sets/entities are floating on the wire.
    //
    Step B: Clear communications channels with adjacent processors
    initialize AdjacentProcList to empty
    for (each active processor P_x in the system)
        if (AdjacentP_xList is not empty)
            for (each entity E specified in AdjacentP_xList)
                if (entity E is not distributed)
                    let E reside on processor P_y
                    if (both (P_x,P_y) and (P_y,P_x) do not exist in
                        AdjacentProcList)
                        add (P_x,P_y) to AdjacentProcList
                    else
```

```
            for (each resource set R of E contained in
                EntityResourceList)
                    let R reside on processor P_y
                    if (both (P_x P_y) and (P_y P_x) do not exist in
                        AdjacentProcList)
                        add (P_x P_y) to AdjacentProcList
for (each entry J of AdjacentProcList)
    if (J-> P_y is not equal J-> P_x)
        send a rAdjacentPing(J-> P_y) to Message Router on J-> P_x
wait for all rAdjacentPing( ) confirmations
// Now, we make the actives synchronize their standbys. This is done
// to have all transient states sent over to the standbys to they can take
// over from the actives with no loss of messages/state.
//
Step C: Peer Sync Actives and Standbys
for (each entity E specified in EntityResourceList)
    if (entity E is not distributed)
        let active of E reside on processor P_active
        send a adsmPeerSync( ) to entity E on P_active
    else
        for (each resource set R of E specified in
            EntityResourceList)
                let the active of R reside on processor P_active
                send a adsmPeerSync(R) to entity E on P_active
end
wait for all adsmPeerSync( ) confirmations
// If the source of queued messages also moves then the Message
// Router needs to transfer these messages to the message router to
// which the source has moved.
//
Step D: Peer Synchronize Message Routers for Pair Switch Case
for (each entity E specified in EntityResourceList)
begin
    initialize PeerSyncList to empty
    if (E is a distributed protocol layer)
        for (each resource set E_r of entity E specified in
            EntityResourceList)
                let the standby of E_r reside on processor P_standby
                add (E:E_r :P_standby) to PeerSyncList
    else
        let the standby of E reside on processor P_standby
        add (E:all:P_standby) to PeerSyncList
    if (EntityResourceList contains a service user or provider UP
        entity of E)
    begin
        if (UP is a distributed entity)
            for (each resource set R of UP specified in
                EntityResourceList)
                    let active copy of R reside on processor P_active
                    send a rPeerSync(PeerSyncList) to message router
                        on P_active
        else
            let active copy of entity UP reside on processor P_active
            send a rPeerSync(PeerSyncList) to message router on
                P_active
    end
end
wait for all rPeerSync( ) confirmations
// Delete all standby mappings on the active processor and set the
// active mapping to current standby processor on this processor.
//
Step E: Delete standby mapping & set active mapping on (old) active
processor
for (each distributed entity E specified in EntityResourceList)
    for (each resource set R of entity E specified in
        EntityResourceList)
            if (R is a critical resource set)
                let active copy of R reside on processor P_active
                send a rDelMcastList(E:R) to Message Router on
                    P_active
            else
                let active copy of R reside on processor P_active
                let standby copy of R reside on processor P_standby
                send a rClearStandbyMap(E:R) to Message Router on
                    P_active
                send a rSetActiveMap(E:R:P_standby) to Message Router
                    on P_active
for (each pure fault-tolerant entity E specified in EntityResourceList)
    let active copy of E reside on processor P_active
    let standby copy of E reside on processor P_standby
    send a rClearStandbyMap(E) to Message Router on P_active
    send a rSetActiveMap(E:all:P_standby) to Message Router on P_active
wait for all rClearStandbyMap( ) confirmations
wait for all rSetActiveMap( ) confirmations
wait for all rDelMcastList( ) confirmations
// Download new standby mappings to the new active processor. Note
// that at this point, none of the internal data structures have been
// updates and hence, for a resource set, P_active is the OLD active
// processor and P_standby is the OLD standby processor.
//
Step F: Download new standby mappings and delete old active
mappings on new
active processor
for (each distributed entity E specified in EntityResourceList)
begin
    for (each resource set R of entity E specified in
        EntityResourceList)
    begin
        if (resource set R is critical)
        begin
            initialize MCastList to empty
            for (each processor N containing a resource set of E)
                if (N == P_standby) ignore N; continue with loop
                add N to MCastList
            if (MCastList is non-empty)
                send a rAddMcastList(E:R:MCastList) to
                    Message Router on P_standby
            for (each processor N containing a resource set of E)
                if (N == P_standby) ignore N; continue with loop
                send a rSetMasterMap(E:R:P_standby) to Message
                    Router on N
        end
        if (resource set R is non-critical)
        begin
            let the active of R reside on processor P_active
            let the standby of R reside on processor P_standby
            send a rClearActiveMap(E:R) to Message Router on
                P_standby
            send a rSetStandbyMap(E:R:P_active) to Message Router
                on P_standby
        end
    end
end
for (each pure fault-tolerant entity E specified in EntityResourceList)
begin
    let active of E reside on P_active
    let standby of E reside on P_standby
    send a rClearActiveMap(E:all) to Message Router on P_standby
    send a rSetStandbyMap(E:all:P_active) to Message Router on
        P_standby
end
wait for all rClearActiveMap( ) confirmations
wait for all rSetStandbyMap( ) confirmations
wait for all rAddMcastList( ) confirmations
wait for rSetMasterMap( ) confirmations
// Download the new resource set to active processor mappings to
// adjacent protocol layer Message Routers.
//
Step G: Download new mappings to adjacent Message Routers
for (each active processor P_x in the system)
    for (each entity E contained in AdjacentP_xList)
        if (entity E is not distributed)
            let the standby of E reside on processor P_standby
            send a rSetActiveMap(E:P_standby) to Message Router
                on P_x
        else
            for (each resource set R of E)
                let the standby of resource set R reside on
                    processor P_standby
                send a rSetActiveMap(E:P_standby) to Message
                    Router on P_x
wait for all rSetActiveMap( ) confirmations
// Make resource sets at the currently active location standby. This is
// done first to prevent having two active copies in the system at the
same
```

-continued

```
// time. Its OK to have two standby copies in the system at the same
// time since they are both passive.
//
Step H: Make actives standby
for (each entity E specified in EntityResourceList)
        if (entity E is not distributed)
                let the active of E reside on processor P_active
                send a adsmGoStandby( ) to E on P_active
        else
                for (each resource set R of entity E)
                        let the standby of R reside on processor P_active
                        send a adsmGoStandby(R:mId=<crnt-rset-master-id>)
                                to entity E on processor P_active
wait for all adsmGoStandby( ) confirmations
// Now, the original actives have become standby so we go ahead and
// make the standby copies active.
//
Step I: Make standbys active
for (each entity E specified in EntityResourceList)
        if (entity E is not distributed)
                let the standby of E reside on processor P_standby
                send a adsmGoActive(enablePeerSap) to E on P_standby
        else
                for (each resource set R of entity E)
                        let the standby of R reside on processor P_standby
                        send adsmGoActive(R: seqNo=n/a:mId=
                                <crnt-rset-master-id>:enaPSap)
                                to entity E on P_standby
wait for all adsmGoActive( ) confirmations
// If a pair switch was taking place, we have to release their queued
// messages first to preserve the order of messages.
//
Step J: Release messages for Pair Switch Case
for (each entity E specified in EntityResourceList)
begin
        if (EntityResourceList contains a user or provider of entity E)
                for (each resource set R of E specified in
                        EntityResourceList)
                        let new active copy of R reside on processor P_active
                        send a rReleaseQueue(E:R) to Message Router on
                                P_active
end
wait for all rReleaseQueue( ) confirmations
// We now release messages at the adjacent routers. At this point,
protocol
// traffic through the switched entities/resource sets will resume.
Step K: Release messages held at adjacent processors
for (each active processor P_x in the system)
        for (each entity E contained in AdjacentP_xList)
                if (entity E is not distributed)
                        send a rReleaseQueue(E:all) to Message Router on P_x
                else
                        for (each resource set R of E)
                                send a rReleaseQueue(E:R) to Message Router on
                                        P_x
        wait for all rReleaseQueue( ) confirmations
send scCntrlledSwitchover( ) confirmation
end
```

An example set of controlled switchover commands and the resulting event flow between architecture components and protocol layers is shown in FIGS. 51 to 61.

On failure, the scControlledSwitchover( ) command is aborted and all affected resource sets are restored to their previous states (that is, the operation is rolled back).

The following two tables specify the steps of the scControlledSwitchover( ) command and the steps to be executed if the command fails:

| Step | Command Steps |
|---|---|
| A | Hold message at adjacent upper and lower layers. |
| B | Clear communications channels with adjacent processors. |
| C | Peersync actives and standbys. |
| D | Peersync message routers for pair switch case. |
| E | Delete standby and set active mappings on old active processors. |
| F | Download standby and delete active mappings on new active processors. |
| G | Download new mappings to adjacent routers. |
| H | Make resource sets standby on old active processor. |
| I | Make resource sets active on new active processor. |
| J | Release messages for pair switch case |
| K | Release messages at adjacent routers |

Each row of the table above indicates a step of the scControlledSwitchover command.

| Step | Failure Recovery Steps |
|---|---|
| A | Release messages at the upper and lower adjacent routers and pair switch routers if any. |
| B | None, rollback operation. |
| C | Send adsmGoActive command to the original actives and the adsmGoStandby command to the original standbys. |
| D | None, rollback operation. |
| E | Set standby and delete active mappings on old active processors. |
| F | Clear standby and set active mappings on new active processor. |
| G | Download original mappings to adjacent routers. |
| H | Make resource sets active on old active processor. |
| I | Make resource sets standby on new active processor. |
| J | None, continue operation. |
| K | None, continue operation. |

Each row of the table above indicates the recovery action taken if the corresponding step of the scControlledSwitchover command fails. On failure, all the steps completed prior to the failed step are also rolled back. For example, if a failure occurs on step D in first table, then steps D, C, B, and A specified in the second table are executed in this sequence to roll back the full operation.

If any of the above-mentioned steps of the scControlledSwitchover( ) command fail to complete successfully, the System Controller generates an alarm indicating the failure and possible location of the fault. The Fault Manager module uses this alarm to identify the location and cause of the failure and generate the appropriate commands to recover from the failure.

On completion of the scControlledSwitchover( ) operation, the standby copy of the resource set becomes active and the active copy of the resource set becomes standby. The System Controller makes the appropriate updates to its internal database to reflect the new states and locations of the affected resource sets of the application.

API Function: scForcedDove

Synopsis:

This API function is invoked to move a resource set from its current location to a new location. This function is applicable only for the applications in pure distributed mode in which the active resource set's failure cannot be recovered because the corresponding standby resource sets are not present. This operation can be used to reactivate the failed active resource sets on the new location to process new inputs events. This operation is only defined for non-critical active resource sets and critical master resource sets.

Parameters:
1. Source Processor ID—This parameter indicates the processor from which resource sets are to be moved.
2. Destination Processor ID—This parameter indicates the processor to which resource sets are to be moved.
3. Entity List—This parameter specifies a list of entity identifiers for each application whose resource sets are to be moved.
4. Resource Set List—For each application in (1), this parameter contains a list of resource sets that are to be moved from the specified source processor to the specified destination processor.

Return Value:

The return value of this function will always indicate success, and all the specified resource sets will be moved to the new location.

Description:

This command moves the specified resource sets from the source processor to the destination processor as specified in the following table.

| Resource Set States on Processor | | |
| --- | --- | --- |
| Source | Destination | Operation |
| Active | Out of Service | Active resource set is moved from the source processor to the destination processor by using the scMakeActive( ) command. |
| Active | Standby | Invalid command. A resource set may not be moved to a processor containing its standby counterpart. |
| Standby | Don't care | Standby resource set cannot be moved using the scForcedMove( ) command. |
| Critical Master | Critical Shadow | A Forced Switchover operation is performed for the critical resource set to move the master to the destination processor by using the scForcedSwitchover( ) command. The resource set at the source location becomes a critical shadow. |
| Critical Master | Out-of-Service | The critical resource set is moved to the destination processor by using the scMakeActive( ) command. The resource set at the source location becomes a critical shadow. |
| Critical Shadow | Don't Care | Illegal command. Critical shadow resource sets may not be moved. |

If a scForcedMove( ) operation results in all resource sets of the application moving to the specified destination location, the System Controller removes all mapping information in the Router using rClearActiveMap( ) on the source processor and all supporting critical shadow resource sets of the application.

Note that the forced move operation may result in the loss of state information within resource sets of the application and may disrupt service provided to the service user applications by the resource sets that are in the process of moving. Service provided by other resource sets of the application not involved in the move operation will be unaffected.

On completion of the scForcedMove( ) operation, input events arriving at the moved active resource sets are re-directed to resource sets at the new location by updating the resource set to processor mapping information in the Router component using rSetActiveMap( ) in the system.

The scForcedMove( ) command is implemented in the System Manager component in the preferred embodiment shown in FIG. 16.

On failure, the scForcedMove( ) command is NOT aborted, but ignores the failure and proceeds with the next step of operation.

If any of the steps of the scForcedMove( ) command fail, the System Controller generates an alarm indicating the failure. The Fault Manager module uses this alarm to identify the location and cause of the failure and generate the appropriate commands to recover from the failure.

API Function: scControlledMove

Synopsis:

This API function is invoked to move a resource set from its current location to a new location in a controlled way without losing any information. The Load Manager can use this function for dynamic load balancing in a distributed application by moving a resource set from one processor to a relatively idle processor. This function can be used for active, standby, or master critical resource sets.

Parameters:
1. Source Processor ID—This parameter indicates the processor from which resource sets are to be moved.
2. Destination Processor ID—This parameter indicates the processor to which resource sets are to be moved.
3. Entity List—This parameter specifies a list of entity identifiers for each application whose resource sets are to be moved.
4. Resource Set List—For each application specified in (1), this parameter contains a list of resource sets that are to be moved from the specified source processor to the specified destination processor.

Return Value:

The return value of this function indicates whether all resource sets of the applications could be moved to the specified location. If the return value indicates failure, none of the specified resource sets of any of the specified applications will be moved. If the return value indicates success, all resource sets of all specified applications will have been moved.

Description:

This command moves the specified resource sets from the source processor to the destination processor in a controlled way.

The following table describes the controlled move operation in detail:

| Resource Set States on Processor | | |
| --- | --- | --- |
| Source | Destination | Operation |
| Active | Out-of-Service | The active resource set is moved from the source processor to the destination processor by using the scMakeStandby( ), scControlledSwitchover( ), and scShutdown( ) commands. |
| Active | Standby | Invalid command. A resource set may not be moved to a processor containing its standby counterpart. |
| Standby | Out-of-Service | The standby resource set is moved from the source processor to the destination processor, by using the scShutdown( ) and scMakeStandby( ) commands. |

-continued

| Resource Set States on Processor | | |
|---|---|---|
| Source | Destination | Operation |
| Standby | Active | Invalid command. A resource set may not be moved to a processor containing its active counterpart. |
| Critical Master | Critical Shadow | A Controlled Switchover operation is performed for the critical resource set to move the master to the destination processor by using the scControlledSwitchover( ) command. The resource set at the source location becomes a critical shadow. |
| Critical Master | Out-of-Service | The critical resource set is moved to the destination processor by using the scMakeStandby( ) and scControlledSwitchover( ) commands. The resource set at the source location becomes a critical shadow. |
| Critical Shadow | Don't Care | Illegal command. Critical shadow resource sets may not be moved. |

The controlled move operation, unlike the forced move operation, may be carried out without disrupting service provided by the application to its users. The controlled move operation is exactly the same as the forced move operation in all other aspects.

The scControlledMove( ) command is implemented in the System Manager component in the preferred embodiment shown in FIG. 16. The System Manager allows multiple resource sets of multiple protocol layers to be moved in a single controlled move command.

On failure, the scControlledMove( ) command is aborted and all the previous steps completed are rolled back. After rollback, all the resource sets are moved to their original locations.

If any of the steps of the scControlledMove( ) command fail, the System Controller generates an alarm indicating the failure. The Fault Manager module uses this alarm to identify the location and cause of the failure and generate appropriate commands to recover from the failure.

The Control API—Application Control:

The application level control API is used to activate applications and introduce new applications and/or new processors into the system dynamically (that is, at run time). The System Controller uses the entity type configuration information supplied by the scConfigure( ) function to perform application-level API functions.

Figure 62:
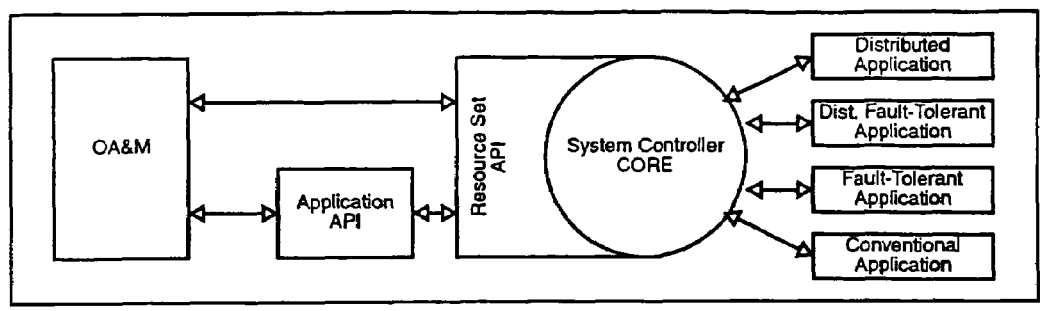
FIG. 62 illustrates multiple System Controller APIs.

The application-level control API is built on top of the resource set level control API (see FIG. 62). The application control API uses resource set control API commands internally.

An application is introduced into the system after the copy of the application on the specified processor is configured and all its resource sets on the processor are in the out-of-service state.

The following table describes the functionality provided by the application level control API:

| API Name | Parameters | Description |
|---|---|---|
| ScEnableNode | Processor ID Entity List Processor Usage Last Processor Flag | This operation is used to (re-) distribute and activate application resource sets on a set of processors. (Re-) Distribution of the resource sets is performed automatically by the System Controller. |
| ScDisableNode | Processor ID Entity List Forced Flag Re-Distribute Flag | This operation is used to remove resource sets of an application from a processor. Optionally, the removed resource sets may be activated on other available processors in the system. |
| ScSwapNode | Source Processor ID Destination Processor ID Entity List | This operation is used to swap the contents of two processors in the system. |
| ScAbort | None. | This operation is used to stop an ongoing control operation. Any partial effects of an aborted operation are removed. |

The following text describes the API function used to introduce applications into the system.

API Function: scEnableNode

Synopsis:

This API function is invoked to activate an application on a specified processor in a specified mode. The System Controller internally assigns the resource set to be an application within the application on the specified processor and activates it. This way, this function can be used to activate the application on a processor without specifying the resource set to be activated.

Parameters:
 1. Processor ID—This parameter identifies the processor on which the new application copy is to execute.
 2. Entity List—This parameter specifies a list of entity identifiers for each application that is to be introduced on the specified processor. The System Controller is aware of the number and identifiers of the resource sets that this application has been divided into.
 3. Processor Usage—This parameter indicates to the System Controller how the specified application is to use the specified processor. This parameter may specify active, standby, or active-and-standby. If active is specified as the processor usage, only active copies of this application's resource sets will be placed on this processor. If standby is specified as the processor usage, only standby resource sets of the application will be placed on this processor. If active-and-standby is specified as the processor usage, both active and standby resource sets will be placed on the processor. Various types of application configurations, such as Pure Fault-Tolerant, Pure Distributed, Non-Dedicated Distributed Fault-Tolerant, and Dedicated Distributed Fault-Tolerant (Symmetric and Asymmetric), may be created using the processor usage specifier.
 4. Last Processor Flag—This Boolean field specifies whether this processor is to be the last processor to be introduced for the specified application. If, for example, an application is to be distributed over 'n' processors, 'n-1' calls to this function will be made, each containing one of the 'n-1' processor IDs, all with last-processorflag cleared. The last 'n-th' call to this function will contain the last processor ID to be introduced and will have the last-processor-flag set to indicate to the System Controller that no more processors are to be introduced for the specified application. When more than one processor is introduced in the system using the scEnableNode( ) function, the last processor should be set to TRUE when the last processor is introduced in the system to minimize resource set movements between processors. This flag also indicates to the System Controller that the service user and provider application can send input events to the specified application.

Return Value:

The return value of this function indicates whether the application could be placed on the specified processor.

Description:

When an application is introduced into the system on a set of processor IDs, multiple calls to the scEnableNode( ) function are made, one for each processor ID to be introduced into the system.

For each processor introduced for an application, the processor-usage specifier indicates how resource sets of the application will reside on the introduced processor.

The System Controller is pre-configured with the number and identifiers of resource sets that each application is divided into.

The System Controller updates its internal database about the location and allowed usage of each introduced processor for each introduced application. No further action is taken for scEnableNode( ) commands that have the last-processor-flag set to false.

The following table describes the sequence of scEnableNode( ) commands required to create various configurations for an application:

| Configuration | scEnableNode( ) Parameters and Calling Sequence | | | |
|---|---|---|---|---|
| | Processor | Entity | Usage | Last-Processor |
| Pure Fault-Tolerant (active on processor 1, standby on processor 2) | 1 | App | Active | False |
| | 2 | App | Standby | True |
| Pure Distributed (on processors 1, 2, and 3) | 1 | App | Active | False |
| | 2 | App | Active | False |
| | 3 | App | Active | True |
| Dedicated Distributed Fault-Tolerant Asymmetric (active on processors 1, 2, and 3, standby on processors 4 and 5) | 1 | App | Active | False |
| | 2 | App | Active | False |
| | 3 | App | Active | False |
| | 4 | App | Standby | False |
| | 5 | App | Standby | True |
| Dedicated Distributed Fault-Tolerant Symmetric (active on processors 1 and 2, standby on processors 3 and 4) | 1 | App | Active | False |
| | 2 | App | Active | False |
| | 3 | App | Standby | False |
| | 4 | App | Standby | True |
| Non-Dedicated Distributed Fault-Tolerant (active and standby on processors 1, 2, 3, and 4) | 1 | App | Active + Standby | False |
| | 2 | App | Active + Standby | False |
| | 3 | App | Active + Standby | False |
| | 4 | App | Active + Standby | True |

When the System controller receives an scEnableNode( ) command for an application with the last-processor-flag set to true, the System Controller makes resource sets of the specified applications active and standby as dictated by the processor-usage specifier for each processor on which the application is allowed to execute. This information has been collected and recorded during the multiple previous invocations of the scEnableNode( ) command for the application.

The following table describes the resource set to processor assignment used by the System Controller to assign active and standby copies of resource sets to processors. Note that the configured-entity-type specification is received by the System Controller as part of the entity configuration information. The notations used in the following table are:

A (I) B=0: A is the list of active processors and B is the list of standby processors. No processor ID exists in both list A and list B.

O(A): Number of elements in list A.

O(B): Number of elements in list B.

| Processors Specified | | Condition | Configured Entity Type | Resource Set Assignment Logic |
|---|---|---|---|---|
| Active Set | Standby Set | | | |
| A | Null | None Note: 1) O(A) = 1 implies Conventional System 2) O(A) > 1 implies Pure Distributed System | Don't care | Assign all active resource sets of the entity to the specified active processors in a round-robin manner. |
| A | B | A = B | Non-Dedicated | Assign active resource sets to processors specified in A in a round-robin manner. For each active processor 'a' in A, assign one standby processor 's' from A such that 'a' 's'. |
| | | | Dedicated | Configuration error. Dedicated systems may not have the same processor in both active and standby sets of processors. |
| A | B | O(A) != O(B) A (I) B = 0 Note: O(A) = 1 & O(B) = 1 implies Pure Fault-Tolerant System | Dedicated | Assign active resource sets to processors specified in A in a round-robin manner. For each active processor 'a' in A, assign all standby resource sets to one standby processor 's' from B that can be used as standby for A. Assuming all standby can backup any active processor, O(A) > O(B) will result in more than one active being backed up on some standby processors. O(A) = O(B) will result in one active backed up on one standby processor. |

-continued

| Processors Specified | | | Configured | |
|---|---|---|---|---|
| Active Set | Standby Set | Condition | Entity Type | Resource Set Assignment Logic |
| | | | Non-Dedicated | O(A) < O(B) will result in one active backed up on one standby processor, and some standby processor will not be used. Configuration error. The set of active and standby processors cannot be disjoint for non-dedicated systems. |
| A | B | A (I) B ø | Non-Dedicated | Assign active resource sets to processors specified in A in a round-robin manner. For each active processor 'a' in A, assign one standby processor 's' from A such that 'a' 's'. Processors contained in A and B will contain active and standby resource sets. Processors only in A will contain only active resource sets and processors only in B will contain only standby resource sets. |
| | | | Dedicated | Configuration error. Dedicated systems may not have the same processor in both active and standby sets of processors. |

As described in the above table, the System Controller assigns resource sets to processors in active and standby mode when the last-processor-flag is set for an application. After the assignment has been completed, the System Controller uses the resource set level scMakeActive( ) and scMakeStandby( ) commands provided by the System Controller resource set control API to make assigned resource sets active and standby on the designated processors.

Once resource sets of the application have been made active on the designated processors, the application will begin to provide service to its user applications. The application is said to be active at this point.

Once resource sets of the application have been made standby on the designated processors, the resource sets are fault-tolerant.

When an application is operational, the scEnableNode( ) command may be used to introduce the application to a new set of processors. This procedure, which may be performed when the application is already active, is known as Dynamic Node Introduction.

Dynamic node introduction is used to add additional processing power to an already activated application by introducing a new processor for the application. This feature may also be used to introduce standbys for an application to make it fault-tolerant after the application has begun to provide service in the system.

If the scEnableNode( ) command is issued for an activated application with a new processor, the System Controller will re-assign resource sets to the newly-introduced set of processors, depending on the processor-usage specifier for each introduced processor and the configured-entity-type for the specified application.

If a new set of 'n' processors is to be introduced for an activated application, 'n-1' scEnableNode( ) commands, one for each of the 'n-1' processors, must be issued with the last-processor flag set to false. The last 'nth' processor must be introduced with the last-processor flag set to true.

The following table describes the re-assignment of active and standby resource sets to the new set of processors:

| Processors Specified | | | Configured | |
|---|---|---|---|---|
| Active Set | Standby Set | Condition | Entity Type | Resource Set Assignment Logic |
| A | Null | None | Don't care | Reassign and move active resource sets from the old active processors to the newly-introduced active processor sets, such that the resource sets' movement between processors is minimal, and resource sets are distributed across all active processors as evenly as possible. |
| A | B | A = B or A (I) B ø | Non-Dedicated | Reassign and move active resource sets from old active processors to the newly-introduced active processor sets, such that the resource sets' movement between processors is minimal, and resource sets are distributed across all active processors as evenly as possible. Reassign and move standby resource sets from old standby processors to the newly-introduced standby processor sets, such that the resource sets' movement between processors is minimal, and resource sets are distributed across all standby processors as evenly as possible, and one active is fully backed up on one standby. |
| | | | Dedicated | Configuration error. Dedicated systems may not have the same processor in both active and standby sets of processors. |

-continued

| Processors Specified | | Condition | Configured Entity Type | Resource Set Assignment Logic |
|---|---|---|---|---|
| Active Set | Standby Set | | | |
| A | B | O(A) != O(B) A (I) B = ø | Dedicated | Reassign and move active resource sets from the old active processors to the newly-introduced active processor sets, such that the resource sets' movement between processors is minimal, and resource sets are distributed across all active processors as evenly as possible. Reassign and move standby resource sets from old standby processors to the newly-introduced standby processor sets, such that the resource sets' movement between processors is minimal, and resource sets are distributed across all standby processors as evenly as possible, and one active is fully backed up on one standby. Assuming all standby processors can backup all active processors, if O(A) > O(B), some standby processors will have more than one active processor backed up. If O(A) = O(B), one standby processor will have one active processor backed up. If O(A) < O(B), some standby processors will not be used. |
| | | | Non-Dedicated | Configuration error. The set of active and standby processors cannot be disjoint for non-dedicated systems. |

After resource set to processor assignments are performed as specified in the table above, the System Controller uses the resource set control API provided by the System Controller to move active and standby resource sets from their existing location to their newly assigned processors.

Note that the movement of resource sets does not disrupt service provided by the application to its user applications. User applications are transparent to the re-distribution of both active and standby resource sets.

The scEnableNode( ) command is implemented in the System Manager component in the preferred embodiment shown in FIG. 16. The System Manager allows multiple protocol layers to be enabled on a processor in a single enable node command. New processors may be introduced for multiple protocol layers, each residing in any configuration with a single enable node command.

On failure, the scEnableNode( ) command is aborted and all the previous steps completed are rolled back. After rollback, all the resource sets are moved to their original location.

If any of the steps of the scEnableNode( ) command fail, the System Controller generates an alarm indicating the failure. The Fault Manager module uses this alarm to identify the location and cause of the failure and generate appropriate commands to recover from the failure.

API Function: scDisableNode

Synopsis:

This API function is invoked to remove or de-activate an application from the specified processor. This operation is performed when the application is being gracefully shut-down, when the specified processor fails, or when the specified processor is to be gracefully removed from the system.

Parameters:

1. Processor ID—This parameter identifies the processor from which the specified application is to be removed.
2. Entity List—This parameter specifies the list of entity identifiers for each application that is to be removed from the specified processor. The System Controller is aware of the number and identifiers of resource sets of this application that reside in active or standby mode on the specified processor.
3. Forced Flag—This Boolean field specifies whether this processor is to be removed from the system in a forced (TRUE) or controlled (FALSE) manner. Failed processors are removed from the system in a forced manner. Applications or processors are gracefully removed from the system in a controlled manner.
4. Re-Distribute Flag—If this flag is set to TRUE, the System Controller will attempt to recover or re-distribute and re-start those resource sets of the application that are currently located on the processor being disabled. If this flag is FALSE, the System Controller will not attempt to re-distribute or re-start resource sets of the application.

Return Value:

If a controlled disable is performed (forced-flag is FALSE), the return value will indicate success or failure of the disable operation. If the return value indicates failure, none of the resource sets of the application will be removed from the specified processor. If the return value indicates successful completion of the disable node operation, all active and standby resource sets-of the application residing on the specified processor will have been removed.

If a forced disable is performed (forced-flag is TRUE), the return value will indicate success.

Description:

When a processor is to be removed from the system, a disable operation is issued for all applications residing on the specified processor. If the processor has failed, a forced disable should be performed. If the processor is being removed from the system for maintenance purposes, a controlled disable should be performed.

In addition, resource sets of a single application could be made out of service from a processor without affecting resource sets of other executing applications residing on the processor using the forced or controlled disable operation.

The System Controller itself is a pure fault-tolerant application to avoid single point of failure in the system. This command can be sent to the System Controller on the standby location to recover from the failure of the System Controller at the active location.

The following table describes the scDisableNode( ) operation when the redistribution flag is not set (FALSE)

| Resource Set State | Disable Node Action—No Redistribution |
|---|---|
| Active resource set having a standby copy | Forced or Controlled Switchover |
| Active resource set not having a standby copy | Shutdown active resource set |
| Standby resource set | Shutdown standby resource set |

The forced or controlled version of the Resource Set Control API Switchover operation is selected based on the forced-disable flag parameter of the disable node operation. If the forced-disable flag is TRUE, scForcedSwitchover( ) is used. If the forced-disable is FALSE, scControlledSwitchover( ) is used.

When the redistribution flag is set to TRUE, the System Controller attempts to redistribute and re-activate resource sets that would have been shut down. Re-assignment of resource sets to available processors is performed as specified in the following table:

| Configured Entity Type | Resource Set States | Disable Node Action— With Redistribution |
|---|---|---|
| Pure Distributed | Backed Up Active | Not applicable |
| | Non-Backed Up Active | Assign shutdown active resource sets to remaining processors, if any, in a round-robin manner. |
| | Standby | Not applicable |
| Pure Fault-Tolerant | Backed Up Active | Perform a forced or controlled switchover. |
| | Non-Backed Up Active | Not applicable |
| | Standby | Not applicable |
| Non-Dedicated Distributed Fault-Tolerant | Backed Up Active | Perform a forced or controlled switchover. |
| | Non-Backed Up Active | Assign active resource sets to remaining processors, if any, in a round-robin manner. Create standbys for these actives on the standby processor for the active to which they are assigned. |
| | Standby | Assign all standby resource sets to another available processor if possible. |
| Dedicated Distributed Fault-Tolerant | Backed Up Active | Perform a controlled or forced switchover to the standby processor of the active processor being shut down. Remove other standby resource sets from the standby processor, if any. Re-create all lost standby resource sets on another available dedicated standby processor if required. |
| | Non-Backed Up Active | Assign active resource sets to remaining active processors in a round robin manner, if possible. |
| | Standby | Assign all standby resource sets to another dedicated standby processor if available. |

Upon completion of resource set to processor assignments, resource sets of the application are made active or standby at the new location. The scShutdown( ), scMakeActive( ), and scMakeStandby( ) resource set level API control commands are used to shutdown resource sets and make them active or standby at new locations.

In situations in which no alternate processor is available to re-create lost active and standby resource sets, the resource sets are shut down. These resource sets may be re-created by introducing an alternate processor into the system using the scEnableNode( ) command.

Since shadow critical resource sets act as standbys for master critical resource sets, critical resource sets will always remain in the system until the last processor of an application is disabled. At this point, all resource sets of the application will be shut down, terminating the application.

When a processor containing the master critical resource set of an application is disabled, a shadow critical resource set contained on one of the remaining processors is elected to take over as the critical master resource set.

If a processor containing a critical master resource set has failed, the shadow critical resource sets may not be synchronized. The System Controller inquires the last received critical update message sequence number from all the shadows by using the adsmGetSeqNum( ) function. In this function, a new logical master ID is also supplied to all shadows so that they can reject any stale critical update message in the system until a new master is elected. The System Controller elects the shadow with the highest received sequence number as the new critical master resource set. Once the new critical master resource set is selected, the forced or controller switchover operation is used to switch over control from the disabled master critical resource set to the newly elected critical master resource set. For forced switchover operation, the System Controller also finds the shadow that has received the lowest update message sequence number. The newly-elected master is supplied with this sequence number and updates all the remaining shadows with the critical update message, starting from the lowest sequence number.

The scDisableNode( ) command is implemented in the System Manager component in the preferred embodiment shown in FIG. 16. The System Manager allows multiple protocol layers to be removed from a processor with a single disable node command.

If any of the steps in scDisableNode( ) command for forced disable fails, the System Controller ignores the failure and proceeds with the next step of the operation.

If any of the steps in scDisableNode( ) command for controlled disable fails, the operation is aborted and all the previous steps performed are rolled back. After rollback, all the resource sets are moved to their original locations.

On failure, the System Controller generates an alarm indicating the failure. This alarm is used to identify the location and cause of the failure by the Fault Manager module and generate appropriate commands to recover from the failure.

API Function: scSwapNode

Synopsis:

This API function is invoked to swap resource sets between two processors. This API function is generally used to swap all standby resource sets of one or more applications on one processor with their active counterparts. OA&M uses this operation for early fault detection in processors that have only standby resource sets. This is achieved by periodically making fully standby processors active.

Parameters:
1. Source Processor ID—This parameter identifies the first processor involved in the swap operation.
2. Destination Processor ID—This parameter identifies the second processor involved in the swap operation.

3. Entity List—This parameter specifies the list of entity identifiers for each application whose resource sets are to be swapped between the above-mentioned processors.

Return Value:

If the swap operation can be completed successfully, the return value will indicate success. If the swap operation fails to complete successfully, the return value will indicate failure. On successful completion, all the resource sets on the specified processors will have been swapped. On failure, none of the resource sets on the specified processors will be swapped and all resource sets remain at their original location.

Description:

This command moves all resource sets of the application from the source processor to the destination processor, and all resource sets from the destination to the source processor.

The following table describes this procedure in detail:

| Resource Set State | | | |
| --- | --- | --- | --- |
| Processor 1 Condition | Processor 2 Condition | Operation | Result |
| Active | Out-of-service | Controlled move active from Processor 1 to Processor 2 | Active copy moves from Processor 1 to Processor 2. |
| Absent | Active | Controlled move active from Processor 2 to Processor 1 | Active copy moves from Processor 2 to Processor 1 |
| Standby | Out-of-service | Controlled move standby from Processor 1 to Processor 2 | Standby copy moves from Processor 1 to Processor 2. |
| Absent | Standby | Controlled move standby from Processor 2 to Processor 1 | Standby copy moves from Processor 2 to Processor 1 |
| Active | Standby | Controlled Switchover resource set | Active/Standby copies on Processor 1 and Processor 2 swapped. |
| Standby | Active | Controlled Switchover resource set | Standby/Active copies on Processor 1 and Processor 2 swapped. |

Note that the swap operation interchanges the resource sets of the application between the two specified processors.

The scSwapNode( ) operation operates in a controlled manner so that no state information is lost in the application's resource sets. The swapped application provides un-interrupted service to its user application, which is completely unaware of the swap operation.

The scSwapNode( ) command is implemented in the System Manager component in the preferred embodiment shown in FIG. 16. The System Manager allows multiple protocol layers to be swapped between two processors with a single swap node command.

If any of the steps in the scSwapNode( ) command fail, the operation is aborted and all the previous step performed are rolled back. After rollback, all the resource sets are present on their original location.

On failure, the System Controller generates an alarm indicating the failure. The Fault Manager module uses this alarm to identify the location and cause of the failure and generate appropriate commands to recover from the failure.

API Function: scAbort

Synopsis:

This API function is invoked to abort the ongoing System Controller resource set or application level API command. This command is generally used when a higher priority command—for example, forced switchover—is pending, and a lower priority system maintenance command—for example, controlled switchover or controlled move—are being processed by the System Controller. The abort command cannot abort ongoing scForcedSwitchover( ), scForcedMove( ), or scDisableNode( ) (Forced) commands.

Parameters:
None

Return Value:

The abort operation is always successful. On successful completion, the system is rolled back to the state it was in when the command being aborted was issued. In some cases, however, if the command being aborted has almost completed, it may not be possible to abort the command. This condition is specified in the return value.

Description:

This command aborts the ongoing System Controller command. In most cases, the system state is restored to the same state it was in before the command being aborted was issued.

On receipt of this command, the System Controller rolls back the ongoing command using the same steps that are specified for the failure recovery of the each command.

The scAbort( ) command is implemented in the System Manager component in the preferred embodiment shown in FIG. 16.

If any of the steps in the scAbort( ) command fail, the failure is ignored and the System Controller continues with the abort command.

On failure, the System Controller generates an alarm indicating the failure. The Fault Manager module uses this alarm to identify the location and cause of the failure and generate appropriate commands to recover from the failure.

Fault Manager

The Fault Manager component performs fault detection, fault location, and fault isolation.

After a fault has been isolated, the Fault Manager can invoke the System Controller's resource set level API function, scForcedSwitchover( ), or application level API function, scDisableNode( ), to recover from the fault.

In the preferred embodiment shown in FIG. 16, the stack manager implements the Fault Manager functionality.

Load Manager

The Load Manager attempts to equalize the load exerted by an application on all the processors on which it executes. If the load distribution of an application is uneven, the Load Manager invokes a resource set control API function provided by the System Controller, scControlledMove( ), to move resource sets of an application from one processor to another to distribute the load evenly.

In addition to moving resource sets from one processor to another, the Load Manager may invoke the aldmSetWeight( ) API of the ALDM to re-direct new streams of input events to resource sets on relatively less-loaded processors for processing.

The Load Manager monitors the load exerted by each application on each processor using one or more, but not limited to, the following techniques:

1. obtaining load statistics (CPU utilization, memory utilization, etc.) from the System Software on each processor for each application, if this feature is provided by the System Software used on the processor.
2. Inquiring statistics information for each application from the ADSM or ALDM component using the adsmGetSts( ) or aldmGetSts( ) function. This information may be maintained for each resource set of the application and can be inquired by the Load Manager periodically.
3. Inquiring the number of input events routed to each resource set of an application from the Router Module using the rGetSts( ) function. This technique may be used if the number of input events is indicative of or proportional to the processing load exerted by a resource set on the processor.

When the Load Manager detects an uneven or potential overload condition on a processor for an application, the following actions may be taken to re-distribute the processing load evenly:

Move one or more resource sets from more loaded processors to less loaded processors. The Resource Set Control API, scForcedMove( ) or scControlledMove( ), may be used to perform resource set migration from one location to another. Note that the forced operation does not maintain state information and may result in interruption of service provided to user application(s), whereas the controlled operation maintains state information and results in no interruption of service provided to the user application.

Inform the ALDM responsible for assigning input events to resource sets of the application to redirect new streams of input events to alternate, less-loaded resource sets. The Load Manager may use the ALDM aldmSet Weight( ) function to inform ALDM to make input event to resource set assignments based on the dynamic weight of each resource set.

In the preferred embodiment shown in FIG. 16, the stack manager implements the Load Manager functionality.

Router

Figure 68:
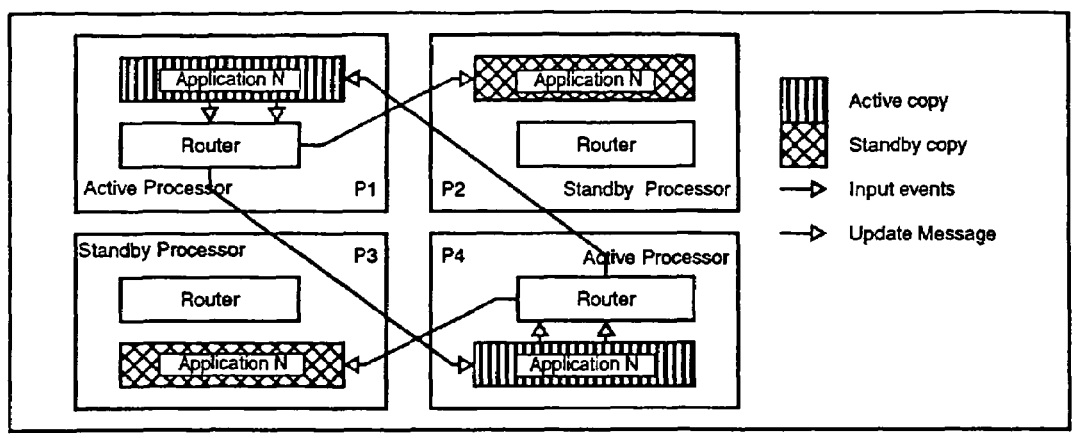
FIG. 68 illustrates the Router-routing functionality.

This module provides the functionality of routing messages between applications. After routing has been performed, the Router may deliver the event to the system software, which in turn delivers the event to the application, or the Router may directly deliver the event by making a function call to the application. The Router also routes messages between active and standby copies of a resource set (as shown in FIG. 68).

The Router interfaces with the System Controller to set and clear active, standby, and master processor mapping of a resource set. For non-critical resource sets, the Router maintains one active and one standby mapping. For critical resource sets, one active mapping and a multicast list of shadows are maintained. On each processor where a shadow resource set resides, the Router also maintains a master mapping. The Router provides API functions to the System Controller to add and remove processors from the multicast list of a resource set. Additionally, the Router provides the API to hold/release/drop messages towards a resource set, update the queued messages to the Router on another processor (peersync), and so on.

The Router also provides a function to send messages towards active/standby resource sets and a function to send message to a multicast list associated with the critical resource set. This functionality is used by the Application, ADSM, and ALDM. These components can also query the resource set mapping and queuing status using router functions. The following interface exists between the Router and the Application, ADSM, and ALDM.

| API Function | Parameters | Description |
| --- | --- | --- |
| RsendMsg | Entity identifier<br>Processor identifier<br>Message | Send the message to an entity. The entity and the processor identify the actual location of the entity. |
| RsendMsgStandby | Resource set identifier<br>Entity identifier<br>Message | Send a message to the standby copy of the resource set. The Router will do a lookup of (active + resource set identifier + entity identifier) to find the processor in which the specified resource set resides as standby. It will then send the message out to the entity on the mapped processor. |
| RsendMsgActive | Resource set identifier<br>Entity identifier<br>Message | Send a message to the active copy of the resource set. The Router will do a lookup of (active + resource set identifier + entity identifier) to find the processor in which a specified resource set resides as active. It will then send the message out to the entity on the mapped processor. |
| Rmulticast | Resource set identifier<br>Entity identifier<br>Message | Multicast a message to all the shadows for a critical resource set. The Router will do a lookup of (multicast + resource set identifier + entity identifier) to find the list of processors in which shadows of the specified master critical resource set reside. It will then send the message out to entity on each processor in the mapped list of processors. |
| RMulticastSync | Resource set identifier<br>Entity identifier<br>Message | This function will result in the following processing by the Message Router: Multicast the message to all the shadows of the critical resource set. The Router will do a lookup of (multicast + resource set identifier + entity identifier) to find the list of processors in which shadows of the specified master critical resource set reside. It will then send the message out to the entity on each of the processors in the mapped list of processors. Blocking wait for an acknowledgement from the shadow resource sets. |

-continued

| API Function | Parameters | Description |
|---|---|---|
| rMulticastSyncAck | Resource set identifier<br>Entity Identifier | Send an acknowledgement for a multicast message. This function is used by the ADSM that has received a multicast update message for a shadow resource set, and an acknowledgement is required for the update message. |
| rGetStatus | Resource set identifier<br>Entity identifier<br>Status required | This function can return the following status<br>Mapping information for the resource set.<br>Queuing status of the resource set. This indicates whether the Router is queuing messages for the resource set<br>This information can be used in various distribution schemes. |

The following interface exists between the Router and the System Controller.

| API Function | Parameter | Description |
|---|---|---|
| RSetActiveMap | Entity list<br>Resource set list<br>Processor identifier list | For each entity in the entity list, set the active processor mapping of the specified resource sets. |
| RClearActiveMap | Entity list<br>Resource set list | For each entity in the entity list, remove the active processor mapping of the specified resource sets. |
| RSetStandbyMap | Entity list<br>Resource set list<br>Processor identifier list | For each entity in the entity list, set the standby processor mapping of the specified resource sets. |
| RClearStandbyMap | Entity list<br>Resource set list | For each entity in the entity list, remove the standby processor mapping of the specified resource sets. |
| RSetMasterMap | Entity list<br>Resource set list<br>Processor identifier list | For each entity in the entity list, set the master processor mapping of the specified resource sets. |
| RClearMasterMap | Entity list<br>Resource set list | For each entity in the entity list, remove the master processor mapping of the specified resource sets. |
| RAddMcastList | Entity list<br>Resource set list<br>Processor identifier list | For each entity in the entity list, add the specified processors to the multicast list of specified resource sets. |
| RDelMcastList | Entity list<br>Resource set list<br>Processor identifier list | For each entity in the entity list, delete the specified processors from the multicast list of specified resource sets. |
| RHoldQueue | Entity list<br>Resource set list | For each entity in the entity list, queue messages for the specified resource sets. |

-continued

| API Function | Parameter | Description |
|---|---|---|
| RReleaseQueue | Entity list<br>Resource set list | For each entity in the entity list, release queued messages for the specified resource sets. All the messages will be sent to the processor on which the active resource set is located. |
| RDropQueue | Entity list<br>Resource set list | For each entity in the entity list, drop queued messages for all the specified resource sets. |
| RPeerSync | Entity identifier<br>Resource set identifier<br>Processor identifier | Send all the queued messages of specified resource set to the router on specified processor. |
| RAdjacentPing | Processor identifier | Send a Ping request message to the Router on the specified processor and expect a reply from it. The receipt of the reply will ensure that the communication channel between the two processors is flushed. |
| RAbort | None | Abort the request being processed currently. |

The following interface exists between the Router and the Load Manager.

| API Function | Parameter | Description |
|---|---|---|
| RGetSts | Resource set list<br>Entity list | Provide the statistics information for the specified resource sets for the specified entities. |

The Router uses the services of the system software for inter-application delivery of the messages. These services are environment-dependent.

In the preferred embodiment shown in FIG. 16, the message router implements Router functionality.

Application

Here, the word Application refers to an application controlled by the System Controller. The Application can either be a conventional application, a pure fault-tolerant application, a pure distributed application, or a distributed fault-tolerant application.

Each application is uniquely identified by an entity identifier. A pure fault-tolerant, distributed, or distributed fault-tolerant application will be located on multiple processors, and it will have the same entity identifier on each processor.

A pure fault-tolerant, distributed, or distributed fault-tolerant application will have an ADSM to provide fault-tolerance and distributed support. Distributed applications will also need an ALDM to distribute incoming event streams to resource sets.

Each Application needs to provide the following API to be used by the System Controller:

| API Function | Parameters | Description |
|---|---|---|
| AppNeighborAlive | Entity identifier Processor ID | This function is invoked towards the user application to indicate that the neighbor provider application is alive. It implies that this Application can start communication with the specified neighbor on specified processor (if any). On reception of the API, the Application has to inform the neighbor that it (this Application) is alive. An explicit function from the System Controller to the neighbor will not be invoked. |
| AppNeighborDead | Entity identifier Processor ID | This function is invoked towards the user/provider application to indicate that the neighbor provider/user application is dead on specified processor (if any). It implies that this application should stop communication with the specified neighbor. |

An Application communicating with a conventional application needs to be aware of the entity identifier and the Processor Identifier of the conventional application. The Router API rSendMsg( ) is used for communicating with the conventional application.

An Application communicating with a pure fault-tolerant application needs to be aware of the resource set identifier and the entity identifier of the fault-tolerant application. The Router API rSendMsgActive( ) is used for communicating with the pure fault-tolerant application.

An Application communicating with a pure distributed or a distributed fault-tolerant application need not be aware of the location of the distributed application. All events generated from this application are handed over to the ALDM of the distributed application. The ALDM determines the resource set of the distributed application to which the event is to be delivered and invokes the rSendMsgActive( ) function to send the event to the application copy where the active resource set resides.

In the preferred embodiment shown in FIG. 16, MTP2, MTP3, SCCP, and TCAP are applications.

Application Load Distribution Module (ALDM)

Figure 63:
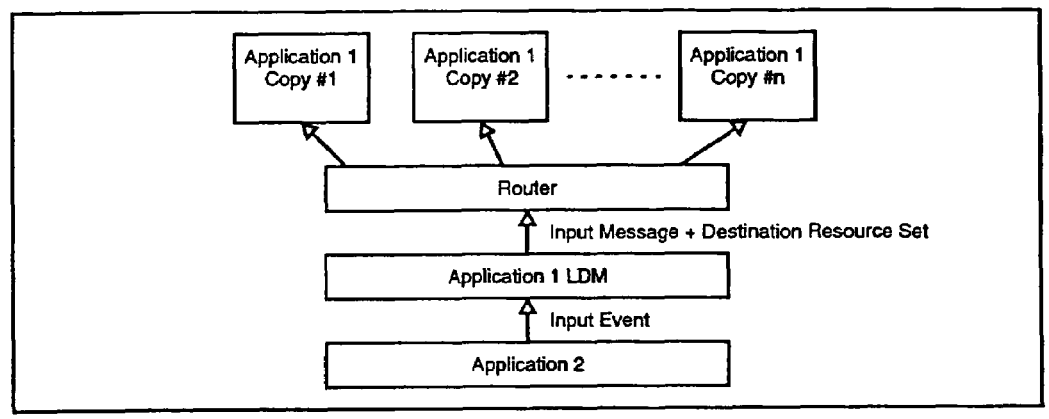
FIG. 63 illustrates the input message path through ALDM.

The ALDM is required only for the distributed applications. The ALDM distributes incoming events to various application copies. The ALDM resides with all user and provider application copies. Each incoming event is mapped to a specific resource set identifier, and then the event is delivered to the Application copy that contains the active copy of that resource set. FIG. 63 shows the flow of input events through the ALDM.

Figure 64:
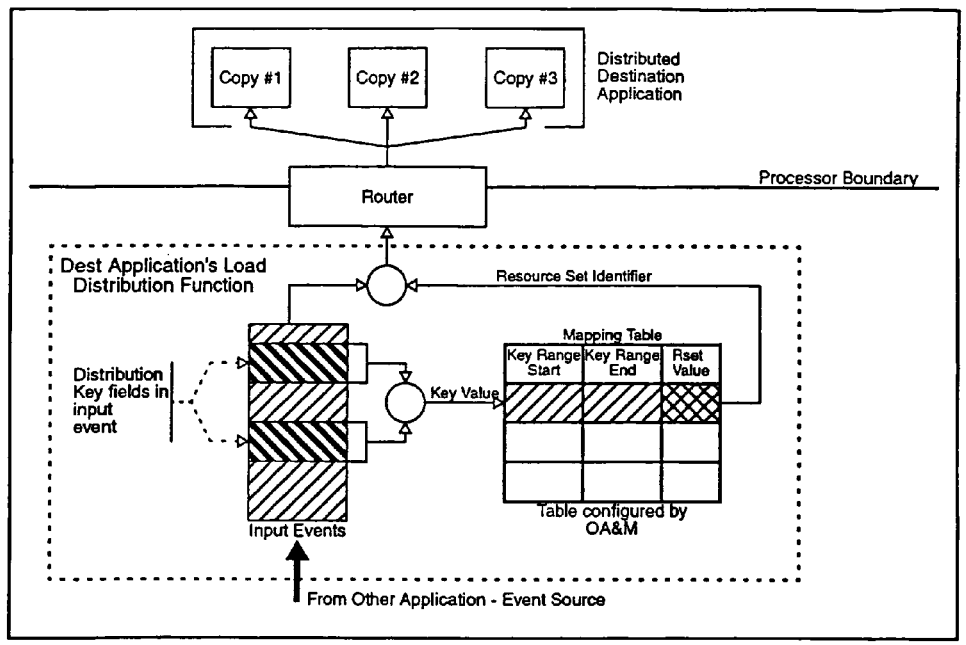
FIG. 64 illustrates distributed message processing via ALDM and Router.

Various mapping schemes could be used to map the incoming event to the resource sets. Some of the possible schemes are:

Map-specific distribution key value(s) of the event to the resource set (referred to as static distribution), as illustrated in FIG. 64.

Dynamically map events from input event streams to different resource sets (referred to as dynamic distribution). For example, a round-robin counter could be used for mapping an input event, which does not require sequencing, to different resource sets.

Select resource set identifier such that the communication channel delay to the Application copy having the active resource set is lowest. For example, the ALDM could choose a resource set that involves intra-processor communication over one that involves inter-processor communication, or the distribution function could avoid choosing a resource set for which the Router is queuing messages. The Router API rGetStatus( ) will be used to obtain the required information.

Mapping schemes can be changed dynamically by the Load Manager to achieve the desired load assignment to specific resource sets. One way is to associate different weights with each resource set by using the API aldmSetWeight( ). These weights could be modified by the Load Manager.

The following interface exists between the ALDM and the Load Manager.

| API Function | Parameter | Description |
|---|---|---|
| AldmGetSts | Resource set list Entity list | Provide the statistics information for the specified resource sets for the specified entities. |
| AldmSetWeight | Resource set list Entity list Weight list | Set the weight information for the specified resource sets for the specified entities. Use the updated weight information to distribute new input event streams to the affected resource sets. |

Note that not all the distribution schemes are applicable to different applications. A typical ALDM could also use a combination of various distribution schemes.

All incoming events for the Application will first be delivered to the ALDM, which will interface with the Router and deliver the event to the necessary Application copy. The ALDM uses the Router rSendMsgActive( ) API to deliver the incoming event to the active resource set after the resource set identifier has been determined.

In the preferred embodiment shown in FIG. 16, the ALDM for TCAP, SCCP, and MTP3 supports static and dynamic distribution for non-critical resource sets. For static distribution, the specific distribution key values will map to a specific resource set. For dynamic distribution, the ALDM will decide which resource set is to be associated with an input event. The ALDMs in preferred embodiment support a single critical resource set.

The following distribution schemes are used.

| Layer | Distribution Schemes for Non-Critical Resource Sets |
|---|---|
| SCCP | SCCP has a critical resource set which is associated with the SCCP routes, subsystems, and other management data. SCCP provides the following distribution schemes for non-critical resource set: Static distribution. Messages to/from pointcode P1 can be associated with resource set R1, and messages to/from pointcode P2 can be associated with resource set R2. |

| Layer | Distribution Schemes for Non-Critical Resource Sets |
|---|---|
| | Dynamic distribution. All Class 0 connectionless messages can be distributed among all the resource sets in a round robin manner. All Class 1, sequenced, connectionless messages can be distributed to the resource set by using "sls modulo number of resource sets" on the lower interface, and "sequence control parameter modulo number of resource sets on the upper interface." |
| MTP3 | MTP3 has a critical resource set that is associated with MTP3 routes, service access points, etc. MTP3 provides the following distribution schemes for non-critical resource sets:<br>Static distribution. This distribution allows the users to associate specific distribution key values with a resource set. For example, messages to/from a specific SLS can be associated with resource set R1, and messages to/from point code P3 can be mapped to resource set R2.<br>Dynamic distribution. The LDF will decide by itself which resource set identifier is to be associated with which message. MTP3 is configured with the possible values for the needed distribution keys. The LDF then internally creates associations from the key value combinations to the resource set. |
| TCAP | TCAP has a critical resource set, which is associated with TCAP management data. TCAP provides the following distribution schemes for non-critical resource sets:<br>Static distribution. The user can map a range of dialogue IDs to a specific resource set.<br>Dynamic distribution. The events on the upper interface of TCAP are distributed by using the dialogue ID's modulo number of resource sets, while, on the lower interface, the distribution is done in a round robin manner. |

Application DFT/HA Support Module (ADSM)

This module is combined with the application to provide the necessary functionality to integrate the Application into the DFT/HA architecture.

ADSM performs the following functions:

Allows the API to interface with the System Controller.

Associates Application data structures with resource sets. The resource sets will be critical and non-critical. For fault-tolerant applications, ADSM will contain only a single resource set.

Sends run-time update messages to keep the active resource set synchronized with the standby resource set. Typically, a run-time update message would be sent for a particular resource set when a data structure related to the resource set is modified.

Receives run-time update, warmstart, and peersync messages for standby resource sets, and updates the relevant Application internal information (for example, data structures).

Sends update confirm messages from the standby to indicate the end of the warmstart and peersync procedures.

Sends and receives heartbeat messages to detect the loss of critical update messages.

Sends multicast acknowledgement for received critical multicast update with sync messages.

The following API is provided to the System Controller by ADSM for various resource set control operations.

| API Function | Parameters | Description |
|---|---|---|
| AdsmGoActive | Resource set list<br>Recovery flag<br>Sequence number<br>Master ID<br>Peer state | This function indicates to the ADSM that it has to make the specified resource sets active. The peer state parameter indicates whether the standby exists and whether run-time update should be sent. The recovery flag indicates whether a failure has occurred in the system and whether the application should take any failure-related actions. If command is issued for a critical shadow resource set, the resource set becomes master and sends critical updates to the remaining shadows using the specified new master ID. As part of becoming master, the shadow critical resource set also sends all the previous critical update messages, starting from the specified sequence number, to all slaves. Using this procedure, all the shadows in the system become synchronized with the new master after the old master resource set has failed. |
| AdsmGoStandby | Resource set list<br>Master ID | This function indicates to the ADSM that the resource sets are to be put in the standby state. |
| AdsmShutdown | Resource set list | This function indicates to the ADSM that the specified resource sets are to be shut down. |
| AdsmWarmStart | Resource set list | This function indicates to the ADSM to start the warmstart procedure for the specified resource sets. |
| AdsmPeerSync | Resource set list | This function indicates to the ADSM to start the peersync procedure for the specified resource sets. |
| AdsmDisablePeer | Resource set list | This function is used to disable run-time update messages towards the specified standby resource sets. This operation is used when standby resource sets become out-of-service. |
| AdsmGetSeqNum | Resource set identifier<br>Master ID | This function is used to get the sequence number of the last update message for a critical shadow resource set. New logical master ID is also supplied to the ADSM. After this function call, ADSM only accepts critical updates from the master with the specified master ID. |
| AdsmAbort | | This function is used to abort current ongoing operation. |

The following interface exists between the ADSM and the Load Manager.

| API Function | Parameter | Description |
| --- | --- | --- |
| AdsmGetSts | Resource set list Entity list | This function provides the statistics information for the specified resource sets for the specified entities. |

Figure 65:
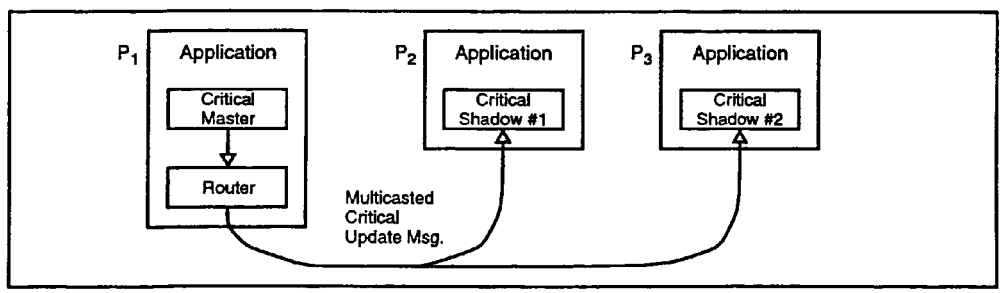
FIG. 65 illustrates router multicast functionality.
Figure 66:
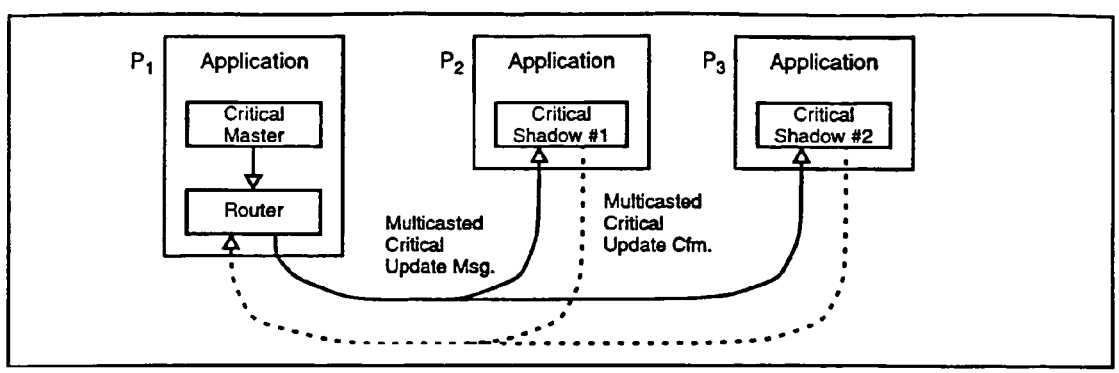
FIG. 66 illustrates router synchronization functionality.

ADSM uses the rSendMsgStandby( ) API of the Router to send update messages to a standby. This function will be used for sending run-time updates for non-critical resource sets and for warmstart and peersync messages for both critical and non-critical resource sets. ADSM uses the rMulticast( ) (as depicted in FIG. 65) and rMulticastSync( ) API (as depicted in FIG. 66) of the Router for sending run-time update messages for critical resource sets. rMulticastSync( ) is used when it is necessary to ensure that each shadow has received the update information to guarantee correct Application behavior. The API function will be selected based on the actual data being updated. The ADSM having a master critical resource set uses the rMulticastSync( ) function when critical data needs to be updated to all the shadows before the application can continue processing the input event. The ADSMs having shadow resource sets uses the rSendMulticastAck( ) function to acknowledge the receipt of critical data from the master resource set. ADSM uses the rSendMsgActive( ) function to send a confirm message from the standby to the active during a warmstart or peersync procedure.

Figure 67:
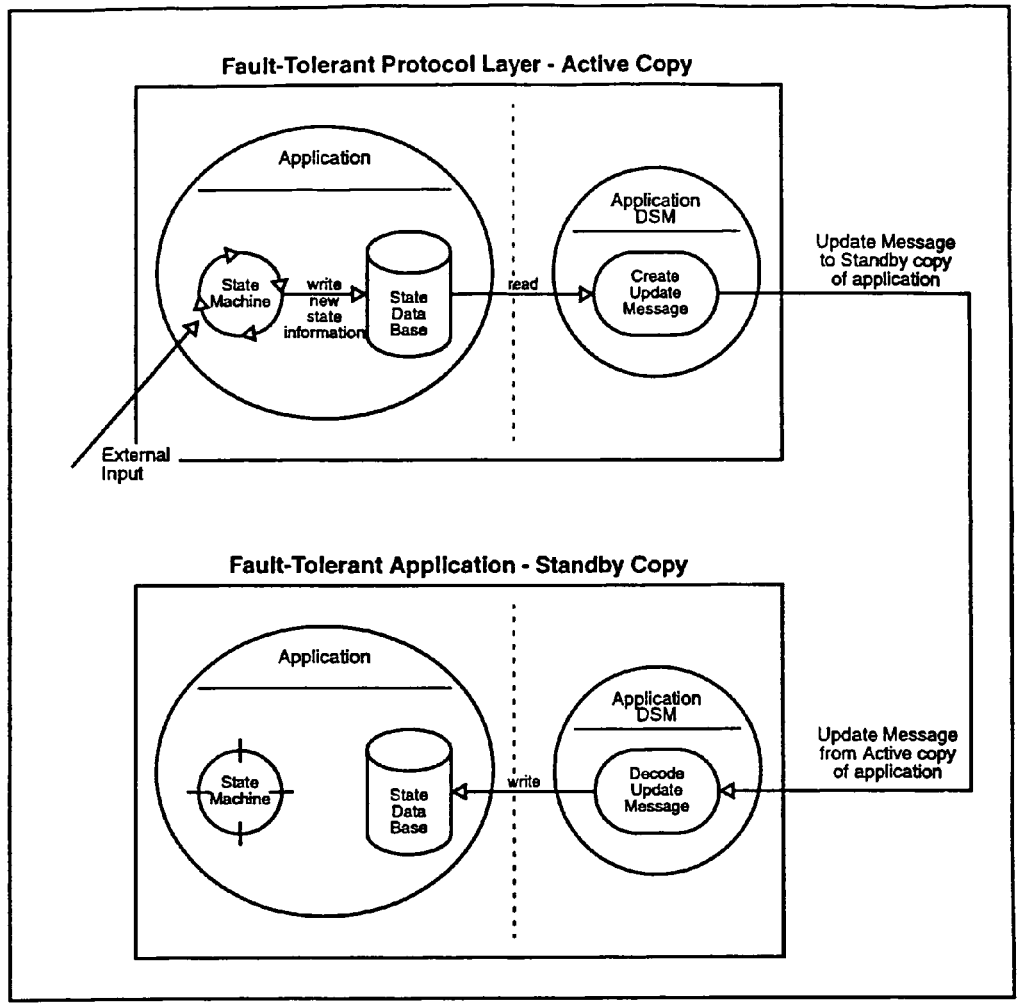
FIG. 67 illustrates fault-tolerant application and its ADSM component.

For the purpose of illustration, assume that the application creates a control block (a data block) on reception of external events for a resource set. This control block is thus associated with the resource set, and subject to the various procedures to be executed on the resource set. FIG. 67 illustrates the generation of a run-time update message and actions taken in the standby on reception of the run-time update message.

The control block has the following characteristics:
It does not exist when the resource set is in the OOS state.
It is created on reception of external events by the application.
It will have some transient states and some stable states.
Transient states are prudently chosen using the following criteria:
1) They exist for a limited time.
2) Updating them from active to standby is not critical.
3) A large number of update messages are needed to update these states.

Timers could be running for the data structure in both transient and stable states.

The following table indicates the typical actions performed in the ADSM containing the above-described control block.

| Operation | OOS Resource Set | Standby Resource Set | Active Resource Set |
| --- | --- | --- | --- |
| AdsmGoActive | Do nothing, because no control block exists. | If the control block exists, start all timers appropriate to the state of the control block. | If any control block timers have been suspended, resume them. |
| adsmGoStandby | Wait for updates for the control block. New control blocks for the resource set can be created as part of the updates. | Remove the transient state of the control block and bring it to the nearest stable state. If there is no nearest stable state, the control block will be deleted. | Stop the control block timers and bring the control block to the nearest stable state. If there is no nearest stable state, the control block may be deleted. |
| AdsmShutdown | Do nothing. | Delete the control block. | Stop the control block timers and delete the control block. |
| adsmWarmStart | Not applicable | Not applicable | Update the nearest stable state information to the standby. (No data will be updated if there is no nearest stable state). External inputs could be received for the control block, and any resulting state change to the control block will be updated in a run-time update message. |
| AdsmPeerSync | Not applicable | Not applicable | Suspend the control block timers and update all (stable or transient) state information to the standby. |
| adsmDisablePeer | Not applicable | Not applicable | Stop sending run-time update message to the standby resource set for any state change in the control block. |
| AdsmAbort | Abort the current ongoing System Controller initiated operation. | Abort the current ongoing System Controller initiated operation. | Abort the current ongoing System Controller initiated operation. |
| Reception of an input event that will modify the control block. | Not applicable | Not applicable | If the control block is modified, and there is a change in the stable state of the control block, send a run-time update message to the standby. If the resource set is non-critical, rSendMsgStandby( ) will be used. For critical resource sets, rMulticast( ) or rMulticastSync( ) may be used, depending on the nature of the update. |

-continued

| Operation | OOS Resource Set | Standby Resource Set | Active Resource Set |
|---|---|---|---|
| Reception of a run-time update message. | Not applicable | If the control block does not exist, create one. Update the control block based on the contents of the update message. Send an acknowledgement towards the master critical resource set using rSendMulticastSyncAck( ) if the update message for critical resource set was sent using rSendMulticastSync( ) the function. | Not applicable |
| Reception of a warmstart message | Not applicable | If the control block does not exist, create one. Update the control block based on the contents of the update message. Send an update confirm message, if this is the last warmstart message. | Not applicable |
| Reception of a peersync message | Not applicable | If the control block does not exist, create one. Update the control block based on the contents of the update message. Send an update confirm message, if this is the last peersync message. | Not applicable |
| Reception of the update confirm message. | Not applicable | Not applicable | This message indicates an end of the current (warmstart or peersync) procedure started by the System Controller using adsmPeersync( ). |

The typical update messages (sent as part of run-time update, warmstart, or peersync) would have the following components:
1. Version information. This field allows live system upgrades.
2. Resource set identifier.
3. Sequence number. This field ensures that no update messages are lost.
4. Update procedure type. This field indicates whether the procedure type is a run-time, warmstart, or peersync update message.
5. Flag indicating whether this is the last message in the sequence. For warmstart and peersync, when the last update message is received by the standby, it has to send a confirmation to the active indicating that all the messages have been received.
6. Flag indicating whet her an acknowledgment is required. This flag is used only in multicast messages. This message informs the standby that it has to send an acknowledgment to the Router (which sent the message) using rSendMulticastSyncAck( ), to inform the router that the message has been received.
7. Control block data. This information is specific to the control block being updated.

The typical update confirm message would have the following components:
1. Version information. This field allows live system upgrades.
2. Resource set identifier.
3. Operation status. This field indicates whether the operation was successful.

In the preferred embodiment shown in FIG. 16, the ADSM is implemented in PSF as an add-on module for SCCP, TCAP, and MTP3 protocols. This module maintains the state of the resource sets, identifies the mapping between the protocol-specific information (example control blocks, queues) and the resource set, and decides which parts of the protocol-specific information are to be updated as part of run-time, warmstart, and peersync updates. It is also aware of the type of each resource set: critical or non-critical. If any of the protocol layers are being used in a distributed configuration, then the ADSM needs to be aware of the distribution scheme being used by the ALDM of the protocol layer.

The following is a description of how a connection control block (data block created for a connection) is handled by the ADSM.

When a Connect Request input function is received by SCCP, it creates a connection control block. The SCCP ADSM creates an association between the connection control block and the resource set derived using the same distribution scheme used by the SCCP ALDM.

The SCCP ADSM considers the "connection establishment" state as transient, the "connection established" state as stable, the "connection release" state as transient, and the "connection deleted" state as stable. Since all the copies of a protocol layer need not know about the connection, the connection control block is linked with a non-critical resource set. The previous table indicates the processing done on the connection control block by the SCCP ADSM.

An SCCP service access point with MTP3, on the other hand, is associated with a critical resource set, since all the protocol copies need to be aware of the service access point status for communicating with neighboring protocols. The service access point has two states: "connected" and "disconnected" Both of these states are considered stable states. The previous table indicates the processing done on the service access point by the SCCP ADSM. Router API rMulticastSync( ) will be used to update these states.

The ADSM is configured with the same mapping scheme information as the LDF of the protocol layer so that it can derive the same resource set mappings as the LDF.

System Software

The system software module provides the services required for managing resources required by the architecture components and the application software. The following functionality is typically provided by system software:

Memory management services

Message transmission and reception services

Process and/or thread creation, management, and scheduling

Timer-related services

In addition to the services listed above, other specific services required by the architecture components and application software must be provided by the system software.

The architecture components use the system software services via a well-defined set of functions. These functions can be ported to work on different operating systems, allowing architecture components to be used for various operating systems.

CONCLUSION

The detailed description of the invention discloses how applications can be developed using this invention to work in a variety of distributed and fault-tolerant modes. The invented architecture also provides details on other system components that can manage these applications. Multiple system configurations can be achieved using the same architecture components, resulting in significant reduction of system cost and development time. Systems developed using this architecture can be deployed in various hardware configurations. For example, the same software can be deployed in a pure fault-tolerant system at one site and in a distributed fault-tolerant system at another site. An already operational system can be scaled by adding more hardware to meet the higher throughput requirements.

It will now be apparent to those with ordinary skill in this art that many variations to the invented architecture are possible. For example, though the architecture describes distribution in event-driven applications, the resource set definition can be extended to non event-driven applications. It is possible to have multiple standbys for non-critical resource sets by using multicast updates even for non-critical resource sets. The Router component can be extended to provide various synchronization mechanisms using distributed semaphores. The multicast sync procedure in the router can be extended to provide any application-specific synchronization procedures. The warm standby approach for fault-tolerance could be replaced by any fault-tolerance approach of choice, for example, the cold standby approach. The architecture can be extended to provide an online software upgrade feature without disrupting the services provided by the system.

For these reasons, the foregoing Detailed Description is to be regarded as being in all respects illustrative and exemplary and not restrictive.

What is claimed is:

1. A distributed processing system comprising:
    an application to execute a process in a pure distributed mode, wherein the process is associated with an incoming event and is mapped to a resource set;
    a router to route communications between the application and another application independent of location of the applications;
    an update module to provide distributed functionality in the application; and
    a load distributor to distribute the process to the application.

2. The distributed processing system according to claim 1, wherein the application is assigned to the resource set and the application uses the resource set to execute the process.

3. The distributed processing system according to claim 2, wherein the resource set includes a memory responsive to the application.

4. The distributed processing system according to claim 2, wherein the update module provides distributed functionality to update shared data, the shared data to be used by the application to execute the process in a pure distributed mode.

5. The distributed processing system according to claim 1, wherein the update module is to modify shared data based on a master critical resource set, wherein the shared data is to be used by the application to execute the process in a pure distributed mode.

6. A fault tolerant system comprising:
    an application to execute a process in a pure fault tolerant mode, wherein the process is associated with an incoming event and is mapped to a resource set;
    a router to route communications between the application and another application independent of location of the applications; and
    an update module to provide fault tolerant functionality in the application, wherein the application uses the resource set to execute the process.

7. The fault tolerant system according to claim 6, wherein the update module provides fault tolerant functionality to update private data, the private data used by the application to execute the process in a pure fault tolerant mode.

8. The fault tolerant system according to claim 7, wherein the resource set includes resources in an active state and resources in a standby state, the resources in the active state to communicate modifications to the private data to the resources in the standby state.

9. The fault tolerant system according to claim 6, wherein the resource set includes a memory responsive to the application.

10. The fault tolerant system according to claim 6, wherein the application and the other application are located on different processors.

11. The fault tolerant system according to claim 10, wherein one of the processors comprises the router.

12. The fault tolerant system according to claim 10, wherein one of the processors comprises the router.

13. The fault tolerant system according to claim 6, wherein the update module is to modify private data, wherein the private data is to be used by the application to execute the process in a pure fault tolerant mode.

14. A distributed processing, fault tolerant system comprising:
    an application to execute a process in a distributed fault tolerant mode, wherein the process is associated with an incoming event and is mapped to a resource set;
    a router to route communications between the application and another application independent of location of the applications;
    an update module to provide distributed fault tolerant functionality in the application; and
    a load distributor to distribute the process to the application.

15. The distributed processing, fault tolerant system according to claim 14, wherein the application is assigned to the resource set and the application uses the resource set to execute the process.

16. The fault tolerant system according to claim 14, wherein the update module provides distributed fault tolerant functionality to update private and shared data, the private and shared data used by the application to execute the process in a distributed fault tolerant mode.

17. The distributed processing, fault tolerant system according to claim 14, wherein the resource set includes a memory responsive to the application.

18. The distributed processing, fault tolerant system according to claim 14, wherein the application and the other application are located on different processors.

19. The distributed processing, fault tolerant system according to claim 18, wherein one of the processors comprises the router.

20. The distributed processing, fault tolerant system according to claim 14, wherein the update module is to update private and shared data, wherein the private and shared data are to be used by the application to execute the process in a distributed fault tolerant mode.

* * * * *